US008414173B2

(12) United States Patent
Masuda et al.

(10) Patent No.: US 8,414,173 B2
(45) Date of Patent: Apr. 9, 2013

(54) ILLUMINATION DEVICE AND DISPLAY DEVICE

(75) Inventors: Takeshi Masuda, Osaka (JP); Yuhsaku Ajichi, Osaka (JP); Yukihide Kohtoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/599,944

(22) PCT Filed: Jul. 25, 2008

(86) PCT No.: PCT/JP2008/063436
§ 371 (c)(1),
(2), (4) Date: Nov. 12, 2009

(87) PCT Pub. No.: WO2009/017067
PCT Pub. Date: Feb. 5, 2009

(65) Prior Publication Data
US 2010/0214802 A1 Aug. 26, 2010

(30) Foreign Application Priority Data

Jul. 27, 2007 (JP) .................................. 2007-196662
May 30, 2008 (JP) .................................. 2008-143752

(51) Int. Cl.
*F21V 7/04* (2006.01)

(52) U.S. Cl. ........ 362/606; 362/608; 362/610; 362/611; 362/612; 362/613; 362/615; 362/616; 362/618; 362/628; 349/61; 349/62; 349/64; 349/65

(58) Field of Classification Search .................. 362/606, 362/608, 610–613, 615, 616, 618, 628; 349/61, 349/62, 64, 65
See application file for complete search history.

(56) References Cited

U.S. PATENT DOCUMENTS 5,262,928 A 11/1993 Kashima et al.
5,957,561 A 9/1999 Ono et al.
(Continued)

FOREIGN PATENT DOCUMENTS

| CN | 1751253 A | 3/2006 |
|---|---|---|
| CN | 101097054 A | 1/2008 |

(Continued)

OTHER PUBLICATIONS

U.S. Appl. No. 12/599,853, filed Nov. 12, 2009, entitled "Illumination Device and Liquid Crystal Display Device".

(Continued)

*Primary Examiner* — Mary McManmon
(74) *Attorney, Agent, or Firm* — Nixon & Vanderhye P.C.

(57) ABSTRACT

An illumination device includes a plurality of light source units (20) each having a light guide plate and at least one light source. The light guide plate is provided with an illumination region (4) through which an incident beam of light from the at least one light source is emitted outward and a light guide region (3) through which the incident beam of light from the at least one light source is guided toward the illumination region (4), with the illumination region (4) and the light guide region (3) laid side-by-side. Light source units (20) adjacent to each other along a direction of an optical axis of the at least one light source are disposed so that the illumination region (4) of one of the light source units (20) covers at least a part of the light guide region (3) of the other light source unit (20). A diffuse reflection sheet (33) and a specular reflection sheet (32) or a light absorption sheet are provided between the light guide plate (LG(k)) of the one of the light source units (20) and the at least one light source (BL(k+1)) of the other light source unit (20) in such a way as to be put on top of each other. This makes it possible to suppress uneven irradiation and improve luminance uniformity and color-mixing properties of a tandem illumination device having light guide plates disposed in such a way as to be overlapped.

16 Claims, 34 Drawing Sheets

U.S. PATENT DOCUMENTS

| | | | |
|---|---|---|---|
| 6,241,358 B1 | 6/2001 | Higuchi et al. | |
| 6,561,663 B2 | 5/2003 | Adachi et al. | |
| 6,580,477 B1 | 6/2003 | Cho | |
| 6,607,297 B2 * | 8/2003 | Egawa | 362/551 |
| 8,092,064 B2 * | 1/2012 | Erchak et al. | 362/613 |
| 2001/0017774 A1 | 8/2001 | Ito et al. | |
| 2001/0053072 A1 | 12/2001 | Takemoto | |
| 2002/0024803 A1 | 2/2002 | Adachi et al. | |
| 2002/0036905 A1 | 3/2002 | Mabuch | |
| 2002/0197051 A1 | 12/2002 | Tamura | |
| 2003/0206253 A1 | 11/2003 | Cho | |
| 2004/0001345 A1 | 1/2004 | Lee et al. | |
| 2004/0145915 A1 | 7/2004 | Kim | |
| 2005/0168967 A1 | 8/2005 | Kao et al. | |
| 2005/0281053 A1 * | 12/2005 | Marra | 362/617 |
| 2006/0221638 A1 | 10/2006 | Chew et al. | |
| 2006/0245213 A1 | 11/2006 | Beil et al. | |
| 2007/0058393 A1 | 3/2007 | Kim et al. | |
| 2007/0147073 A1 | 6/2007 | Sakai | |
| 2007/0147089 A1 | 6/2007 | Lin et al. | |
| 2007/0247869 A1 | 10/2007 | Lang et al. | |
| 2008/0030650 A1 | 2/2008 | Kitagawa et al. | |
| 2008/0101068 A1 | 5/2008 | Kitamura et al. | |
| 2009/0034292 A1 * | 2/2009 | Pokrovskiy et al. | 362/617 |
| 2009/0129058 A1 | 5/2009 | Tokita et al. | |
| 2010/0060818 A1 | 3/2010 | Ajichi | |
| 2010/0214281 A1 | 8/2010 | Ueno et al. | |
| 2010/0225572 A1 | 9/2010 | Suminoe et al. | |
| 2011/0025730 A1 | 2/2011 | Ajichi | |
| 2011/0221361 A1 * | 9/2011 | Cornelissen et al. | 315/313 |

FOREIGN PATENT DOCUMENTS

| | | |
|---|---|---|
| EP | 1 424 576 A1 | 6/2004 |
| JP | 2-111922 | 4/1990 |
| JP | 4-267222 | 9/1992 |
| JP | 9-282921 | 10/1997 |
| JP | 11-288611 | 10/1999 |
| JP | 2000-171641 | 6/2000 |
| JP | 2000-258633 | 9/2000 |
| JP | 2001-75096 | 3/2001 |
| JP | 2001-084822 | 3/2001 |
| JP | 2001-184929 | 7/2001 |
| JP | 2001-312916 | 11/2001 |
| JP | 2002-42537 | 2/2002 |
| JP | 2002-072204 | 3/2002 |
| JP | 2002-99250 | 4/2002 |
| JP | 2002-109935 | 4/2002 |
| JP | 2003-43266 | 2/2003 |
| JP | 2003-295184 | 10/2003 |
| JP | 2003-308718 | 10/2003 |
| JP | 2004-127918 | 4/2004 |
| JP | 2004-170698 | 6/2004 |
| JP | 2004-178850 | 6/2004 |
| JP | 2004-228092 | 8/2004 |
| JP | 2004-319253 | 11/2004 |
| JP | 2005-153488 A | 6/2005 |
| JP | 2006-522436 | 9/2006 |
| JP | 2006-286638 | 10/2006 |
| JP | 2007-188863 | 7/2007 |
| JP | 2007-287678 | 11/2007 |
| JP | 2008-108622 A | 5/2008 |
| RU | 6259 U1 | 3/1998 |
| RU | 46 865 U1 | 7/2005 |
| WO | 2005/071449 A2 | 8/2005 |
| WO | 2005/114273 A1 | 12/2005 |

OTHER PUBLICATIONS

Supplementary EP Search Report mailed Dec. 30, 2010 in EP application 08872029.7.
International Search Report for PCT/JP2008/063436, mailed Sep. 9, 2008.
International Search Report for PCT/JP2008/063434, mailed Sep. 9, 2008.
Tetsuya Ueno et al., U.S. Appl. No. 12/599,566, (Nov. 10, 2009).
Russian Notice of Allowance and English translation thereof mailed Feb. 28, 2012 in Russian application 2010144276.
Office Action mailed Mar. 1, 2012 in U.S. Appl. No. 12/593,806.
Office Action (Restriction Requirement) mailed Apr. 9, 2012 in U.S. Appl. No. 12/746,816.
U.S. Appl. No. 12/746,816, filed Jun. 8, 2010, entitled Illumination Device and Liquid Crystal Display Device.
EP Search Report mailed May 17, 2010 in EP application 08791678.9.
U.S. Office Action mailed Jun. 7, 2012 in U.S. Appl. No. 12/746,816.
International Search Report for PCT/JP2008/062850 mailed Aug. 26, 2008.
International Search Report for PCT/JP2008/070566, mailed Dec. 9, 2008.
English translation of the International Search Report in PCT application PCT/JP2008/073578.
Office Action mailed Sep. 20, 2012 in U.S. Appl. No. 12/599,853.
Office Action mailed Nov. 30, 2012 in U.S. Appl. No. 12/746,816.

* cited by examiner

F I G. 2
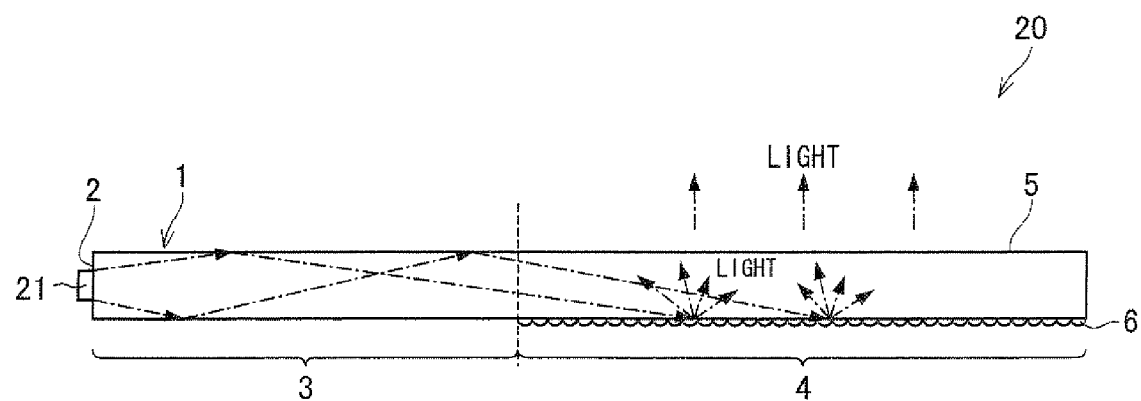

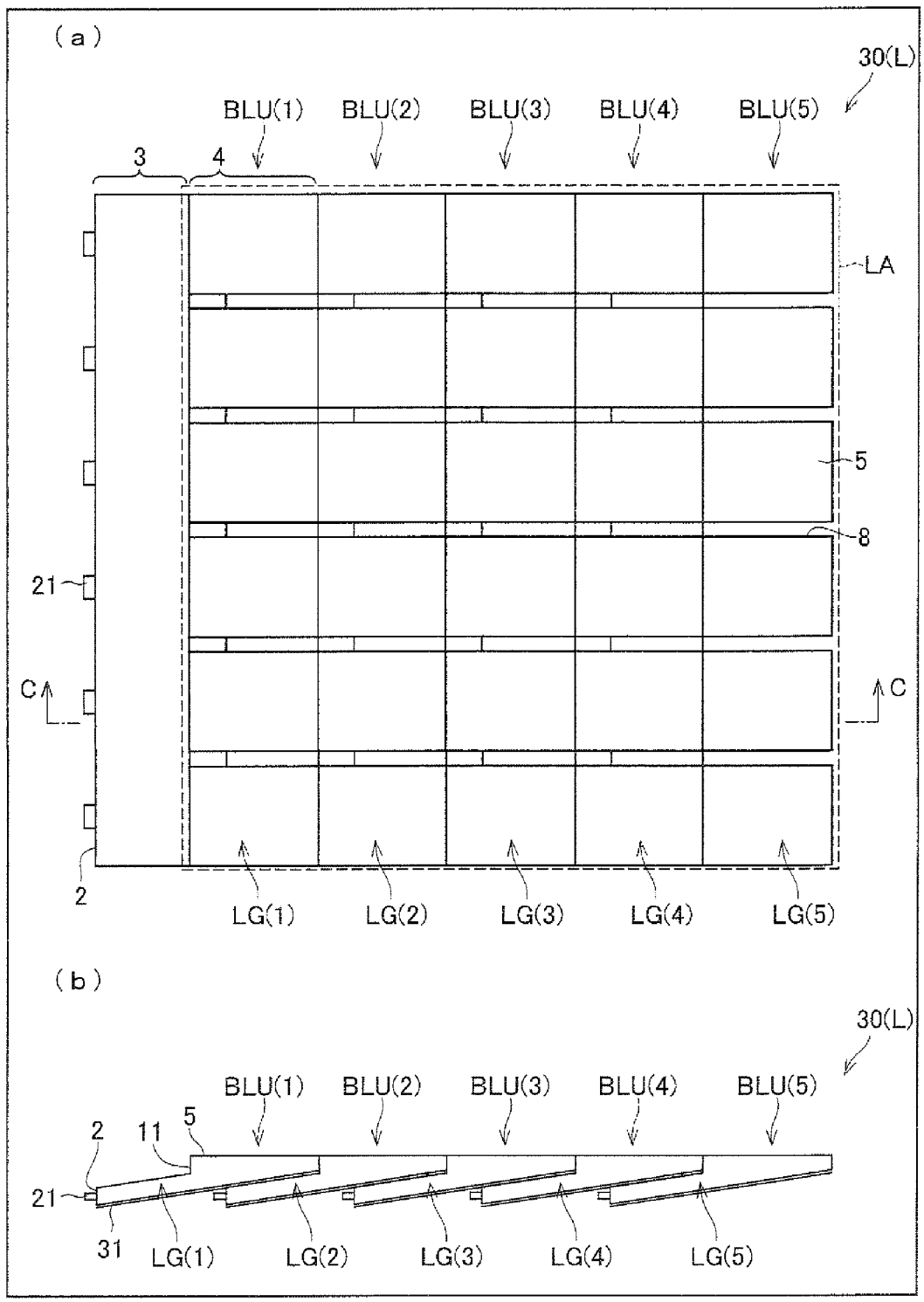

F I G. 1 2
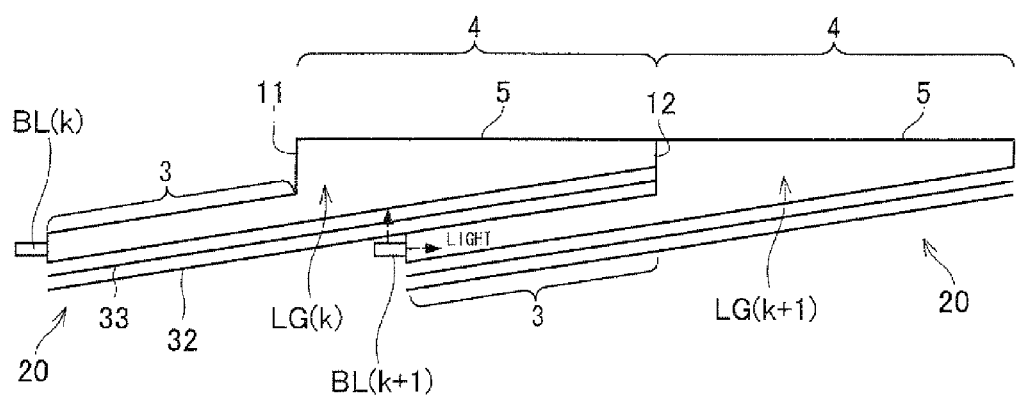

F I G. 2 1
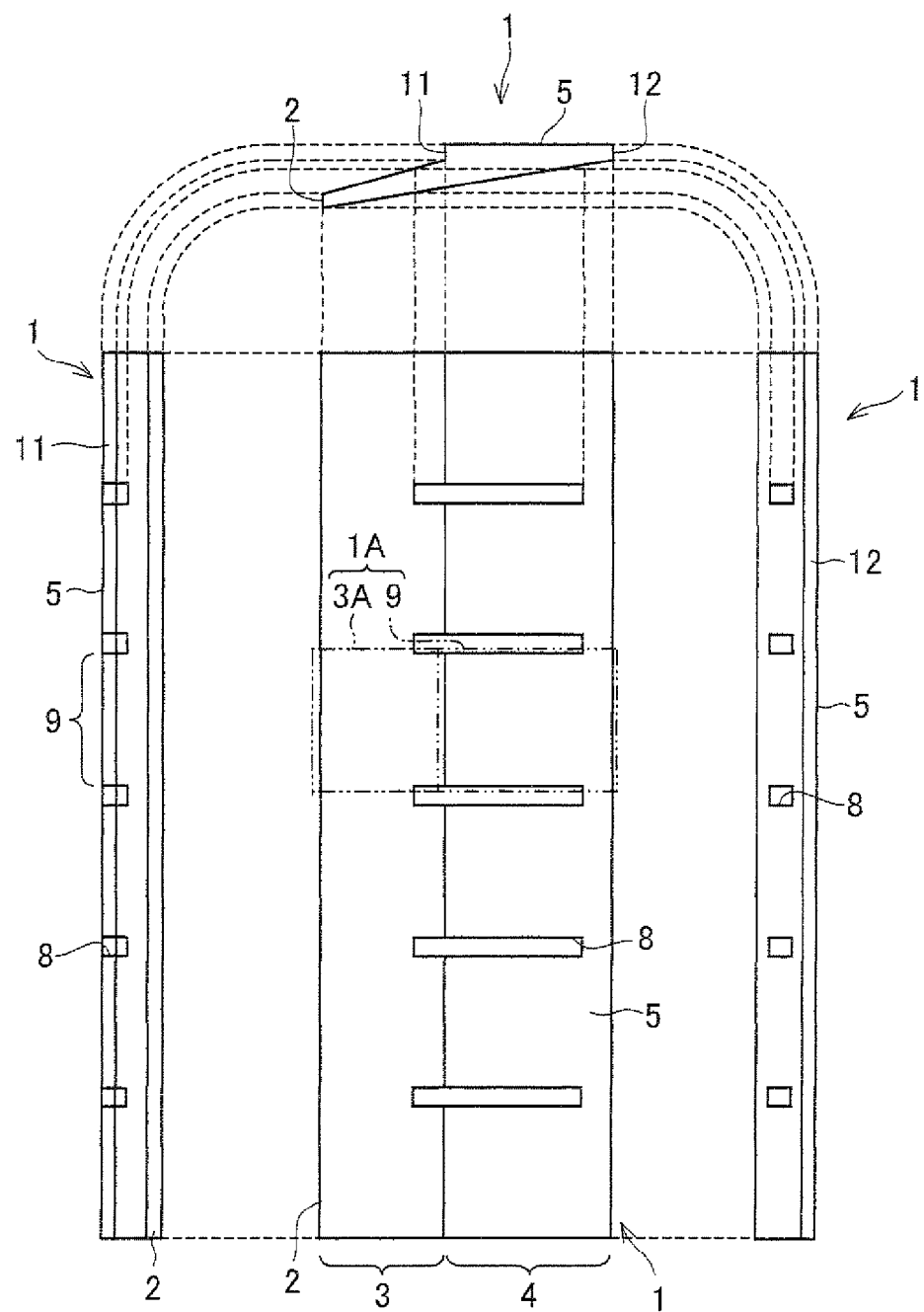

F I G. 2 8
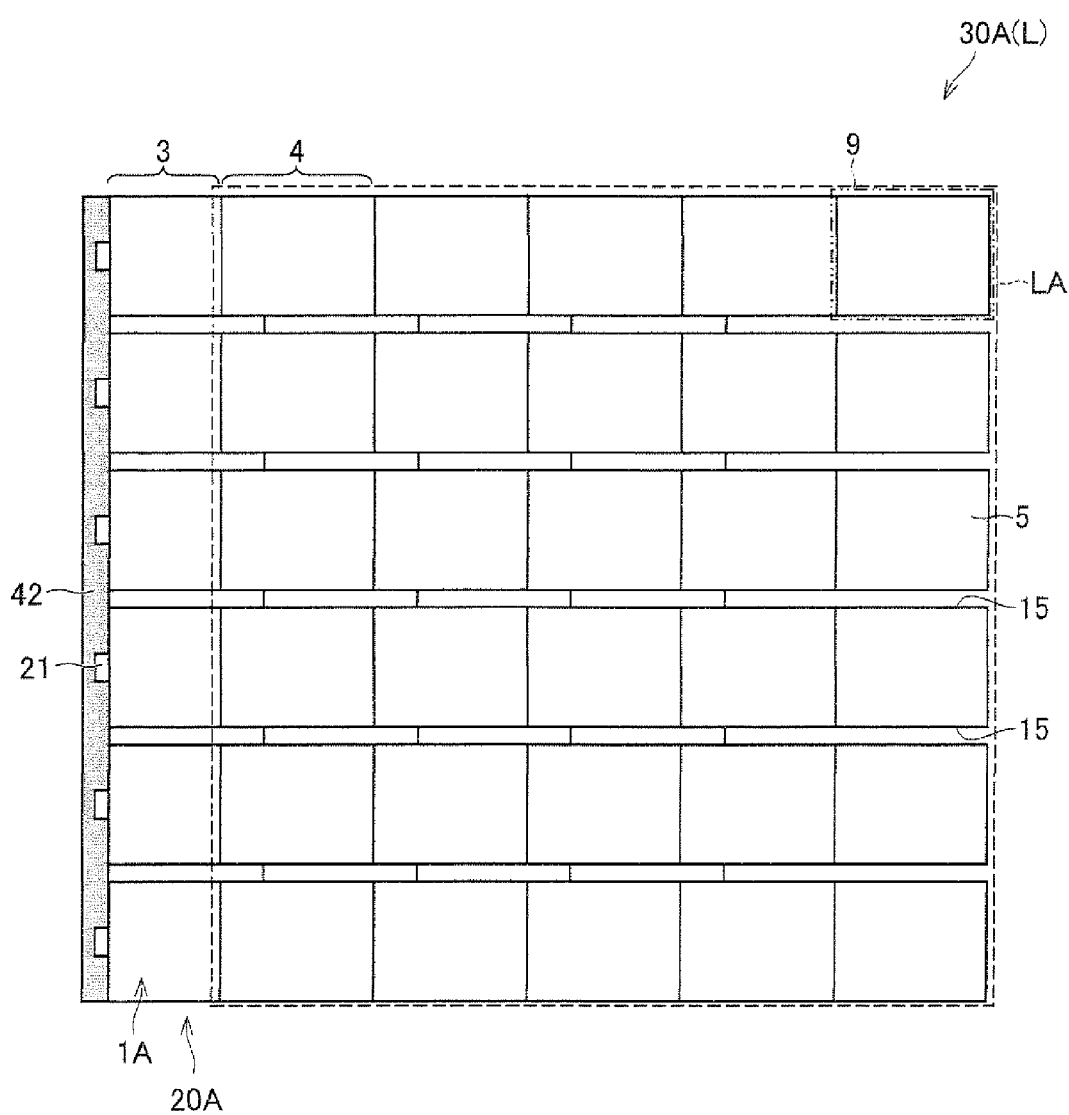

F I G . 3 8
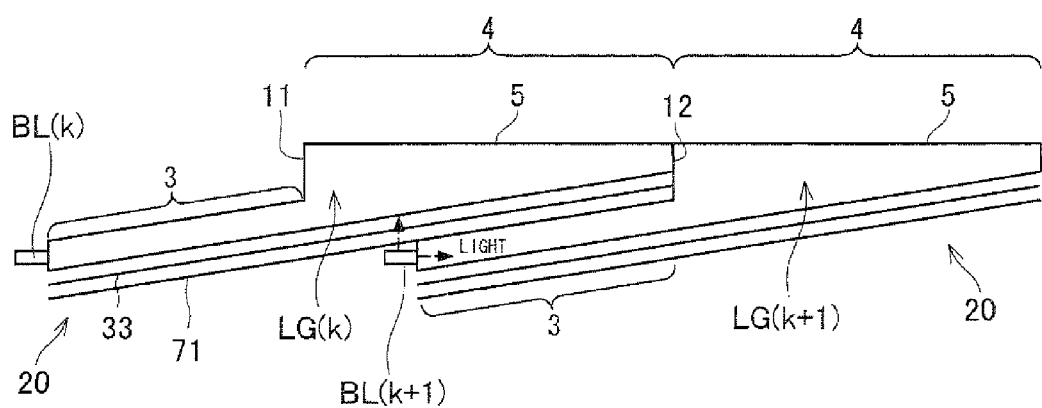

ILLUMINATION DEVICE AND DISPLAY DEVICE

This application is the U.S. national phase of International Application No. PCT/JP2008/063436 filed 25 Jul. 2008, which designated the U.S. and claims priority to JP Application No. 2007-196662 filed 27 Jul. 2007; and JP Application No. 2008-143752 filed 30 May 2008; the entire contents of each of which are hereby incorporated by reference.

TECHNICAL FIELD

The technology presented herein relates to a low-profile illumination device capable of area-active drive and a display device using the illumination device.

BACKGROUND ART

In recent years, liquid crystal display devices, which have spread rapidly to take the place of cathode-ray tubes (CRTs), have been widely used in liquid crystal televisions, monitors, mobile phones, and the like thanks to their energy-saving, low-profile, lightweight features, etc. An example of a method for further exploiting these features is to improve an illumination device (so-called backlights) that is disposed in the back of a liquid crystal display device.

Illumination devices are classified broadly into side-light backlights (referred to also as "edge-light backlights") and direct backlights. A side-light backlight is configured to have a light guide plate provided behind a liquid crystal display panel and a light source provided on an end face (lateral end) of the light guide plate. A beam of light emitted from the light source is reflected by the light guide plate to uniformly illuminate the liquid crystal display panel indirectly. This construction makes it possible to realize an illumination device low in luminance but capable of being made thinner and excellent in uniformity of luminance. Therefore, side-light illumination devices are employed mainly in small-to-medium-sized liquid crystal displays such as those used in mobile phones and laptop computers.

Meanwhile, a direct illumination device has a plurality of light sources arranged behind a liquid crystal display panel to illuminate the liquid crystal display panel directly. Therefore, direct illumination devices are employed mainly in large-sized liquid crystal displays of 20 inches or larger. However, the existing direct illumination devices are as thick as approximately 20 mm to 40 mm, thus hindering further reductions in thickness of displays.

Accordingly, an attempt has been made to reduce the thickness of a large-size liquid crystal display by arranging a plurality of side-light illumination devices (e.g., see Patent Literatures 1 and 2).

Each of the illumination devices (surface light source devices) described in Patent Literatures 1 and 2 has light guide plates, which is plate-like light guide blocks, joined together one after another along the direction of primary light (longitudinal direction), thereby having a tandem construction including primary light sources that supply primary light to their respective light guide blocks. Such an illumination device configured by arranging a plurality of light-emitting units (light source units) each constituted by combining a light source and a light guide plate is referred to generally as "tandem illumination device".

CITATION LIST

Patent Literature 1
Japanese Patent Application Publication, Tokukaihei, No. 11-288611 A (Publication Date: Oct. 19, 1999) (Corresponding U.S. Pat. No. 6,241,358 (Registration Date: Jun. 5, 2001))
Patent Literature 2
Japanese Patent Application Publication, Tokukai, No. 2001-312916 A (Publication Date: Nov. 9, 2001) (Corresponding United States Patent Application Publication No. 2001/017774 (Publication Date: Aug. 30, 2001))
Patent Literature 3
Japanese Patent Application Publication, Tokukai, No. 2002-99250 A (Publication Date: Apr. 5, 2002)

SUMMARY

Generally, such a tandem illumination device having light guide plates disposed in such a way as to be overlapped has side light-emitting light sources disposed in an light-entering section (i.e., on an end face) of each light guide plate.

For example, in the case of a light guide plate having a side light-emitting LED (light-emitting diode) disposed on an end face thereof, the side direction of the LED (i.e., the in-plane direction of the LED) is the principal light-emitting direction of the LED. However, there exists no little light that is emitted toward a higher position than the LED, such as light leaking from an LED package or light leaking from space between the LED and the light guide plate.

For this reason, a highly light-blocking reflecting sheet is required for the elimination of uneven irradiation as a backlight.

Further, light emitted in the side direction as described above is guided through the light guide plate, and is emitted from a light-emitting surface of the light guide plate. In this case, when the reflecting sheet is a so-called diffuse reflection sheet, in-plane luminance uniformity and color-mixing properties are improved.

Reflecting sheets that are currently mass-produced are classified broadly into white diffuse reflection sheets and specular reflection sheets made of silver, aluminum, or the like.

However, the diffuse reflection sheets are not very strong in light-blocking properties. Meanwhile, the specular reflection sheets are high in light-blocking properties, but reflect light at an angle equal to the angle of incidence of incident light, and differ in function from the diffuse reflection sheets, which reflect light randomly. For this reason, it is difficult for the currently mass-produced reflecting sheets to satisfy both a reduction in such uneven irradiation as described above and an improvement in luminance uniformity and color-mixing properties.

The present technology has been made in view of the foregoing problems, and provides: a tandem illumination device, having light guide plates disposed in such a way as to be overlapped, which can suppress uneven irradiation and improve luminance uniformity and color-mixing properties; and a display device using the illumination device.

In order to attain the above, an illumination device includes a plurality of light source units each having a light guide plate and at least one light source, the light guide plate having an illumination region through which an incident beam of light from the at least one light source is emitted outward and a light guide region through which the incident beam of light from the at least one light source is guided toward the illumination region, with the illumination region and the light guide region laid side-by-side, light source units adjacent to each other along a direction of an optical axis of the at least one light source being disposed so that the illumination region of one of the light source units covers at least a part of the light guide region of the other light source unit, a first functional sheet having reflectivity and a second functional sheet having a light-blocking property being provided between the light guide plate of the one of the light source units and the at least one light source of the other light source unit in such a way as to be put on top of each other, the first functional sheet being a diffuse reflection sheet, the second functional sheet being a specular reflection sheet or a light absorption sheet.

Further, in order to attain the above, an illumination device includes a plurality of light source units each having a light guide plate and at least one light source, the light guide plate having an illumination region through which an incident beam of light from the at least one light source is emitted outward and a light guide region through which the incident beam of light from the at least one light source is guided toward the illumination region, with the illumination region and the light guide region laid side-by-side, light source units adjacent to each other along a direction of an optical axis of the at least one light source being disposed so that the illumination region of one of the light source units covers at least a part of the light guide region of the other light source unit, a first functional layer having reflectivity and a second functional layer having a light-blocking property being provided between the light guide plate of the one of the light source units and the at least one light source of the other light source unit in such a way as to be put on top of each other, the first functional layer being a diffuse reflection layer, the second functional layer being a specular reflection layer or a light absorption layer.

A beam of light emitted from a light source enters a light guide plate paired with the light source to constitute the same light source unit. However, there exists no little light that is emitted (leaked) toward a higher position than the light source.

Therefore, in order to avoid a problem that is caused by such light emitted (leaked) toward a higher position than a light source, it is desirable that a reflecting sheet be provided between the at least one light source of the one of the light source units and the light guide plate of the other light source unit. However, among the currently mass-produced reflecting sheets, the diffuse reflection sheets are high in reflectance but inferior in light-blocking properties, and the specular reflection sheets are high in light-blocking properties but not sufficient in reflectance.

The second functional sheet or second functional layer is a highly light-blocking sheet or layer that puts emphasis on light-blocking properties and is responsible mainly for a light-blocking function. Further, the first functional sheet or first functional layer is a highly reflective sheet or layer that puts greater emphasis on reflexivity than on light-blocking properties and is responsible mainly for a reflecting function.

Each of the foregoing configurations brings about a synergistic effect of the first functional sheet or first functional layer diffusing light and the second function sheet or second function layer blocking leakage of light emitted from the at least one light source. The synergistic effect makes it possible to reduce uneven irradiation, improve uniformity in luminance, and remarkably improve the color-mixing effect.

Further, in order to attain the above, a display device includes a display panel and such an illumination device.

The illumination device makes it possible to improve efficiency in the use of light, improve luminance uniformity and color-mixing properties, and sufficiently reduce uneven irradiation that is caused by light emitted or leaked toward a higher position than a light source.

Therefore, the foregoing configuration makes it possible to provide a display device capable of realizing sufficient luminance and excellent uniformity in luminance.

BRIEF DESCRIPTION OF DRAWINGS

FIG. 2 is a cross-sectional view of the light source unit taken along the line B-B of (a) of FIG. 1.

FIG. 11 shows (a) a plan view schematically showing the configuration of the illumination device of FIG. 10 and (b) a cross-sectional view of the illumination device taken along the line C-C of (a) of FIG. 11.

FIG. 12 is a cross-sectional view of a main part of an illumination device in accordance with an embodiment with two types of reflecting sheet provided between overlapped light guide plates.

FIG. 21 juxtaposes a front view, left-side view, plan view, and right-side view of the light guide plate of FIG. 20.

FIG. 28 is a plan view schematically showing an example of the configuration of a tandem illumination device, used in the liquid crystal display device of FIG. 25, in which a plurality of light source units of FIGS. 23 and 24 are partially overlapped with offsets.

FIG. 38 is a cross-sectional view of a main part of an illumination device in accordance with an embodiment with a reflecting sheet and a light absorption sheet provided between overlapped light guide plates.

REFERENCE SIGNS LIST

Figure 1:
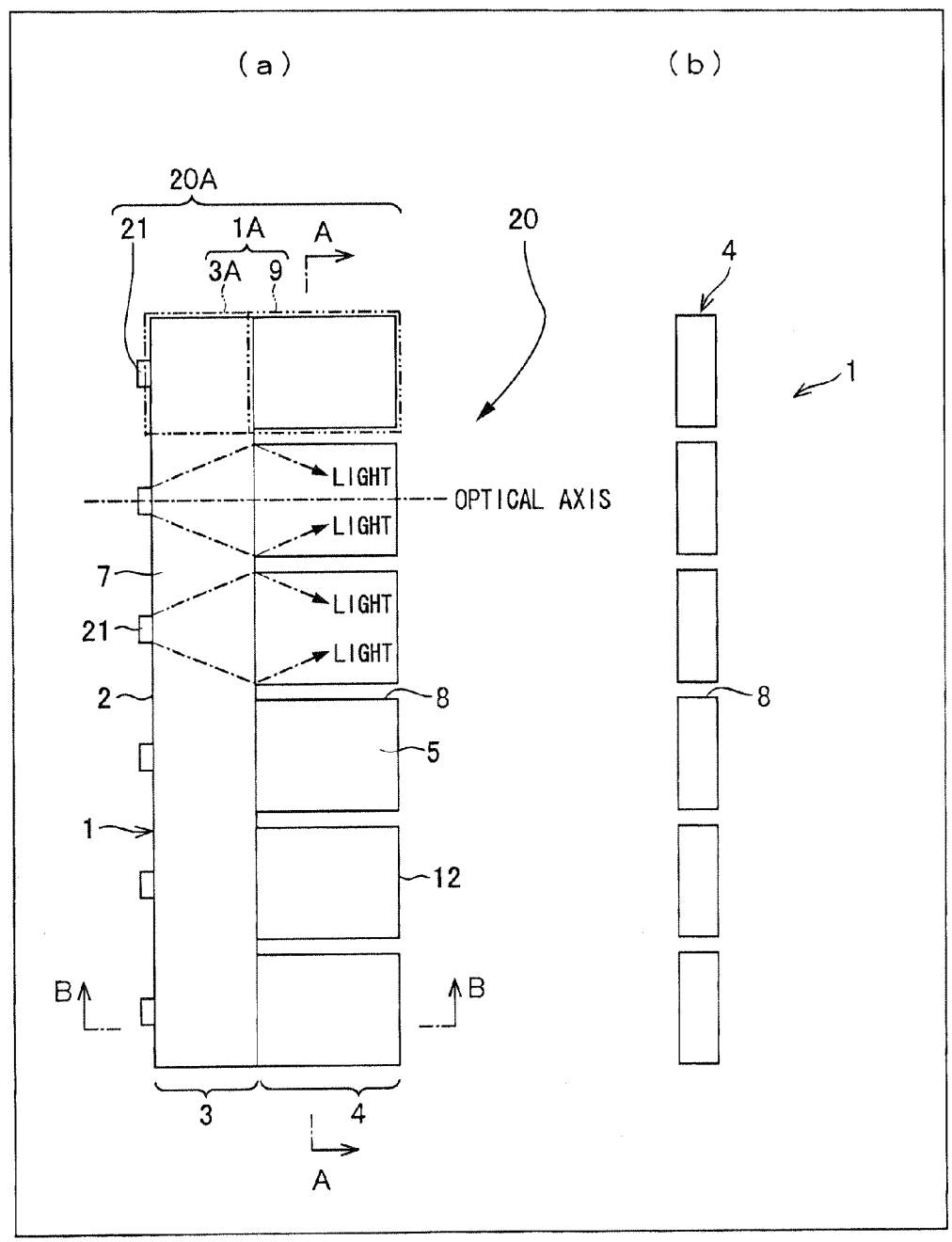
FIG. 1 shows (a) a plan view schematically showing the configuration of a light source unit in accordance with an embodiment and (b) a cross-sectional view of a light guide plate of the light source unit taken along the line A-A of (a) of FIG. 1.

1 Light guide plate
1A Light guide block
2 Light-entering end face
3 Light guide region
3A Light guide section
4 Illumination region
5 Light-emitting surface
6 Structure
7 Dead area
8 Slit section (divider)
9 Light-emitting section
11 Step section
12 Apical surface
13 Groove section (divider)
14 Scattering member (divider)
15 End face
16 Low refractive index layer (divider)
20 Light source unit
20A Light source block
21 Light source
22 LED chip
23 LED chip
24 LED chip
30 Illumination device
30A Illumination device
30A Light-blocking body (light-blocking member)
32 Specular reflection sheet (second functional sheet, second functional layer)
33 Diffuse reflection sheet (first functional sheet, first functional layer)
34 Lighting control circuit
40 Liquid crystal display device
41 Liquid crystal panel (display panel)
42 Substrate
43 Optical sheet
44 Maximum grayscale level detection circuit
45 Grayscale conversion circuit
50 Y/C separation circuit
51 Video chroma circuit
52 A/D converter
53 Liquid crystal controller
54 Backlight drive circuit
55 Microcomputer
56 Gradation circuit
60 Tuner section
61 First housing
61a Opening
62 Second housing
63 Operation circuit
64 Supporting member
71 Light absorption sheet (second functional sheet, second functional layer)
BL Light source
BLU Light source unit
L Illumination device
LA Light-emitting surface
LG Light guide plate

DESCRIPTION OF EMBODIMENTS

Embodiment 1

An embodiment is described below with reference to (a) and (b) of FIG. 1 through FIG. 14 and FIGS. 32 and 36 through 38.

FIG. 1 shows (a) a plan view schematically showing the configuration of a light source unit in accordance with the present embodiment and (b) a cross-sectional view of a light guide plate of the light source unit taken along the line A-A of (a) of FIG. 1. FIG. 2 is a cross-sectional view of the light source unit taken along the line B-B of (a) of FIG. 1

As shown in (a) of FIG. 1, a light source unit 20 in accordance with the present embodiment includes a light guide plate 1 (light guide body) and a plurality of light sources 21 (point light sources) provided on one end face of the light guide plate 1.

The light source unit 20 is a side-light light source unit (surface light source unit) that emits (surface radiation), from one principal surface (board face) thereof, light arriving at that end face of the light guide plate 1 on which the light sources 21 are provided.

The following describes each of the components. In the following description, for convenience of explanation, that principal surface of the light guide plate 1 through which light is emitted is referred to as "upper surface" or "top surface", and the opposite principal surface is referred to as "lower surface" or "bottom surface".

The light guide plate 1 receives light through a light-entering end face 2 (light-incident end face), which is an end face facing the light sources 21, deflects (reflects) the light inside thereof, and emits the light through part of the upper surface thereof.

The light guide plate 1 is made, for example, of a transparent resin such as a (meth)acrylic resin such as PMMA (methyl methacrylate resin), a COP (cycloolefin polymer) such as "ZEONOR" (registered trademark; manufactured by Zeon Corporation), a COC (cycloolefin copolymer), or polycarbonate. However, the light guide plate 1 is not limited in material to those exemplified above, and can be made of any material that is commonly used for a light guide plate. It is possible to apply a transparent resin without any particular limitation, for example, as well as those exemplified above.

The light guide plate 1 has two regions along the direction of an optical axis. The two regions have different functions. The term "direction of an optical axis" here means the direction of the central axis of a beam of light emitted (radiated) from each light source 21. In the present embodiment, the term "direction of an optical axis of a beam of light emitted from each light source 21" means a direction perpendicular to a light-emitting surface of the light source 21, i.e., a direction perpendicular to the light-entering end face 2. Therefore, the light guide plate 1 has the two regions along the principal surfaces.

As shown in (a) of FIG. 1 and FIG. 2, the light guide plate 1 as seen in a two-dimensional view includes a light guide region 3 and an illumination region 4 arranged in this order from the light-entering end face 2. This allows the light guide plate 1 to emit light outward not through the whole of one principal surface thereof, but through part of the principal surface. In the present embodiment, the phrase "light guide plate 1 as seen in a two-dimensional view" is synonymous with the phrase "light guide plate 1 as seen from above (from a direction perpendicular to the principal surface)".

The light guide region 3, which has the light-entering end face 2 as a light-receiving surface, receives light through the light-entering end face 2 and guides the light toward the illumination region 4 along the principal surfaces.

Meanwhile, the illumination region 4 has a light-emitting surface 5, disposed on an upper surface thereof in such a way as to face an irradiated surface of an irradiated body, through which light is emitted outward (toward the irradiated surface of the irradiated body). The illumination region 4 causes light guided from the light guide region 3 to be emitted through the light-emitting surface 5.

As shown in FIG. 2, the light guide region 3 and the illumination region 4 are provided integrally. However, that region of the bottom surface of the light guide plate 1 which corresponds to the illumination region 4 is subjected to a process or treatment for causing light guided from the light guide region 3 to be emitted from the light guide plate through the light-emitting surface 5, e.g., is provided with a structure 6 (light-scattering member) shown in FIG. 2. Although the present embodiment is illustrated as a configuration in which the light guide plate 1 has the structure 6 provided on the bottom surface thereof, the present embodiment is not limited to this. Such a structure 6 as described above may be provided on at least either the top or bottom surface of the light guide plate 1 (i.e., on at least either the light-emitting surface 5 or a surface opposite thereto), or may be provided inside of the light guide plate 1, as long as it is provided in the illumination region 4.

Meanwhile, the light guide region 3 is not subjected to such a process or treatment. Light having entered the light guide region 3 through the light-entering end face 2 is guided toward the illumination region 4, for example, by being reflected by an interface of the light guide plate 1 with the outside.

For this reason, a beam of light having entered the light guide plate 1 from each light source 21 reaches the illumination region 4 through the light guide region 3, is scattered and reflected in the illumination region 4, and is emitted from the light guide plate 1 through the light-emitting surface 5.

Examples of the process or treatment to which the illumination region 4 is subjected include prism processing, SHIBO processing, and print processing. However, the present embodiment is not limited to this. The process or treatment can be appropriately realized by a publicly-known process or treatment that has conventionally been performed on a light guide plate to cause the light guide plate to emit light.

Therefore, the structure 6, which is formed in the illumination region 4 of the light guide plate 1 by the process or treatment, may be, for example, a structure having a finely uneven shape (SHIBO shape) or a prismatic shape, or may be a dot pattern formed by printing or the like. The structure 6 is not limited to those exemplified above. Any structure (light-scattering member) that has a light-scattering function of sending light out of the light guide plate 1 is regarded as a target for adoption.

The density of the structure 6 may be constant, or may vary according to the distance from the light sources 21 or the amount of light that is emitted by the light-emitting surface 5 of the light guide plate 1. For example, the luminance can be equalized within the light-emitting surface 5 by increasing the density or area of the structure 6 with distance from the light sources 21.

Meanwhile, since the light guide region 3 is not subjected to such a process or treatment, a beam of light emitted from each light source 21 is guided toward the illumination region 4 without being substantially emitted outward from the light guide region 3, for example, by being reflected by an interface of the light guide region 3 with the outside. However, for example, for the purpose of more surely suppressing leakage of light, effectively reusing the light reflected by the interface, and thereby suppressing attenuation of light, the light guide region 3 may be covered with light-blocking sheets, such as reflecting sheet, provided as needed on the top and bottom surfaces thereof, or may have a mirror finish given to the top and bottom surfaces thereof.

In the following, the reason why the light guide plate 1 is provided with the light guide region 3 is explained with reference to (a) of FIG. 1.

As mentioned above, in order to achieve reductions in thickness and size of the device, the light guide unit 20 in accordance with the present embodiment has a side-light-type construction while having, for example, point light sources as the light sources 21.

It should be noted that no light guide plate is used in the case of use of a direct illumination device having light sources directly below a light-emitting surface. A beam of light emitted from each light source enters a diffuser. The diffuser has no difference between a light guide region and an illumination region. A beam of light emitted from each light source provided on the undersurface of the inside of the diffuser is diffused inside of the diffuser and emitted through a surface opposite the light source. For this reason, in cases where the diffuser is small in thickness, the region where the light sources are disposed becomes brighter than other regions. Accordingly, in order to sufficiently mix colors of light (mix beams of light) emitted from the light sources, it is necessary to ensure the light guide distance from the light sources to the light-emitting surface by increasing the thickness of the diffuser. For this reason, in the case of a direct-type construction, the device cannot be reduced in thickness or size.

For this reason, as described above, the present embodiment employs a side-light-type construction while using point light sources as the light sources 21.

However, in cases where the light sources 21 are realized by point light sources as described above, a beam of light that is emitted from each light source 21 is emitted at a given angle, and therefore is limited in angle of emission. For this reason, in the vicinity of each light source 21, there exists a dark shady place (hereinafter referred to as "dead area") 7 that is not reached (illuminated) by light due to the directivity of the light source 21.

Accordingly, in order to equalize the luminance of light that is emitted from the light-emitting surface 5, the present embodiment uses, as the light guide region 3, a region containing such dead areas 7. This allows a beam of light emitted from each light source 21 to be surface-radiated from the light-emitting surface 5 after being sufficiently diffused in the light guide region 3, without using the dead areas 7 as the illumination region 4.

That is, the present embodiment ensures the light guide distance from the light sources 21 to the light-emitting surface 5 along a direction parallel to the light-emitting surface 5 by providing the light guide region 3 along the principal surfaces of the light guide plate 1 between the light sources 21 or the light-entering end face 2 and the illumination region 4. This makes it possible to improve uniformity in luminance without increasing the thickness of the light guide plate 1, thus making it possible to provide a light source unit 20 whose light-emitting surface 5 has no dark place.

It should be noted that the light guide region 3 functions also as a color mixing section (light mixing section) that mixes colors of light (beams of light) emitted from the light sources 21. In this way, white illumination can be obtained by mixing colors of light emitted from monochromatic LED (light-emitting diode) that emits different colors of light, e.g., R (red), G (green), and B (blue).

The following describes the construction of the illumination region 4.

As shown in (a) and (b) of FIG. 1, the light guide plate 1 in accordance with the present embodiment is constructed such that the illumination region 4 is divided into a plurality of regions (hereinafter referred to as "light-emitting sections") 9 by providing dividers that restrict transmission of light. The dividers are provided in such a way as to extend along the direction of the optical axis of a beam of light that is emitted from each light source 21.

That is, as shown in (a) of FIG. 1, the light guide plate 1 includes: a plurality of light guide blocks 1A of prior art arranged one-dimensionally; a light guide region 3 in which the light guide sections 3A of adjacent light guide blocks 1A are connected to each other; and an optical divider provided the space between adjacent light-emitting sections 9. Further, the light source unit 20 is constructed such that a plurality of light source blocks 20A each composed of such a light guide block 1A and a light source 21 are connected by light guide sections 3A as described above.

In the present embodiment, the illumination region 4 of the light guide plate 1 is provided with slit sections 8 (slits) serving as the dividers to pass through the top and bottom surfaces of the light guide plate 1. The dividers are provided in such a way as to extend from one end of the illumination region 4 to the other (i.e., from a boundary section of the illumination region 4 with the light guide region 3 to an apical surface 12, which is an end face opposite to the light-entering end face 2) in parallel with the direction of the optical axis of a beam of light that is emitted from each light source 21. This allows the illumination region 4 to include the plurality of light-emitting sections 9 divided along a direction perpendicular to the light-entering end face 2. Further, the light guide plate 1 is constructed such that the plurality of light-emitting sections 9 as seen in a two-dimensional view are arranged in the form of teeth of a comb with respect to the light guide region 3.

In (a) and (b) of FIG. 1, the number of slit sections 8 is not particularly limited as long as the illumination region 4 can be divided into areas. That is, the number of regions is not particularly limited as long as the illumination region 4 is divided into two or more regions by providing at least one slit section 8. Further, the size of one light-emitting section 9 divided from another by a slit section 8 is not particularly limited, either.

The light sources 21 provided on the end face of the light guide plate 1 are provided in one-to-one correspondence with the light-emitting sections 9 in such a way as to correspond to the respective light-emitting sections 9 divided from one another by the slit sections 8. Thus, beams of light emitted from the light sources 21 provided on the end face of the light guide plate 1 are guided toward the respective light-emitting sections 9 divided from one another by the slit sections 8.

Reflection by the slit sections 8 is caused in the illumination region 4 by forming the slit sections 8 in the illumination region 4. All of the light that strikes a slit section 8 at an angle that satisfies a condition of angle of total reflection is reflected. It should be noted that the "angle that satisfies the condition of angle of total reflection" means an angle that exceeds a critical angle θ, which is the minimum angle of incidence at which total reflection is attained. Part of the light that does not satisfy the condition of angle of total reflection leaks into an adjacent light-emitting section 9, and in cases where a slit section 8 is not provided, all of the light that has entered a region corresponding to the slit section 8 is transmitted through the region. For this reason, the provision of a slit section 8 makes it possible to restrict a region of emission of a beam of light emitted from each light source 21. Therefore, the present embodiment makes it possible to, by independently adjusting the light intensity of a light source 21 corresponding to each light-emitting section 9 (independent drive), independently adjust the amount of light that is radiated from each light-emitting section 9. This makes it possible to independently adjust the illumination luminance of each separate light-emitting section 9. Further, the complete division of the illumination region 4 by the slit sections 8 brings about an advantage of enhancing contrast between adjacent light-emitting sections 9.

In this way, the light guide plate 1 has a plurality of independent light-emitting sections 9 while being a single light guide plate. Therefore, for example, in cases where the light source unit 20 is used for an illumination device in a display device such as a liquid crystal display device, it is preferable that the size of each light-emitting section 9 be equal to an integral multiple of a single pixel. This makes it possible to control the luminance of each separate pixel unit or pixel array. However, the size of each light-emitting section 9 is not limited to this, and may be appropriately set in accordance with the size of the irradiated surface of the irradiated body.

The light guide plate 1 can be formed by injection molding, extrusion molding, thermal press molding, cutting work, or the like. However, the method for forming the light guide plate 1 is not limited to these molding methods. It is possible to apply any processing method that can give the same properties.

Further, the method for forming the slit sections 8 is not particularly limited, either. The slit sections 8 may be formed, for example, by molding at the same time as the light guide plate 1 is formed, or may be formed with use of cutting means (severing means) after a slitless light guide plate 1 is formed.

Further, the cutting means is not particularly limited, either. For example, it is possible to apply various severing means such as diamond cutters, wire cutters, water cutters, blades, and lasers. In such a case that slits are formed in a slitless light guide plate 1 with use of cutting means after the light guide plate 1 is formed, it is possible to make a plurality of slitless light guide plates 1 into a neat pile and form slits in the pile of slitless light guide plates 1 at the same time.

In the present embodiment, the slit sections 8 are not particularly limited in width. However, substantially no light is emitted from the slit sections 8. For this purpose, it is preferable that the slit sections 8 be as small as possible in width. The width of each slit section 8 is preferably set to be not more than 1 mm.

Further, it is desirable that the length of the light guide region 3 along the direction of the optical axis of a beam of light that is emitted from each light source 21 be set to be not less than the length of each dead area 7 along the direction of the optical axis of a beam of light that is emitted from each light source 21.

However, the longer the light guide region 3 becomes, the larger the light guide plate 1 becomes in size (in area). Further, depending on the length of the light guide region 3, there is a danger that a beam of light emitted from a light source 21 toward a light-emitting section 9 belonging to the same light guide block 1A as the light source 21 is diffused by the light guide region 3 and part of the beam of light enters an adjacent light-emitting section 9. For this reason, depending on the length of the light plate 3, there is a danger that the disposition of the structure 6, the calculation of the density of the structure 6, and the control of luminance for each light-emitting section 9 are complexified.

Therefore, it is preferable that a slit section 8 be provided in a region in each light source unit 20 where there is an overlap between regions that are irradiated by adjacent light sources 21. Preferably, a region up to the point where there is an overlap between beams of light emitted from adjacent light sources 21 (regions that are irradiated by adjacent light sources 21) is used as the light guide region 3.

Therefore, it is desirable that in accordance with the angle of radiation of a beam of light that is radiated from each light source 21, the refractive index of the material of which the light guide plate 1 is made, and the distance from the center of a given light source 21 to the center of an adjacent light source 21, and the width of each light-emitting section 9, the length of the light guide region 3 be appropriately set to satisfy the above conditions.

For example, in cases where the refractive index of a transparent resin constituting the light guide plate 1 falls within a range of 1.4 to 1.6 and the angle of radiation of a beam of light from each light source 21 is 42 to 45 degrees, it is desirable that the length of the light guide region 3 be set such that a region up to the point where there is an overlap between regions that are irradiated with beams of light radiated at the angle of radiation from adjacent light sources 21 serves as the light guide region 3.

That is, assuming that the length along the direction of an optical axis is defined as the length along the direction of the optical axis of a beam of light that is emitted from each light source 21, with the light-entering end face 21 as the origin, it is preferable that the length of the light guide region 3 along the direction of an optical axis be not less than the length of a dead area 7 by each light source 21 along the direction of an optical axis and not more than the length along the direction of an optical axis from the light-entering end face 2 to a point of intersection between regions that are irradiated by adjacent light sources 21. In other words, it is preferable that the length of the light guide region 3 be such that the size of a cross-section of a light flux emitted from a light source 21 and diffused radially in the light-emitting section 9 is not less than the size of the boundary between the light guide region 3 and the illumination region 4.

Further, it is preferable that the length along the direction of an optical axis from the light-entering end face 2 to each slit section 8 be not more than the length along the direction of an optical axis from the light-entering end face 2 to a point of intersection between regions that are irradiated by adjacent light sources 21.

Figure 3:
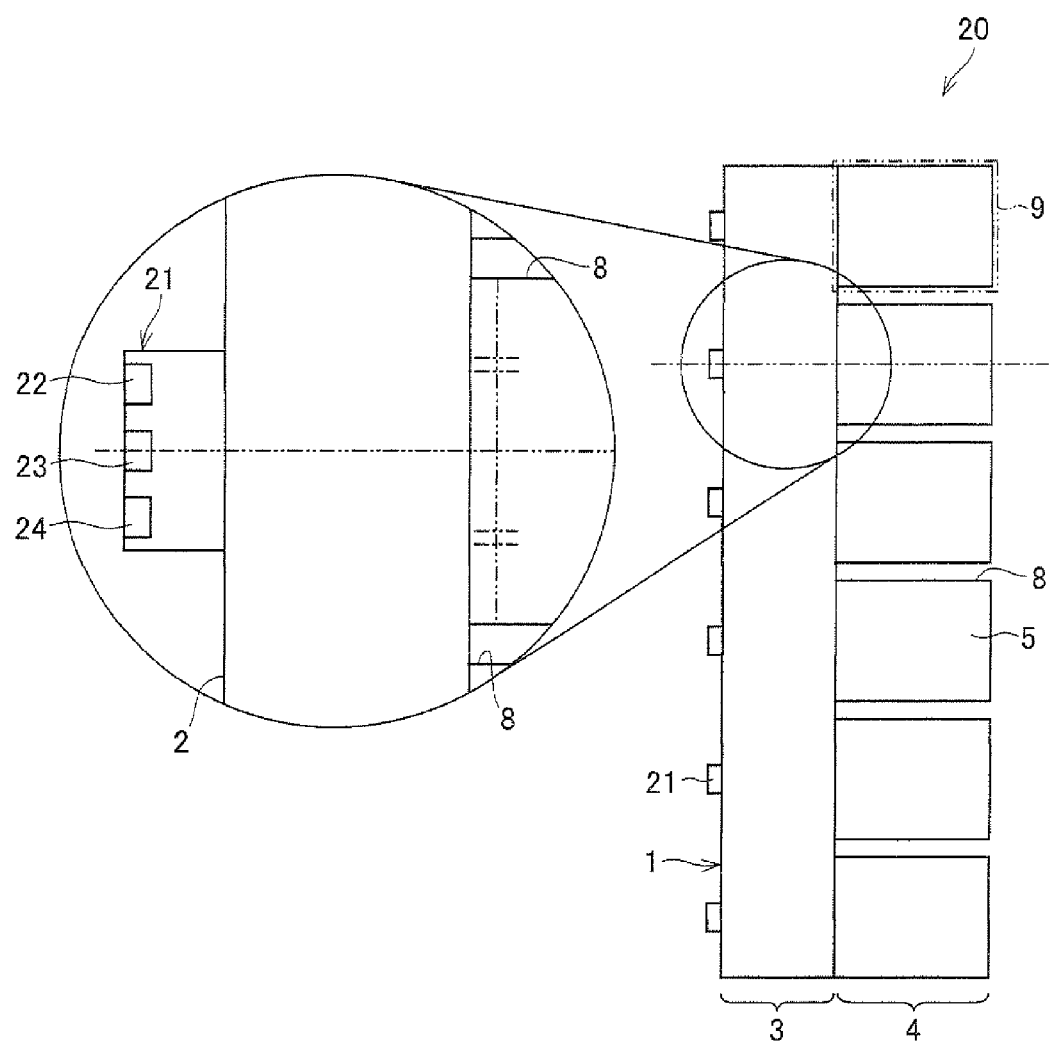
FIG. 3 is a plan view schematically showing the configuration of a light source unit in accordance with an embodiment with a light source of the light source unit enlarged.
Figure 4:
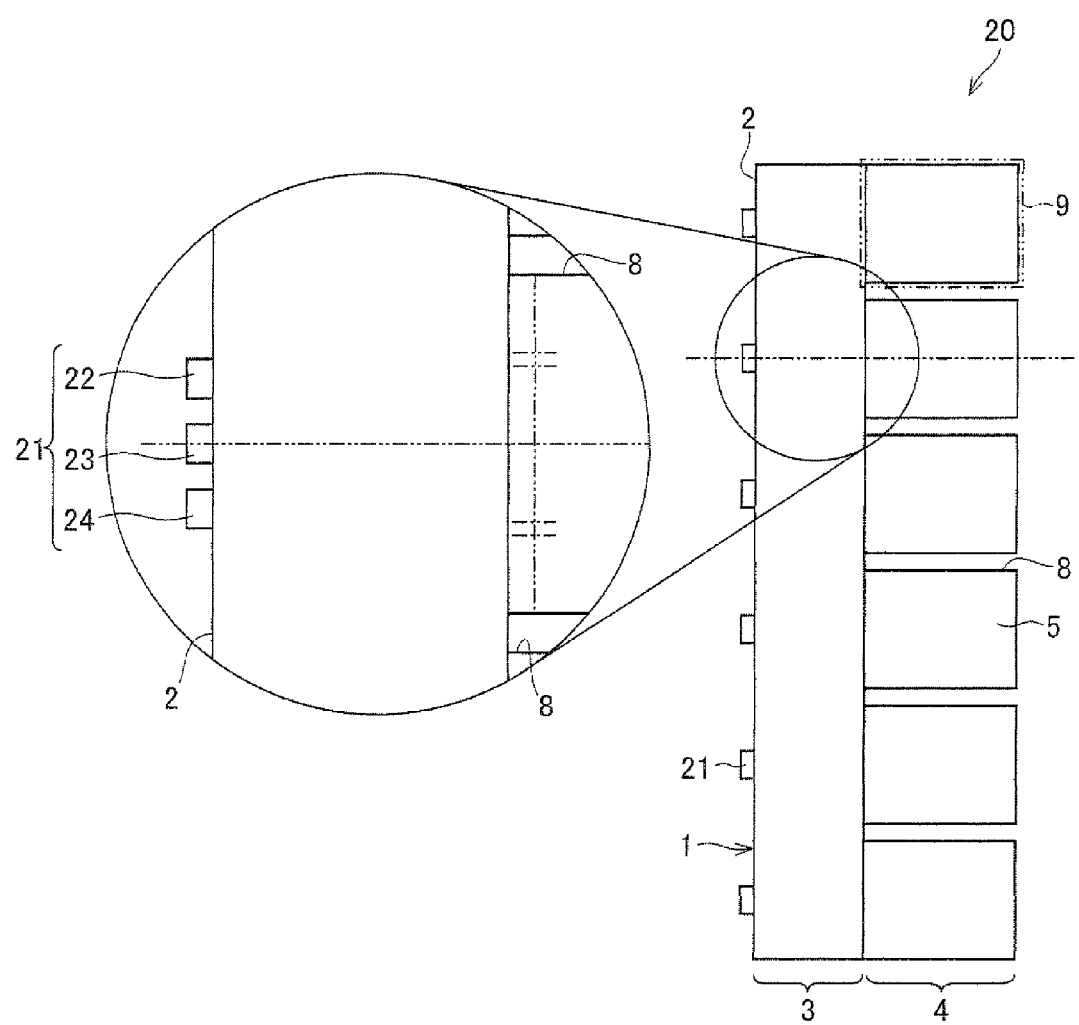
FIG. 4 is another plan view schematically showing the configuration of a light source unit in accordance with an embodiment with a light source of the light source unit enlarged.
Figure 5:
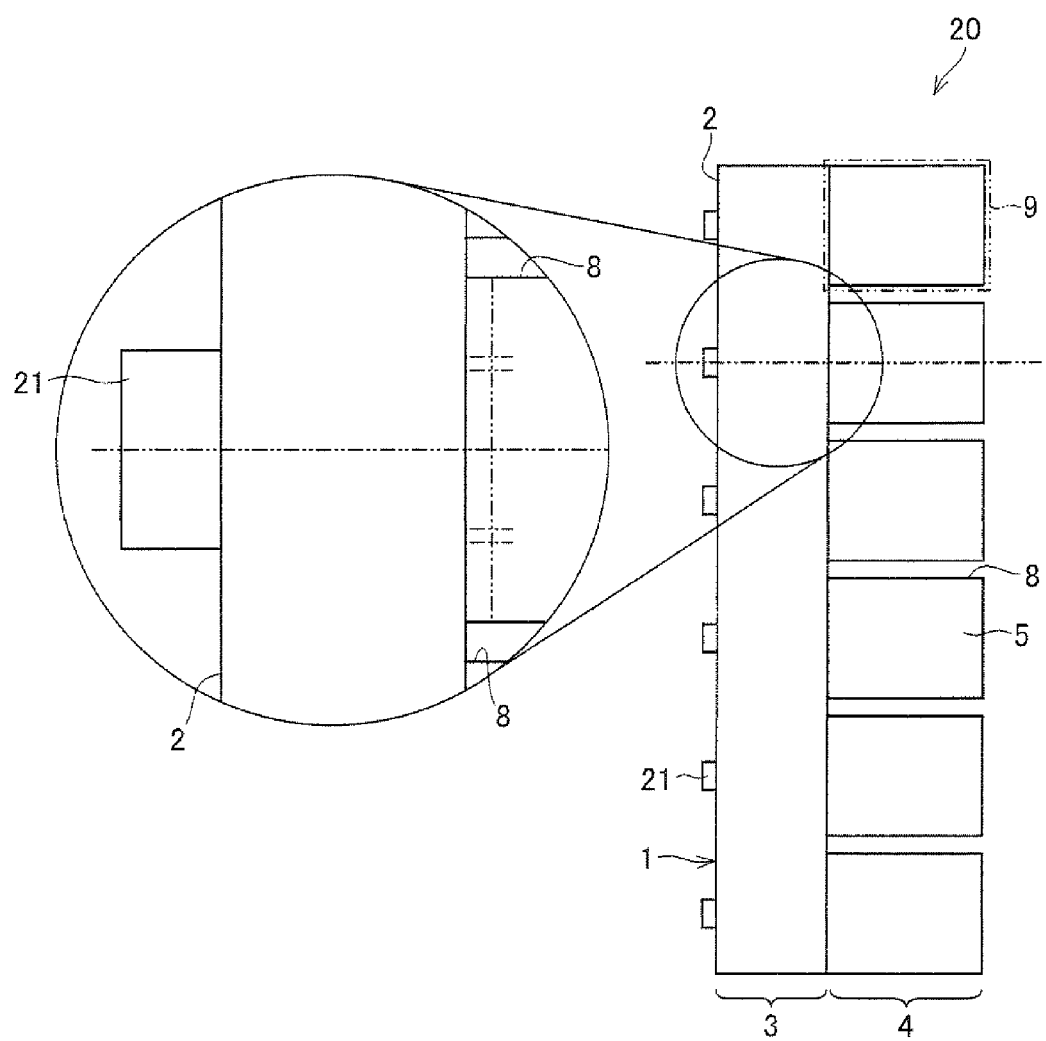
FIG. 5 is still another plan view schematically showing the configuration of a light source unit in accordance with an embodiment with a light source of the light source unit enlarged.

The following describes the light sources 21 with reference to FIGS. 3 through 5.

FIGS. 3 through 5 are each a plan view schematically showing the configuration of a light source unit 20 in accordance with an embodiment of the present invention with a light source 21 of the light source unit 20 enlarged.

The light sources 21 are point light sources such as side light-emitting LEDs, and the light sources 21 are aligned on the light-entering end face 2 of the light guide plate 1. The light sources 21 are provided in one-to-one correspondence with the light-emitting sections 9 of the illumination region 4 of the light guide plate 1.

In this case, it is desirable that each light source 21 be disposed so that its center is located on an extension of the central axis of the corresponding light-emitting section 9. This allows a beam of light emitted from the light source 21 to be guided toward the targeted light-emitting section 9 without entering a light-emitting section 9 adjacent to the targeted light-emitting section 9.

Further, it is preferable that each light source 21 be disposed as close as possible to the light guide plate Disposing each light source 21 close to the light guide plate 1 or in contact with the light guide plate 1 as shown in FIGS. 1 through 5 makes it possible to improve the efficiency with which light from each light source 21 enters the light guide plate 1.

Further, as shown in FIG. 3, the use as each light source 21 of a side light-emitting LED having R, G, and B LED chips 22, 23, and 24 molded into one package makes it possible to obtain a light source unit 20 having a wide range of color reproduction.

However, the present embodiment is not limited to this. As shown in FIG. 4, each light source 21 may be realized by a combination of R, G, and B LED chips 22, 23, and 24 molded into separate packages.

In the case of use of a combination of LED chips 22, 23, and 24, it is necessary to sufficiently diffuse the colors of light in order to obtain white light by mixing the colors of the LED chips 22, 23, and 24.

According to the present embodiment, as mentioned above, the provision of the light guide region 3 between the light sources 21 and the illumination region 4 makes it possible to sufficiently mix the colors of light (beams of light). Therefore, uniform white light can be obtained. It should be noted that the intensity of each of the LED chips 22, 23, and 24 and the order in which the LED chips 22, 23, and 24 are arranged are not particularly limited.

Further, as shown in FIG. 5, each light source 21 can be realized by a single LED (white light-emitting element) that emits white light. An example of a white light-emitting element is, but is not limited to, a white light-emitting element obtained by combining a blue LED and a yellow light-emitting fluorescent material.

The present embodiment has been described mainly by way of example where, as shown in FIG. 2, the light guide plate 1 is realized by a light guide plate in the shape of a plate having a light guide region 3 and an illumination region 4 that are (substantially) uniform in thickness. However, the shape of the light guide plate 1 is not limited to this.

The present embodiment uses a combination of a plurality of such light source units 20 as an illumination device in accordance with the present embodiment (such an illumination device being hereinafter referred to as "illumination device L").

Figure 6:
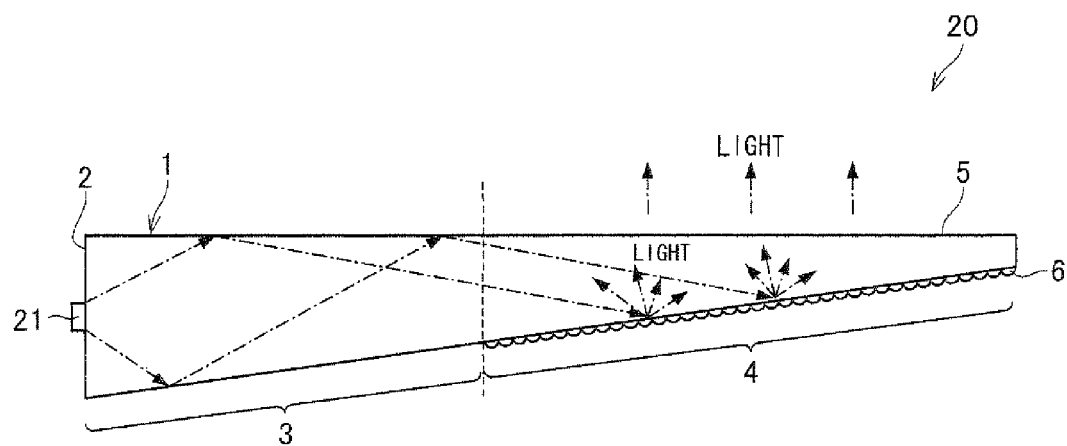
FIG. 6 shows another example of the shape of a light guide plate of the light source unit of (a) of FIG. 1 in the form of a cross-sectional view of the light source unit taken along the line B-B of (a) of FIG. 1.

FIG. 6 shows another example of the shape of a light guide plate 1 of the light source unit 20 of (a) of FIG. 1 in the form of a cross-sectional view of the light source unit 20 taken along the line B-B of (a) of FIG. 1.

The light guide plate 1 of the light source unit 20 of FIG. 6 is has a shape formed such that the light guide region 3 and the illumination region 4 are flush with each other without a step on the top or bottom surface and the thickness (width of the light guide plate 1 along a direction perpendicular to the light-emitting surface 5) becomes smaller as the distance from the light sources 21 becomes larger.

That is, the light guide plate 1 of FIG. 6 has a so-called wedged shape in which the bottom surface slopes with respect to the top surface and a cross-section of the light guide plate 1 along the direction of the optical axis of a beam of light that is emitted from each light source 21 has a tapered shape.

Since the light guide plate 1 is formed such that the thickness of the light guide plate 1 (especially, the thickness of the light guide plate 1 in the illumination region 4) becomes smaller as the distance from the light sources 21 becomes larger, the proportion (probability) of light that is scattered and reflected by the structure 6 can be increased with distance from the light sources 21.

For this reason, the light guide plate 1 of FIG. 5 makes it possible that although the amount of light that reaches from the light sources 21 becomes smaller as the distance from the light sources 21 becomes larger, the same level of emission intensity can be attained both in the parts of the illumination region 4 that are relatively far from the light sources 21 and the parts of the illumination region 4 that are relatively close to the light sources 21. This allows further uniformity in luminance.

Further, since the bottom surface of the light guide plate 1 slopes with respect to the top surface and the structure 6 provided on the bottom surface of the illumination region 4 is therefore located on an optical path of a beam of light that is emitted from each light source 21, light having entered the illumination region 4 through the light guide region 3 is scattered and reflected efficiently by the structure 6.

The light guide plate 1 is not particularly limited in thickness. However, for example, the light guide plate 1 is set within such a range that the thickest portion of the light guide plate 1 has a thickness of approximately 1 mm to 2 mm and the thinnest portion of the light guide plate 1 has a thickness of approximately 0.6 mm to 1.2 mm.

Figure 7:
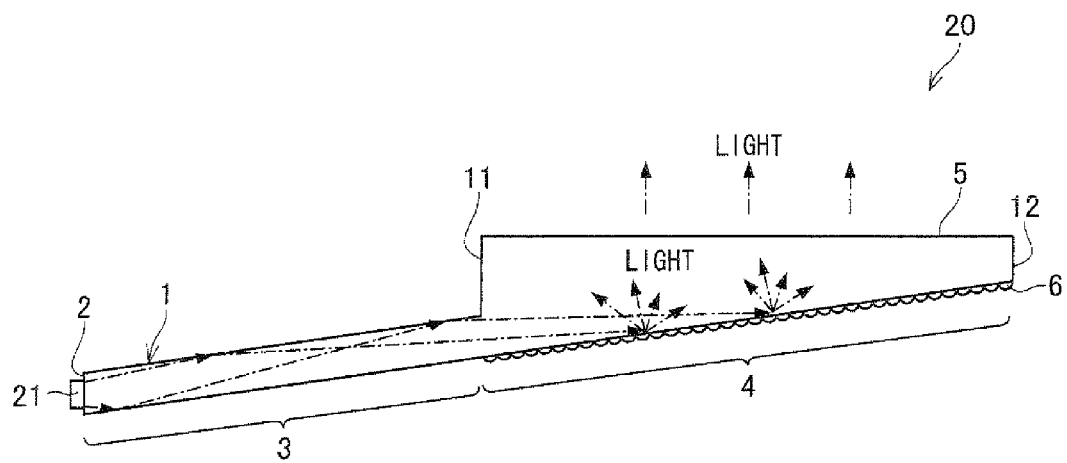
FIG. 7 shows still another example of the shape of a light guide plate of the light source unit of (a) of FIG. 1 in the form of a cross-sectional view of the light source unit taken along the line B-B of (a) of FIG. 1.
Figure 8:
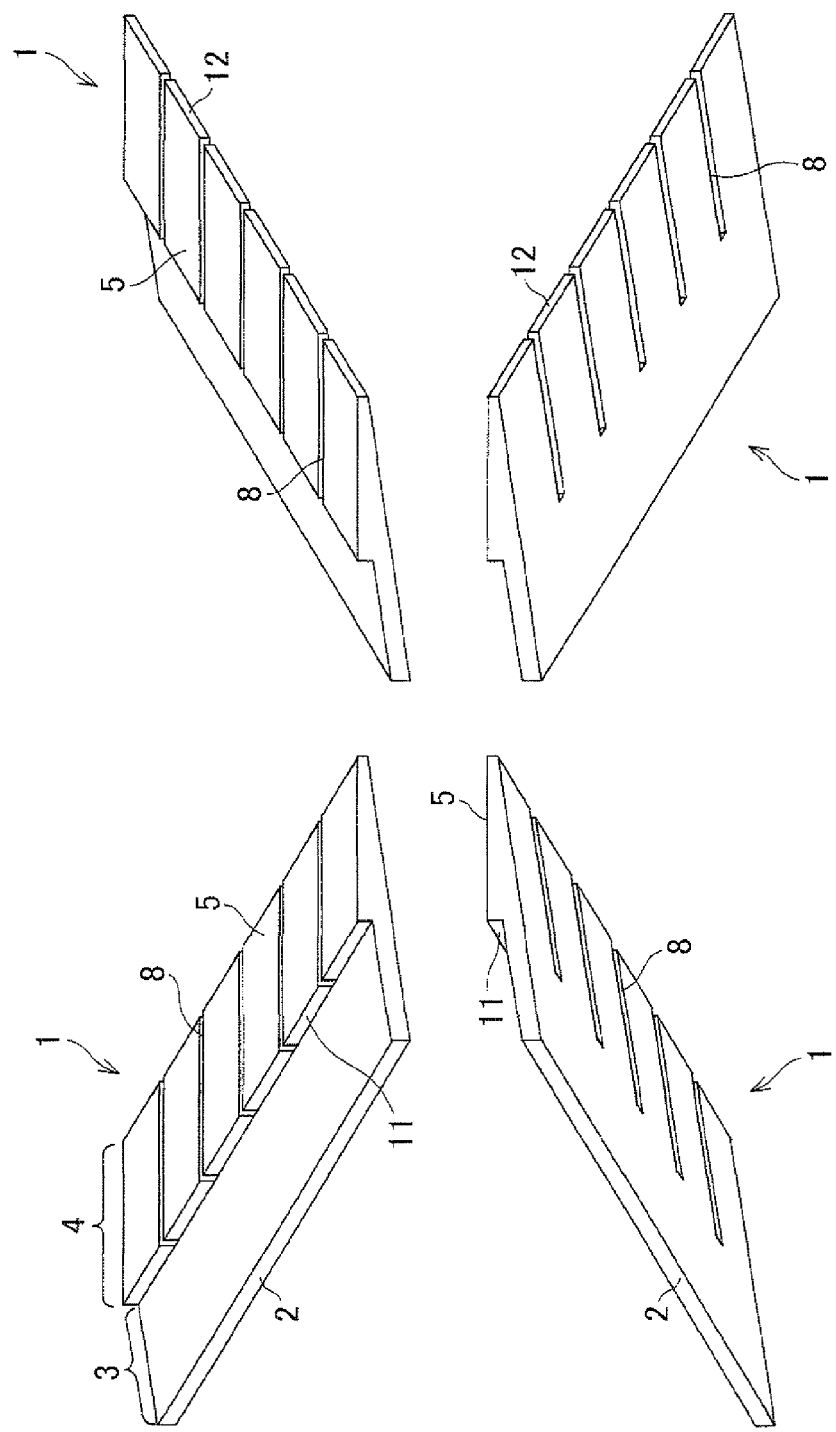
FIG. 8 juxtaposes perspective views showing the way the light guide plate of FIG. 7 looks when viewed from different angles.
Figure 9:
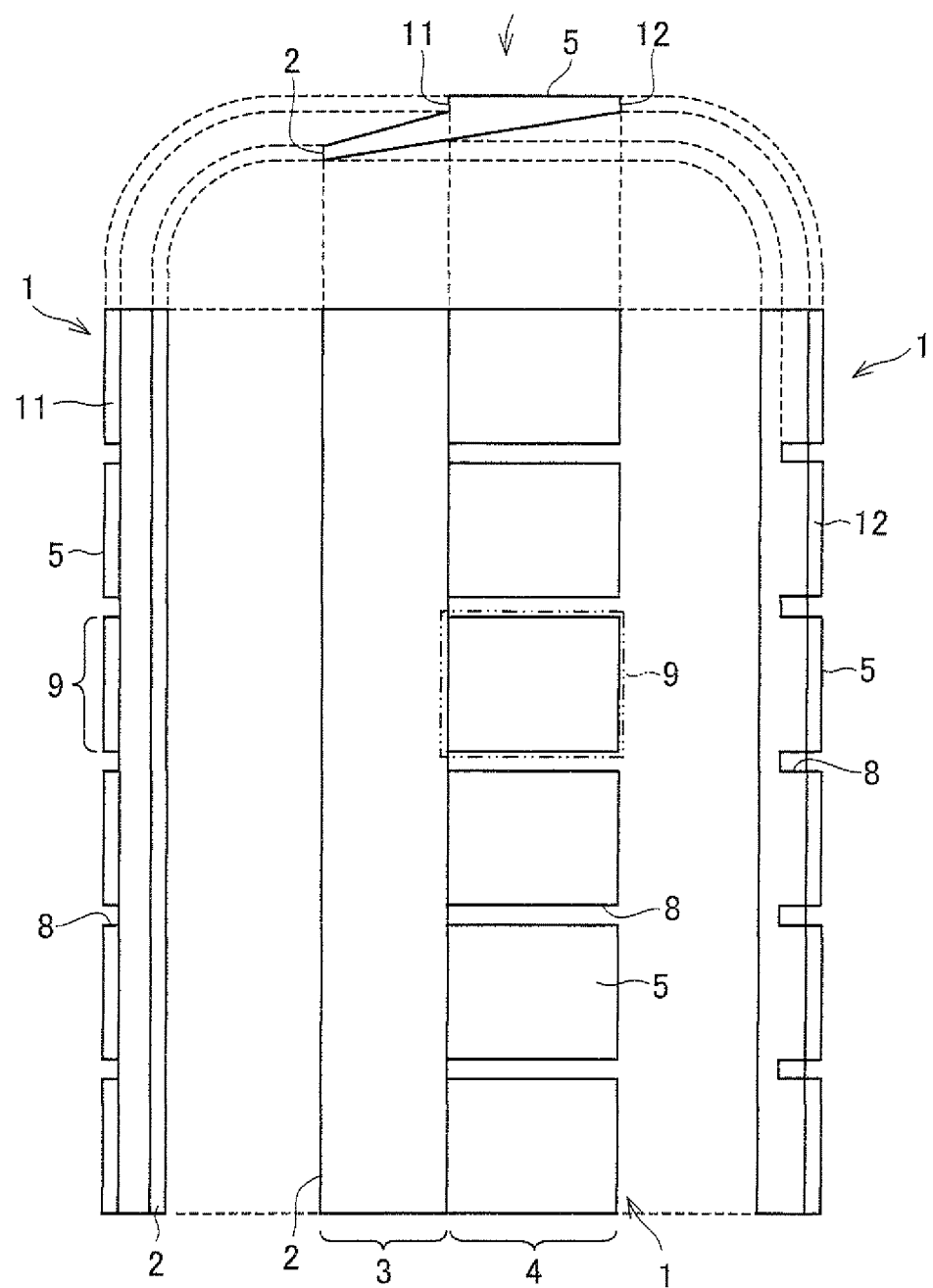
FIG. 9 juxtaposes a front view, left-side view, plan view, and right-side view of the light guide plate of FIG. 8.

FIG. 7 shows still another example of the shape of a light guide plate 1 of the light source unit 20 of (a) of FIG. 1 in the form of a cross-sectional view of the light source unit 20 taken along the line B-B of (a) of FIG. 1. FIG. 8 juxtaposes perspective views showing the way the light guide plate 1 of FIG. 7 looks when viewed from different angles. FIG. 9 juxtaposes a front view, left-side view, plan view, and right-side view of the light guide plate 1 of FIG. 8.

As with the light guide plate 1 of FIG. 6, the light guide plate 1 of FIGS. 7 through 9 is formed such that the thickness of the light guide plate 1 in the illumination region 4 preferably becomes smaller as the distance from the light sources 21 becomes larger. For this reason, the light guide plate 1 of FIGS. 7 through 9 can also attain the same level of emission intensity both in the parts of the illumination region 4 that are relatively far from the light sources 21 and the parts of the illumination region 4 that are relatively close to the light sources 21. This allows further uniformity in luminance.

The light-emitting surface 5 of the light guide plate 1 of FIGS. 7 through 9 is horizontal, and there is provided a step section 11 between the light guide region 3 and the illumination region 4, such that the illumination region 4 is raised from the light guide region 3 up to the light-emitting surface 5. For this reason, the light guide plate 1 is divided into the light guide region 3 and the illumination region 4 at the step section 11.

Meanwhile, the bottom surface of the light guide region 3 and the bottom surface of the illumination region 4 are flush with each other. This allows a beam of light emitted from each light source 21 to be guided toward the illumination region 4 without forced flexion, posing no hindrance to linearity (rectilinear propagation) of light.

As with the light guide plate 1 of FIG. 6, the light guide plate 1 of FIGS. 7 through 9 is such that the bottom surface of the light guide plate 1 slopes with respect to the light-emitting surface 5 in the illumination region 4 and the structure 6 provided on the bottom surface of the illumination region 4 is therefore located on an optical path of a beam of light that is emitted from each light source 21. Therefore, light having entered the illumination region 4 through the light guide region 3 is scattered and reflected efficiently by the structure 6.

Since the light guide plate 1 of FIGS. 7 through 9 has such a shape (or, in particular, is formed such that the thickness of the light guide plate 1 in the illumination region 4 becomes smaller as the distance from the light sources 21 becomes larger and the step section 11 is provided between the light guide region 3 and the illumination region 4), a plurality of such light guide plates 1 can be overlapped with offsets from one another (hereinafter referred to simply as "being overlapped with offsets") so that their light-emitting surfaces 5 are flush with one another. However, the present embodiment is not limited to this. Light guide plates 1 of FIGS. 2 and 6 can also be used in tandem.

Figure 10:
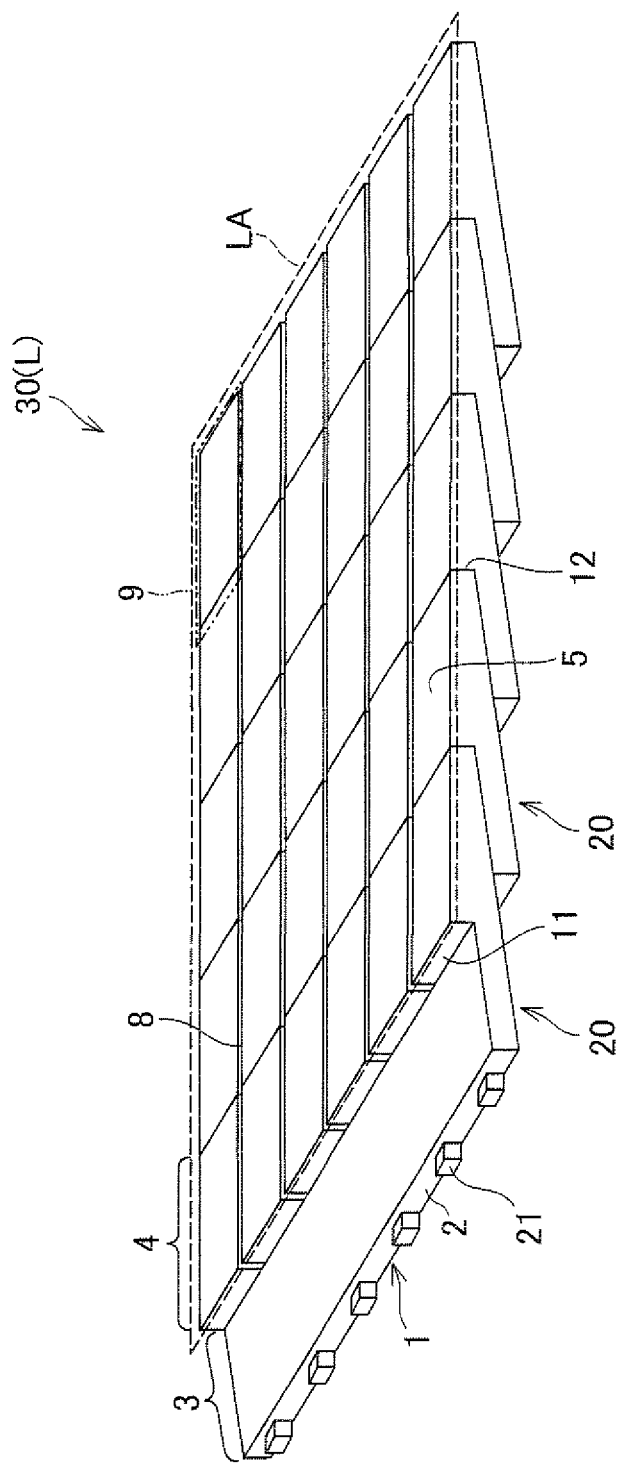
FIG. 10 is a perspective view schematically showing the configuration of a tandem illumination device in which light source units of FIG. 1 are partially overlapped with offsets.

FIG. 10 is a perspective view schematically showing the configuration of a tandem illumination device in which light source units 20 of FIG. 1 are partially overlapped with offsets. FIG. 11 shows (a) a plan view schematically showing the configuration of the illumination device of FIG. 10 and (b) a cross-sectional view of the illumination device taken along the line C-C of (a) of FIG. 11.

In cases where the light guide plates 1 of FIGS. 7 through 9 form a tandem illumination device 30 as the illumination device L as shown in FIG. 10 and (a) and (b) of FIG. 11, they can be overlapped with offsets without increasing the thickness of the illumination device 30 as shown in (b) of FIG. 11, and can be disposed so that only the illumination region 4 of each light guide plate 1 faces the irradiated surface of the irradiated body.

Further, the use of the light guide plates 1 of FIGS. 7 through 9 makes it possible to easily assemble the illumination device 30 by bringing the apical surface 12 of each light guide plate 1 into contact with a step section 11 as shown in FIG. 10 and (b) of FIG. 11.

The size of each step section 11, the thickness of each apical surface 12, and the angle of inclination of the upper surface of each light guide region 3 are not particularly limited, provided that when a light guide plate 1 is placed on an adjacent light guide plate 1 so that the apical surface 12 of the former makes contact with the step section 11 of the latter, the light-emitting surfaces 5 of the light guide plates 1 are flush with each other.

However, from the point of view of controlling directions in which light is scattered, it is preferable that each step section 11 be as small as possible in height, as long as an end of the illumination region 4 opposite the light guide region 3 (such an end being hereinafter referred to as "apical end") attains a nonproblematic level of strength for practical use. The height of each step section 11 can be, for example, 0.6 mm. However, these numerical values are merely examples, and the present embodiment is not limited thereby.

It should be noted that the shape and size of each light guide plate 1 can be such that a step section 11 is provided in the light guide region 3 of the light guide plate 1 of FIG. 6.

The illumination device 30 of FIG. 10 and (a) and (b) of FIG. 11 has five light source units 20 overlapped along the direction of the optical axis of a beam of light that is emitted from each light source 21. However, in such a case that a plurality of light guide plates 1 are overlapped, the number of light guide plates 1 to be overlapped is not particularly limited as long as it is two or more.

In cases where a single light source unit 20 is used as an illumination device, an increase in the number of slit sections 8 ends up increasing the number of light-emitting sections 9 only along a direction perpendicular to the direction of the optical axis of a beam of light that is emitted from each light source 21, i.e., along a direction along which the light-entering end face 2 extends.

However, by partially overlapping the N−1th light source unit 20, the Nth light source unit 20, and so forth (N≧2) as described above, the number of regions along the direction of the optical axis of a beam of light that is emitted from each light source 21 can be increased, whereby the number of light-emitting sections 9 can be increased two-dimensionally. For this reason, regardless of the size of each light guide plate 1, a continuous, wide light-emitting region can be achieved as a light-emitting surface LA of the illumination device 30.

In cases where the light source units 20 are partially overlapped with offsets as described above, it is preferable that, assuming as shown in (b) of FIG. 11 that the kth (k=1, . . . , N−1; where N≧2) light source unit 20 is the light source unit BLU(k) and the light source unit BLU(k) has a light guide plate 1 denoted as "light guide plate LG(k)" and a light source 21 (primary light source) denoted as "light source BL(k)", the k+1th light source BL(k+1) for supplying primary light to the light guide plate LG(k+1) of the k+1th light source unit BLU (k+1) be disposed in such a way as to face the back surface (bottom surface) of the light guide plate LG(k) of the kth (k=1, . . . , N−1) light source unit BLU(k) and a light-blocking body 31 (light-blocking member) for blocking supply of light from the light source BL(k+1) to the light guide plate LG(k) be disposed between the light guide plate LG(k) and the light source BL(k+1).

By thus interposing the light-blocking body 31 between the light guide plate LG(k) and the light source BL(k+1), e.g., between the overlapped light guide plate LG(k) and LG(k+1) as shown in (b) of FIG. 11, light emitted from the light source BL(k+1) and having leaked without entering the corresponding light guide plate LG(k+1) can be prevented from entering the light guide plate LG(k), which overlaps the light source BL(k+1).

The light-blocking body 31 can come, for example, in the form of two types of reflecting sheet. A greater effect can be obtained when the light-blocking body 31 is thus composed of two types of reflecting sheet.

FIG. 12 is a cross-sectional view of a main part of an illumination device 30 with two types of reflecting sheet provided between overlapped light guide plates LG(k) and LG(k+1).

As shown in FIG. 12, the two types of reflecting sheet are realized, for example, by a specular reflection sheet 32, which is a highly light-blocking reflecting sheet, and a diffuse reflection sheet 33 (scatter reflection sheet), which is a highly reflective reflecting sheet.

As shown in FIG. 12, beams of light emitted from the light sources BL(k) and BL(k+1) mostly enter the light guide plates LG(k) and LG(k+1) paired therewith, respectively.

However, there exists no little light that is emitted toward a higher position than these light sources BL(k) and BL(k+1), although the amount of such light varies depending on the type and disposition of the light sources BL(k) and BL(k+1).

For example, in cases where such a side light-emitting LED as mentioned above is disposed as the light source BL(k+1) on an end face of the light guide plate LG(k+1), the side direction of the LED (i.e., the in-plane direction of the light guide plate LG(k+1)) is the principal light-emitting direction of the LED.

However, such light as leaked from an LED package or leaked from space between the light source BL(k+1) and the light guide plate LG(k+1) is emitted toward a higher position than the light source BL(k+1). It should be noted, needless to say, that in cases where the light source BL(k+1) comes in the form of a linear light source, there exists light that is emitted toward a higher position than the light source BL(k+1).

For this reason, in cases where the illumination device 30 is used as a backlight, a highly light-blocking reflecting sheet is required for the elimination of uneven irradiation.

However, reflecting sheets that are currently mass-produced are classified broadly into white diffuse reflection sheets and specular reflection sheets made of silver, aluminum, or the like. Moreover, needless to say, the diffuse reflection sheet, which is a white diffuse reflection sheet, is inferior in light-blocking properties to a specular reflection sheet made of silver, aluminum, or the like.

However, unlike the specular reflection sheet, which reflects light at an angle equal to the angle of incidence of incident light, a diffuse reflection sheet (scatter reflection sheet) reflects light randomly. For this reason, the use of the diffuse reflection sheet 33 as described above as a reflecting sheet constituting the light-blocking body 31 results in an improvement in in-plane luminance uniformity and color-mixing properties.

Therefore, as described above, it is desirable to introduce the highly light-blocking specular reflection sheet 32 as a second reflecting sheet in addition to the diffuse reflection sheet 33.

In this case, by disposing the specular reflection sheet 32 so that it faces the light source BL(k+1) and disposing the diffuse reflection sheet 33 so that it faces the light guide plate LG(k), the diffuse reflection sheet 33 is allowed to randomly reflect light having entered the light guide plate LG(k) from the light source BL(k). This make it possible to sufficiently mix beams of light having entered the light guide plate LG(k) from the light source BL(k), thus improving in-plane luminance uniformity and color-mixing properties.

Further, as described above, by disposing the diffuse reflection sheet 33 so that it faces the light guide plate LG(k), part of the light entering the light guide plate LG(k) from the light source BL(k) and light reflected back from an optical sheet (not shown) provided on the light-emitting surface 5 of the light guide plate LG(k) can be reflected. For this reason, too, it is possible to improve efficiency in the use of light and improve luminance uniformity and color-mixing properties.

Further, in this case, the disposition of the highly light-blocking specular reflection sheet 32 facing the light source BL(k+1) makes it possible to efficiently block light that is emitted toward a higher position than the light source BL(k+1). This makes it possible to eliminate uneven irradiation as a backlight.

Further, since the specular reflection sheet 32 and the diffuse reflection sheet 33 are provided in such a way as to be put on top of each other, a synergistic effect of the diffuse reflection sheet 33 diffusing light and the specular reflection sheet 32 reflecting and blocking leakage of light emitted from the light source BL(k+1) is brought about. The synergistic effect makes it possible to reduce uneven irradiation, improve uniformity in luminance, and remarkably improve the color-mixing effect.

For this reason, it is particularly preferable that, as shown in FIG. 12, the specular reflection sheet 32 and the diffuse reflection sheet 33 be arranged in this order all over the bottom surface of the light guide plate LG(k).

However, the present embodiment is not limited to this. For example, as long as the specular reflection sheet 32 as seen in a two-dimensional view is disposed at least in a position corresponding to the light source BL(k+1) and the diffuse reflection sheet 33 is disposed at least in a position corresponding to the illumination region 4 of the light guide plate LG(k), uneven irradiation that is caused by leakage of light emitted from the light source BL(k+1) can be sufficiently reduced, and beams of light having entered the light guide plate LG(k) from the light source BL(k) can be mixed in the light guide plate LG(k) and emitted.

Therefore, from the point of view of cost reduction, the diffuse reflection sheet 33 as seen in a two-dimensional view may be disposed only in a position corresponding to the light-emitting surface 5 of the light guide plate LG(k) or further in a position extending from the boundary section between the light guide region 3 and the illumination region 4 of the light guide plate LG(k) little toward the light source BL(k), and the specular reflection sheet 32 as seen in a two-dimensional view may be disposed only in a position corresponding to the light source BL(k+1) or further in a position including the vicinity thereof in such a way as to cover the light source BL(k+1).

Figure 36:
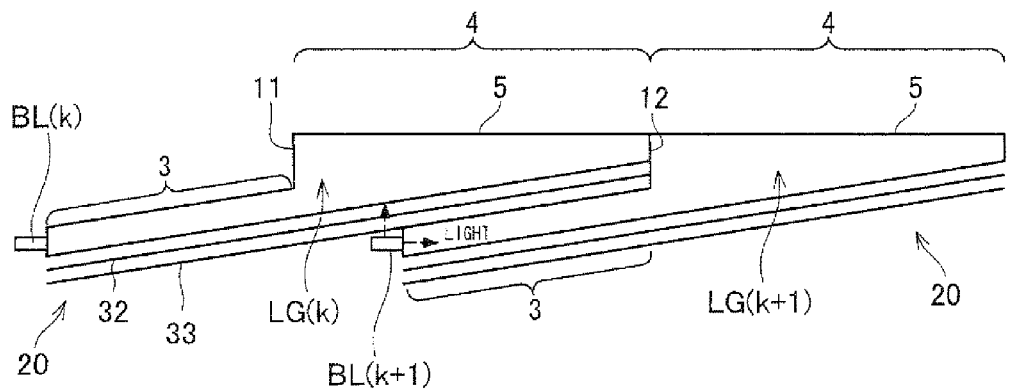
FIG. 36 is another cross-sectional view of a main part of an illumination device in accordance with an embodiment with two types of reflecting sheet provided between overlapped light guide plates.

Further, as shown in FIG. 36, the specular reflection sheet 32 and the diffuse reflection sheet 33 may be arranged in this order between the light guide plate LG(k) and the light source BL(k+1). The reason for this is as follows.

That is, most of the leakage of light emitted from the light source BL(k+1) is toward the light-emitting surface 5 of the light guide plate LG(k). Generally, a diffuse reflection sheet is higher in efficiency of reflection than a specular reflection sheet. For this reason, light having failed to enter the light guide plate LG(k+1) from the corresponding light source BL(k+1) can be sent into the light guide plate LG(k+1) by disposing the diffuse reflection sheet 33 on the bottom surface of the light guide plate LG(k), in particular, so that the diffuse reflection sheet 33 faces the light source BL(k+1). As a result, the efficiency of reentrance of light into the light guide plate LG(k+1) is enhanced. Since the diffuse reflection sheet 33 reflects light randomly, the use of the diffuse reflection sheet 33 as described above as a reflecting sheet constituting the light-blocking body 31 results in an improvement in in-plane luminance uniformity and color-mixing properties.

However, as described above, the diffuse reflection sheet 33 is not very high in light-blocking properties. Therefore, it is hard to say that the diffuse reflection sheet 33 alone is sufficient to eliminate leakage of light emitted from the light source BL(k+1).

Accordingly, by providing the specular reflection sheet 32 and the diffuse reflection sheet 33 between the light guide plate LG(k) and the light source BL(k+1) so that the specular reflection sheet 32 and the diffuse reflection sheet 33 are arranged in this order from the bottom surface of the light guide plate LG(k), light emitted from the light source BL(k+1) and transmitted through the diffuse refection sheet 33 without entering the light guide plate LG(k+1) is blocked by the highly light-blocking specular refection sheet 32 provided between the light guide plate LG(k) and the diffuse reflection sheet 33, and therefore is prevented from entering the light guide plate LG(k).

It should be noted that light emitted from the light source BL(k) and entering the light guide plate LG(k) leaks little toward the bottom surface of the light guide plate LG(k). For this reason, little influence is exerted by the low reflectance of the specular reflection sheet 32, which is in direct contact with the bottom surface of the light guide plate LG(k).

Therefore, since the specular reflection sheet 32 and the diffuse reflection sheet 33 are arranged in this order from the light source BL(k+1) in such a way as to be put on top of each other, a synergistic effect of the diffuse reflection sheet diffusing light and the specular reflection sheet 32 reflecting and blocking light transmitted through the diffuse reflection sheet 33 is brought about. The synergistic effect makes it possible to reduce uneven irradiation, improve uniformity in luminance, and remarkably improve the color-mixing effect.

Also in this case, it is preferable that the specular reflection sheet 32 and the diffuse reflection sheet 33 be provided all over the bottom surface of the light guide plate LG(k). However, as long as the specular reflection sheet 32 as seen in a two-dimensional view is disposed at least in a position corresponding to the illumination region 4 of the light guide plate LG(k) and the diffuse reflection sheet 33 as seen in a two-dimensional view is disposed at least in a position corresponding to the light source BL(k+1), the above effect can be obtained. Therefore, also in this case, the specular reflection sheet 32 and the diffuse reflection sheet 33 may be provided partially in the above positions.

The present embodiment has been described mainly by way of example where, as shown in FIGS. 12 and 36, one of the reflecting sheets is provided in such a way as to face the light guide plate LG(k) and the other reflecting sheet is provided in such a way as to face the light source BL(k+1). However, the present invention is not limited to this.

Figure 37:
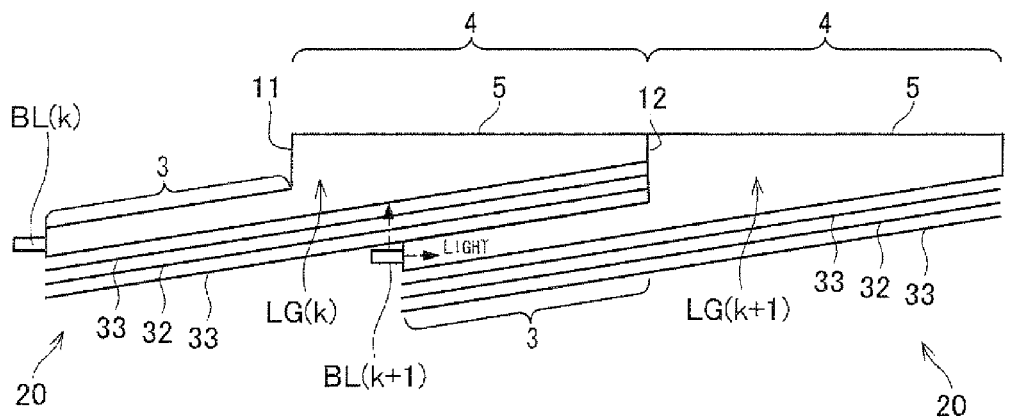
FIG. 37 is still another cross-sectional view of a main part of an illumination device in accordance with an embodiment with two types of reflecting sheet provided between overlapped light guide plates.

For example, as shown in FIG. 37, by arranging a diffuse reflection sheet 33, a specular reflection sheet 32, and a diffuse reflection sheet 33 in this order from each of the light guide plates LG(k) and LG(k+1), beams of light having entered the light guide plates LG(k) and LG(k+1) from the corresponding light sources BL(k) and BL(k+1) can be mixed sufficiently and emitted, and light having failed to enter the light guide plate LG(k+1) from the corresponding light source BL(k+1) can be sent into the light guide plate LG(k+1). Further, light transmitted through the diffuse reflection sheets 33 can be both reflected and blocked. Therefore, these reflecting sheets bring about a synergistic effect that makes it possible to reduce uneven irradiation, improve uniformity in luminance, and remarkably improve the color-mixing effect.

It should be noted that the specular reflection sheet 32 and the diffuse reflection sheets 33 may be provided independently of one another (i.e., may be simply put on top of one another for use) or may be provided in such a way as to be joined on top of one another.

In cases where the specular reflection sheet 32 and the diffuse reflection sheets 33 are joined on top of one another, the sheets can be easily aligned.

It should be noted that there is no particular limitation on how the specular reflection sheet 32 and the diffuse reflection sheets 33 are joined on top of one another. For example, the specular reflection sheet 32 and the diffuse reflection sheets 33 may be joined on top of one another with commercially available adhesives (glue) or the like, by lamination, or by adsorption.

Further, although the present embodiment has been described by way of example where a specular reflecting sheet 32 and a diffuse reflection sheet 33 are provided between the light source BL(k+1) and the light guide plate LG(k), the present embodiment is not limited to this. For example, a member such as a sheet having a diffuse reflection layer (i.e., a diffuse reflection layer) and a specular reflection layer may be provided between the light source BL(k+1) and the light guide plate LG(k).

That is, as described above, a diffuse reflection layer and a specular reflection layer may be formed from a specular reflection sheet 32 and a diffuse reflection sheet 33 joined on top of each other, or a diffuse reflection layer and a specular reflection layer may be formed on one or both surfaces of a sheet. Alternatively, a diffuse reflection layer and a specular reflection layer does not necessarily need to constitute a sheet, as long as the layers are laminated. For example, the diffuse reflection layer and the specular reflection layer may be formed directly on the light guide plate 1 or the light source 21.

In cases where the diffuse reflection layer is formed from a diffuse reflection sheet 33, the specular reflection layer may be formed by laminating a specular reflection material on the diffuse reflection sheet 33.

As mentioned above, an example of the specular reflection material is a metal material such as silver or aluminum. Among them, silver is preferred because of its high reflectance (specular reflectance).

The diffuse reflection material can be realized by a conventional publicly-known diffuse reflection material. An example of the diffuse reflection material include a white material such as white plastic or white paint.

A specular reflection layer can be laminated on the diffuse reflection sheet 33, for example, by vapor deposition. It is preferable that the specular reflection layer have a mirror finished (smooth) surface. This method makes it possible that a specular reflection layer high in adhesiveness and surface smoothness and high in specular reflectance is easily formed, for example, in a desired region on a surface of the diffuse reflection sheet 33. Specifically, a sheet provided with a specular reflection sheet can be easily formed in a position in the diffuse reflection sheet 33 that corresponds to the light source BL(k+1).

Further, in cases where the specular reflection layer is formed from a specular reflection sheet 32, a diffuse refection layer can be easily formed in a desired region on at least one surface of the specular reflection sheet 32 by unleveling the at least one surface of the specular reflection sheet 32 or applying a white material onto the at least one surface of the specular reflection sheet 32.

A surface of the specular reflection sheet 32 or specular reflection layer can be unleveled, for example, by forming a diffuse reflection layer and a specular reflection layer simultaneously with the formation of the sheet by injection molding, die molding, embossing with use of such a reflecting material as described above, or by subjecting the surface of the specular reflection sheet 32 to prism processing, dot processing, laser surface roughening, or the like.

In cases where the specular reflection layer is formed from a specular reflection sheet 32, the specular reflection layer and the diffuse reflection layer may be made of the same material, or may be made of different reflecting materials.

In either case, the diffuse reflection layer and the specular reflection layer can be disposed in the same manner as in the case where the diffusion reflection sheet 33 and the specular reflection sheet 32 are simply put on top of each other.

Further, although the foregoing description has been given by way of example where two types of reflecting sheet or reflecting layer are provided as a light-blocking body 31, the present embodiment is not limited to this. According to the present embodiment, as shown in FIG. 38, the specular reflection sheet 32 or specular reflection layer can be replaced by a light absorption sheet 71 or light absorption layer made of a light-absorbing material.

The light-absorbing material is not particularly limited as long as it is a material that has light-absorbing properties. The light absorption sheet 71 can be realized, for example, by a black sheet. Alternatively, instead of the black sheet, a light-blocking section may be disposed on the top of the light source 21. For example, leakage of light emitted from an LED can be prevented by applying black ink onto the top of the LED.

That is, the present embodiment only needs to be configured such that a first functional sheet or first functional layer having reflexivity and a second functional sheet or second functional layer having light-blocking properties are provided between the light source BL(k+1) and the light guide plate LG(k) in such a way as to be put on top of each other.

The first functional sheet or first functional layer is a highly reflective sheet or layer that puts greater emphasis on reflexivity than on light-blocking properties and is responsible mainly for a reflecting function. The first functional sheet or first functional layer is realized, as described above, by a sheet or layer having diffuse reflection properties.

Further, the second functional sheet or second functional layer is a highly light-blocking sheet or layer that puts emphasis on light-blocking properties and is responsible mainly for a light-blocking function. The second functional sheet or second functional layer is realized, for example, by a sheet or layer having specular reflection properties or light-absorbing properties.

It should be noted that the first functional sheet or first functional layer and the second functional sheet or second functional layer are not particularly limited in thickness.

Further, in order to efficiently guide light from the light guide region 3 toward the illumination region 4, it is desirable that, as mentioned above, the light guide region 3 not be subjected to a process or treatment such as SHIBO processing. However, unless light is emitted outward from the light guide region 3, e.g., in cases where light-blocking bodies 31 such as reflecting sheets are provided on the top and bottom surfaces of the light guide region 3 as shown in (b) of FIG. 11, the light guide region 3 as well as the illumination region 4 may be subjected to the process or treatment such as SHIBO processing.

For example, in cases where a step section 11 is provided between the light guide region 3 and the illumination region 4 as shown in (b) of FIG. 11, a boundary section of the light guide region 3 with the illumination region 4 may be subjected to the process or treatment such as SHIBO processing, albeit depending on the size of the step section 11, after the measures to prevent light from being emitted outward from the light guide region 3 have been taken as shown in (b) of FIG. 11 and FIG. 12, whereby the risk of decrease in intensity of light that is emitted from the part of the light-emitting surface 5 near the step section 11 is avoided.

Although FIGS. 10 through 12 illustrate the tandem illumination device 30, in which light source units 20 of FIG. 1 are partially overlapped with offsets, the combination of light source units 20, i.e., the illumination device L in accordance with the present embodiment is not limited to this.

Figure 13:
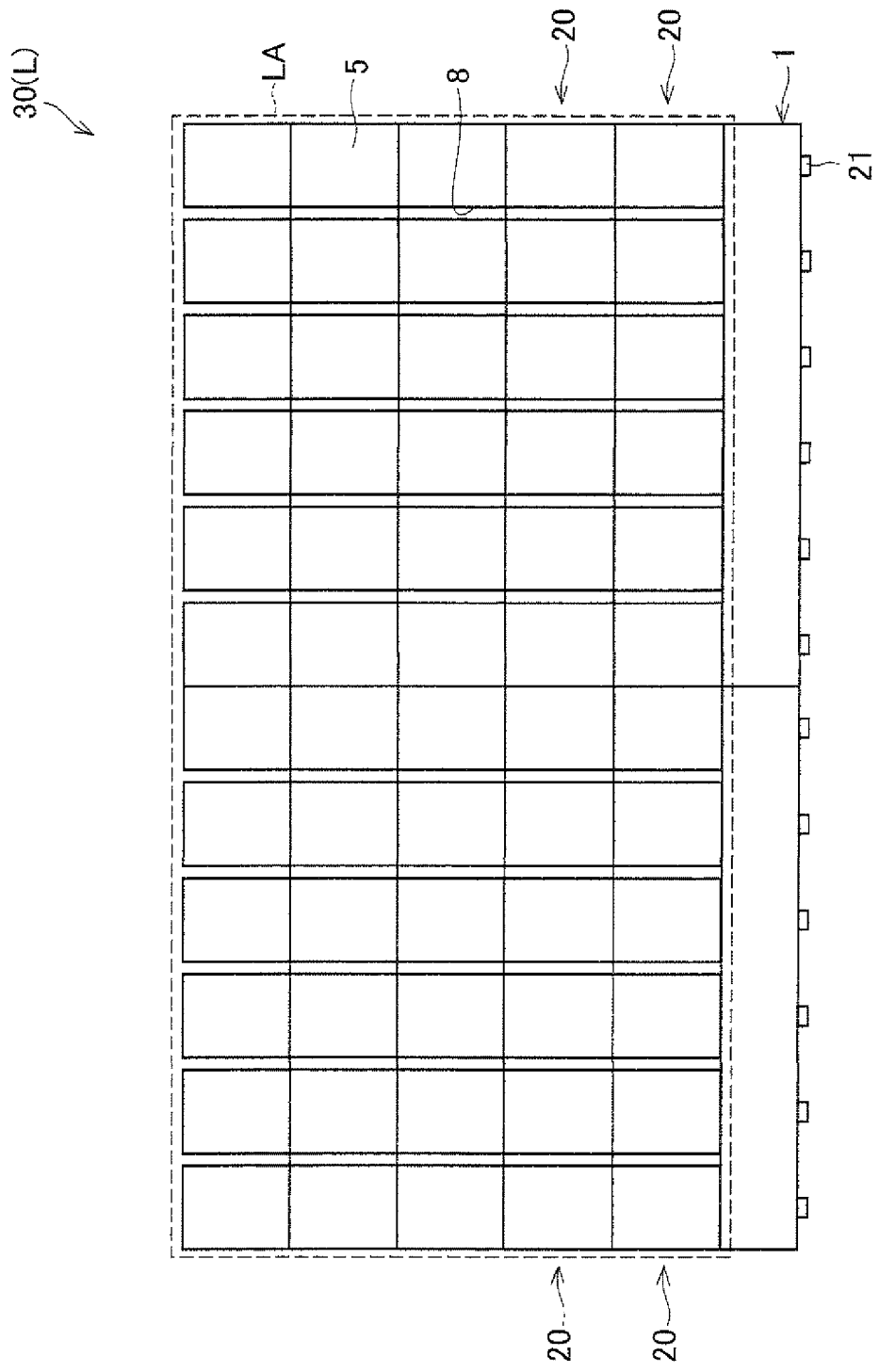
FIG. 13 is a plan view showing another example of the configuration of an illumination device in accordance with an embodiment.

FIG. 13 is a plan view showing another example of the configuration of an illumination device L in accordance with the present embodiment.

The illumination device 30 of FIG. 13 is a tandem illumination device in which light source units 20 of FIG. 1 are partially overlapped with offsets along the direction of the optical axis of a beam of light that is emitted from each light source 21, and is constructed such that groups of light source units 20 partially overlapped with offsets along the direction of the optical axis are further arranged in a line along a direction perpendicular to the direction of the optical axis.

In the illumination device 30 of FIG. 13, two sets of five light guide plates 1 overlapped along the direction of the optical axis of a beam of light that is emitted from each light source 21 are arranged in a line along a direction perpendicular to the direction of the optical axis. However, in such a case that a plurality of light guide plates 1 are overlapped, the number of light guide plates 1 to be overlapped only needs to be two or more, and the number of light guide plates 1 to be arranged in a line only needs to be two or more. As mentioned above, it is of course possible to use light guide plates 1 arranged in a line without being overlapped.

Regardless of whether a single light guide plate 1 or a plurality of light guide plates 1 overlapped with offsets along the direction of the optical axis, the amount of light that is radiated from each light-emitting section 9 can be independently adjusted. However, the size of the light-emitting surface LA along a direction perpendicular to the direction of the optical axis is fixed by the size of each light guide plate 1.

On the other hand, by using light guide plates arranged in a line along a direction perpendicular to the direction of the optical axis as described above, the size of the light-emitting surface LA can be enlarged regardless of the size of each light guide plate 1.

Further, in cases where the light-emitting area (i.e., the area of the light-emitting surface LA) is increased to a certain level of size or higher, the construction can be better simplified and enhanced in strength by arranging a plurality of short light guide plates 1 than by lengthening each light guide plate 1.

Thus, every illumination device L in accordance with the present embodiment has a light-emitting surface LA composed of a plurality of light-emitting sections 9 respectively corresponding to light sources 21, and can independently adjust the light intensity of a light source 21 corresponding to each light-emitting section 9, thereby independently adjusting the amount (emission intensity) of light that is radiated from that light-emitting section 9.

It should be noted that a control circuit (control means) for controlling the amount of illuminating light of each light source 21 may be provided in the illumination device L or separately from the illumination device L.

Figure 14:
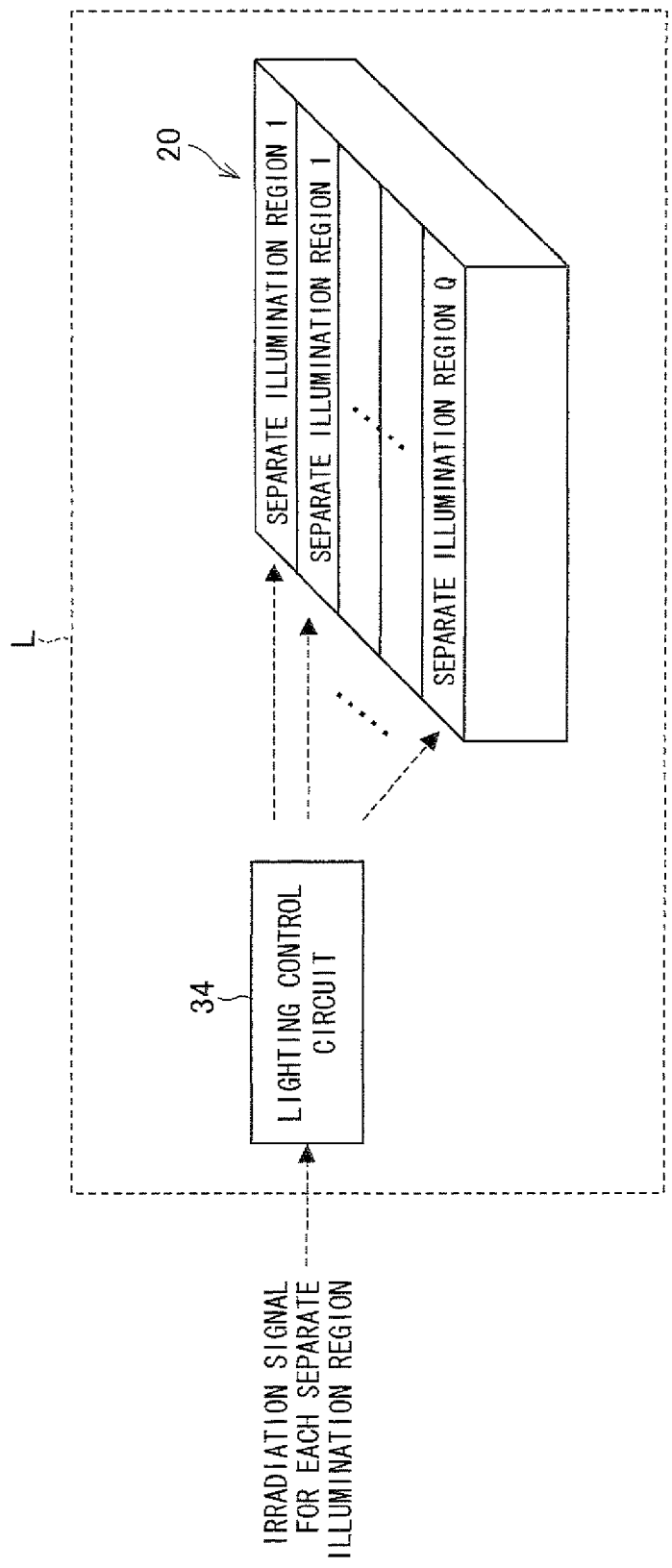
FIG. 14 is a block diagram showing an example of the configuration of a main part of the illumination device in accordance with an embodiment.

FIG. 14 is a block diagram showing an example of the configuration of a main part of the illumination device L in accordance with the present embodiment.

The illumination device L includes: a light source unit 20 composed of light sources 21 and a light guide plate 1; and a lighting control circuit 34 serving as the control circuit. It should be noted that the specific configuration of the light source unit 20 is as described above and FIG. 14 therefore omits an illustration of the specific configuration of the light source unit 20.

The light source unit 20 has a plurality of (e.g., Q; Q 2) separate illumination regions serving as light-emitting sections 9.

The lighting control circuit 34 controls the amount of illuminating light of each light source 21 in accordance with the emission intensity of the corresponding one of the plurality of light-emitting sections 9. The light sources 21 are realized, for example, by the LEDs.

The lighting control circuit 34 receives, for each light-emitting section 9, an irradiation signal for controlling the amount of emission in a certain cycle.

The lighting control circuit 34 controls the intensity of illuminating light by changing the ratio between a lighting period (illumination period) and a lights-out period (non-illumination period) per unit time of the corresponding light source 21 in accordance with the light-emitting amount designated by the irradiation signal. That is, the lighting control circuit 34 controls the illumination period of each light source 21 so that it becomes longer in a frame period during which bright light is emitted and shorter in a frame period during which dim light is emitted.

The lighting period T of each light source 21 can be expressed as $T = H \times (W/W_{max})$, where H is the cycle in which control signals are inputted, $W_{max}$ is the maximum amount of light, and W is the amount of light designated by a control signal at a given timing. By performing the control for each light-emitting section 9, the amount of light that is emitted by every light-emitting section 9 can be independently adjusted.

Thus, the lighting control circuit 34 controls the intensity of illuminating light by changing the ratio between a lighting period and a lights-out period per unit time of each light source 21. That is, the lighting control circuit 34 independently adjusts the emission intensity of each separate light-emitting section 9 by adjusting the amount of emission (amount of illuminating light) of the light source 21 through an adjustment of light-emitting time with the amount of light held constant at the time of emission. In the present embodiment, the adjustment of the amount of emission of the light source 21 is made by blinking the light source 21 as described above. Further, the intensity of illuminating light of each light-emitting section 9 may be adjusted in white through black-and-white area emission alone, or may be adjusted independently in three colors R, G, and B through area emission for each of the three colors R, G, and B.

The illumination device L is small in thickness, capable of dividing the illumination region into many parts, applicable to a large-size screen, and capable of uniform irradiation with a simple configuration. It should be noted that the divider may be provided continuously or intermittently.

Figure 32:
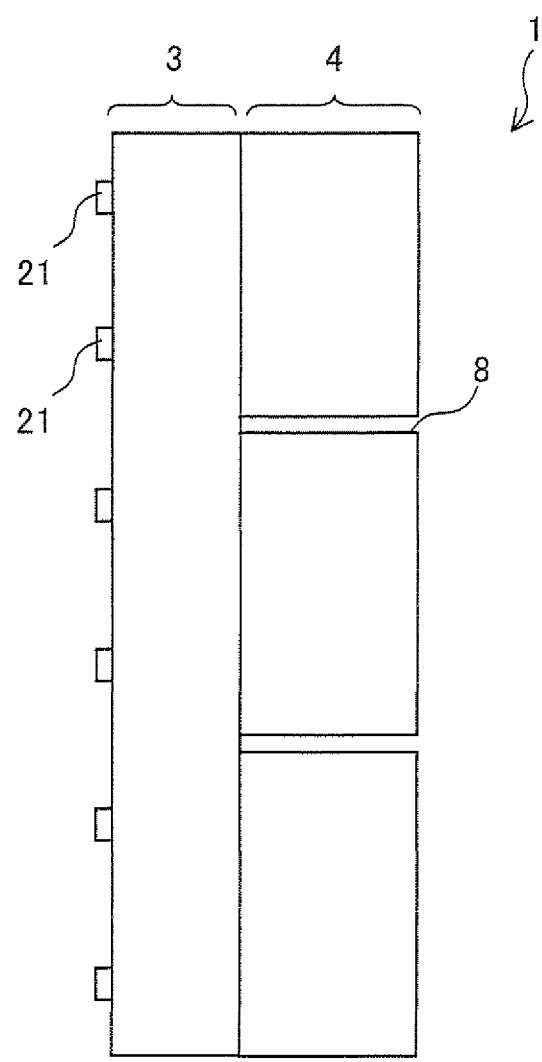
FIG. 32 is a plan view schematically showing the configuration of another light source unit in accordance with still another embodiment.

The present embodiment has been described mainly by way of example where, as described above, light sources 21 are provided in one-to-one correspondence with light-emitting sections 9 in such a way as to correspond to the respective light-emitting sections 9. In such a case that light sources 21 are provided in one-to-one correspondence with light-emitting sections 9, control is easy and the illumination region 4 can be segmentalized. However, the present embodiment is not limited to this. As shown in FIG. 32, a plurality of light sources 21 may be provided in such a way as to correspond to each light-emitting section 9.

For example, in case where the light-emitting area (i.e., the area of the light-emitting surface LA or each light-emitting section 9) is enlarged and the provision of one light source 21 per light-emitting section 9 is not sufficient in the amount of light, a single light-emitting section 9 may be irradiated by two or more light sources 21. That is, it is only necessary to provide at least one light source 21 to each light-emitting section 9.

In cases where a plurality of light sources 21 are provided to each light-emitting section 9 as described above, it is preferable the light sources 21 be evenly spaced in the light-emitting section 9.

Further, although the present embodiment has been described by way of example where, as described above, the light sources 21 are provided on one end face of the light guide plate 1, the present embodiment is not limited to this.

From the point of view of efficiency in the use of light, which is high in linearity, it is desirable that each light source 21, the light guide region 3, and the illumination region 4 be provided in alignment with one another, and it is preferable that the light sources 21 be provided on one end face of the light guide plate 1. This allows a beam of light emitted from each light source 21 to be guided toward the illumination region 4 without forced flexion.

However, the light sources 21 may be provided on the lower surface of the light guide plate 1 in a position facing the light guide region 3, as long as a beam of light emitted from each light source 21 is guided toward the illumination region 4 through the light guide region 3.

For example, the light sources 21 may be provided at an end of the lower surface of the light guide plate 1 or in the vicinity thereof by bending an end of the light guide region 3 of the light guide plate 1 or by providing the light sources 21 so that the light sources 21 are contained in a reflector (not shown) provided at an end of the light guide plate 1 and folded back toward the lower surface of the light guide plate 1.

Further, although the present embodiment has been described by way of example where the light sources 21 are realized by point light sources, the present embodiment is not limited to this.

In cases where the light sources 21 are point light sources, it is advantageously easy to reduce size and segmentalize the illumination region 4. Further, in cases where the light sources 21 are point light sources, a beam of light that is emitted from each light source 21 is diffused radially. Therefore, even when the light guide region 3 is constructed, as described above, such that light guide sections 3A are joined, light hardly leaks in a transverse direction across the light source 21. This makes it possible to easily and surely prevent light from leaking into an adjacent light guide block 1A through the light guide region 3.

However, the light sources 21 can be realized in the form of linear light sources by devising the size of each linear light source, the size of each light-emitting section 9, the length and type of each divider as will be described in a later embodiment. That is, although it is preferable that the light sources 21 be realized by point line sources, it is not absolutely necessary that the light sources 21 be point light sources, and a linear light source may be provided in such a way as to correspond to each light-emitting section 9.

Since the illumination device 30 has an illumination region 4 divided into a plurality of light-emitting sections 9 by an optical divider, it is configured such that each light guide plate 1 is provided with a plurality of light-emitting sections 9.

According to the foregoing configuration, the light guide plate 1 is constructed as if a plurality of light guide blocks 1A were joined by each light guide section 3A in a transverse direction (i.e., in a direction intersecting with a plurality of light guide sections 3A), assuming that the direction along which light source units 20 are disposed (tandem direction) is a longitudinal direction.

Since the light guide sections 3A of adjacent light guide blocks 1A are provided integrally by providing a divider in the illumination region 4, the light guide plate 1 is high in strength of a joint section between one light guide section 3A and another, and has a sturdy construction as a combination of light guide blocks 1A. For this reason, the illumination device 30, obtained by disposing a plurality of light source units 20 so that at least a part of the light guide region 3 of each light guide plate 1 is covered, is high in strength of the light guide region 3, and has a sturdy construction as a combination of light guide blocks 1A even if the light guide region 3 of each light guide plate 1 is made thinner.

Further, by providing such a divider in each illumination region 4, the illumination device 30 can be configured simply, and yet confining a beam of light from each light source 21 in the targeted light-emitting section 9 and suppressing and avoiding leakage of the beam of light into an adjacent light-emitting section 9.

Therefore, the present embodiment can provide an illumination device 30 capable of retaining its strength as a combination of light guide blocks while reducing leakage of light into an adjacent area.

Furthermore, the present embodiment makes it possible to form a plurality of light-emitting sections 9 from a single light guide plate 1, thus allowing improved productivity. Further, since the number of light guide plates 1 that are connected can be reduced, the disposition is facilitated; moreover, the time and cost that are required for the connection can be reduced.

For a higher level of uniformity in luminance, it is preferable that the light source units 20 be in tandem so that a flat light-emitting region (light-emitting surface LA) is formed by the respective light-emitting surfaces 5 of the light source unit 20 in such a manner that the light guide region 3 of one light source unit 20 overlaps the illumination region 4 of another light source unit 20. However, the present embodiment is not limited to this.

For example, adjacent light source units 20 may be provided in such a manner that the illumination region 4 of one of the light source units 20 and the illumination region 4 of the other light source unit 20 are spaced from each other so that the light guide region 3 of the one of the light source unit 20 is exposed between the illumination region 4 of one of the light source units 20 and the illumination region 4 of the other light source unit 20. Further, there may be such a configuration that a step is provided between the illumination region 4 of one of the light source units 20 and the illumination region 4 of the other light source unit 20. However, in order that substantially no light is emitted from each light guide region 3, it is desirable that the light source units 20 be in tandem so that the illumination regions 4 are disposed as close as possible to one another.

Further, the present embodiment has been described by way of example where, as shown above in FIG. 10 and (a) of FIG. 11, light source units 20 adjacent to each other are in tandem so that the dividers of one of the light source units 20 are in alignment with those of the other light source unit 20, respectively. However, the present invention is not necessarily limited to this.

For example, the light source units 20 may be overlapped so that the light-emitting sections 9 of light source units 20 adjacent to each other are offset sideways (i.e., so that the dividers of a light guide plate 1 are not in alignment with those of an adjacent light guide plate 1). For example, the light source units 20 may be overlapped so that the light-emitting sections 9 are disposed in a mosaic manner.

Embodiment 2

The present embodiment is described below mainly with reference to (a) and (b) of FIG. 15. The present embodiment is described in terms of points of difference from Embodiment 1. Components having the same functions as those of Embodiment 1 are given the same reference numerals, and as such, will not be described below.

Figure 15:
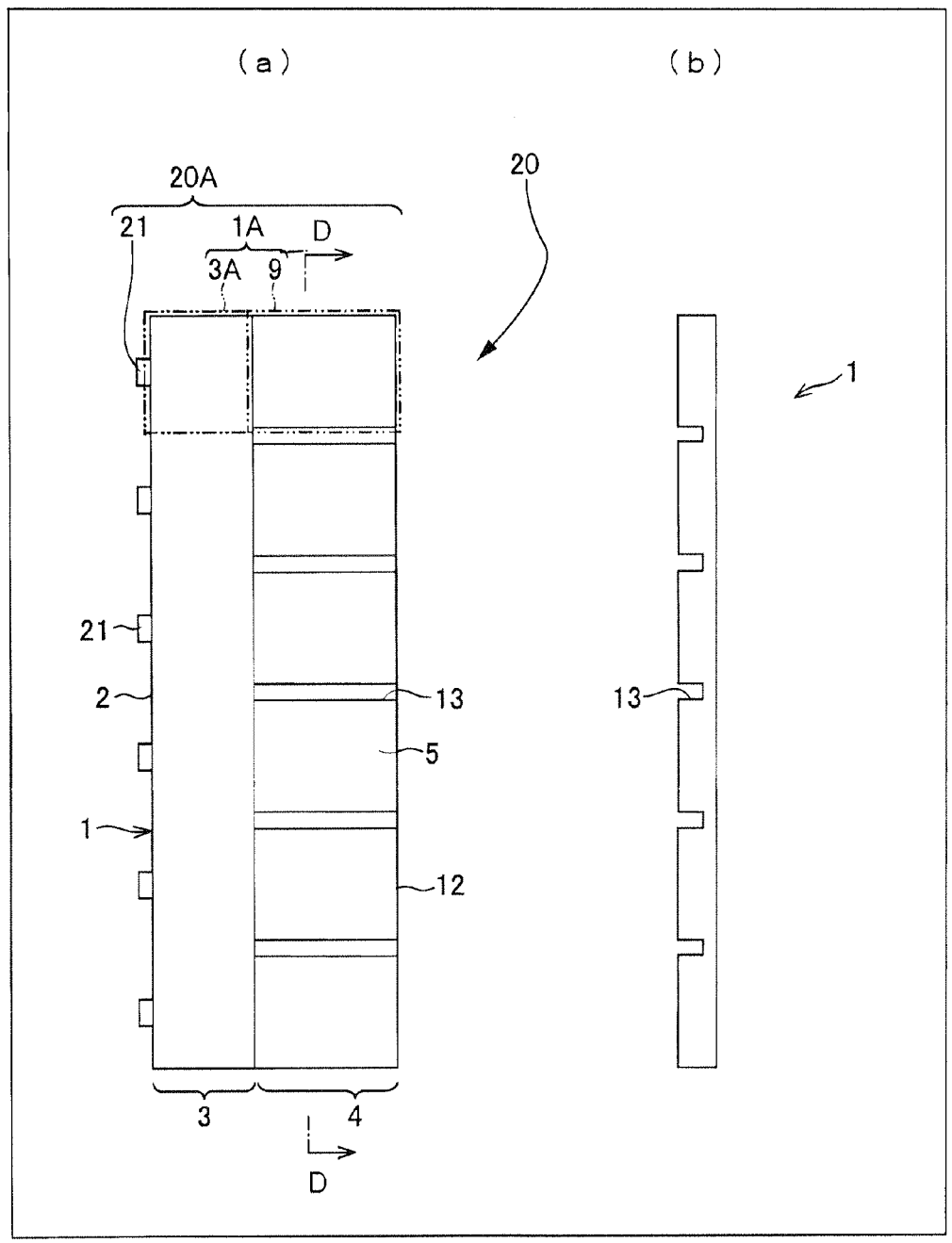
FIG. 15 shows (a) a plan view schematically showing the configuration of a light source unit in accordance with another embodiment and (b) a cross-sectional view of a light guide plate of the light source unit taken along the line D-D of (a) of FIG. 15.

FIG. 15 shows (a) a plan view schematically showing the configuration of a light source unit 20 in accordance with the present embodiment and (b) a cross-sectional view of a light guide plate 1 of the light source unit 20 taken along the line D-D of (a) of FIG. 15.

In the light source unit 20 in accordance with the present embodiment, the light guide plate 1 is provided with groove sections 13 (grooves) that replaces the slit section 8 of (a) and (b) of FIG. 1 as dividers that restrict transmission of light. That is, the light guide plate 1 in accordance with the present embodiment is constructed such that the illumination region 4 is divided into a plurality of light-emitting sections 9 not by the slit sections 8 but by the groove sections 13.

Also in the present embodiment, the light guide region 3 of the light guide plate 1 is continuous, and the illumination region 4 has the groove sections 13 formed in such a way as to extend from one end of the illumination region 4 to the other in parallel with the direction of the optical axis of a beam of light that is emitted from each light source 21.

Also in the present embodiment, as shown in (a) and (b) of FIG. 15, the illumination region 4 is divided into six regions as in the light guide plate 1 of (a) and (b) of FIG. 1; however, the number of regions is not particularly limited as long as the illumination region 4 is divided into two or more regions by providing at least one groove section 13. Further, the size of one light-emitting section 9 divided from another by a groove section 13 is not particularly limited, either.

The light sources 21 provided on the end face of the light guide plate 1 are provided, for example, in one-to-one correspondence with the light-emitting sections 9 in such a way as to correspond to the respective light-emitting sections 9 divided from one another by the groove sections 13. Thus, beams of light emitted from the light sources 21 are guided toward the respective light-emitting sections 9 divided from one another by the groove sections 13.

Reflection by the groove sections 13 is caused by forming the groove sections 13 in the illumination region 4 as described above. Light that was not reflected by a groove sections 13 and a portion of light that passed through a region directly below the groove section 13 leak into an adjacent light-emitting section 9; however, a certain percentage of guided light can be confined within the targeted light-emitting section 9.

In cases where a groove section 13 is not provided, all of the light that has entered a region corresponding to the groove section 13 is transmitted through the region. For this reason, the provision of a groove section 13 makes it possible to restrict a region of emission of a beam of light emitted from each light source 21. Therefore, the present embodiment also makes it possible to, by independently adjusting the light intensity of a light source 21 corresponding to each light-emitting section 9, independently adjust the amount of light that is radiated from each light-emitting section 9. For this reason, the present embodiment also makes it possible to independently adjust the illumination luminance of each separate light-emitting section 9, thus making it possible to provide a light guide plate 1 that has a plurality of independent light-emitting sections 9 while being a single light guide plate.

The complete division of the illumination region 4 as shown above in Embodiment 1 brings about a merit of enhancing contrast between adjacent light-emitting sections 9. In this case, a conspicuous borderline appears because the boundary between the light-emitting sections 9 is emphasized. However, the division of the light-emitting sections 9 from one another by the groove sections 13 as described above can blur the boundary between one light-emitting section 9 and another.

Moreover, unlike Embodiment 1, the present embodiment has no space so provided on the boundary section between one light-emitting section 9 and another as to pass through the top and bottom surfaces of the light guide plate 1, whereby adjacent light-emitting sections 9 are connected by the undersurface of the light guide plate 1 in the boundary section. This brings about such an advantage as being high in strength and being sturdy in construction.

The present embodiment is not particularly limited in method for forming the light guide plate 1 or in method for forming the groove sections 13, either. For example, the same method as in Embodiment 1 above can be used. Further, the present embodiment is not limited in cutting means for cutting (boring) the light guide plate 1 to form the groove sections 13, either. For example, the same cutting means as in Embodiment 1 above can be used.

Also in the present embodiment, the amount of light that is emitted from the boundary section (which, in the present embodiment, is a region corresponding to the upper surface of each groove section 13) is restricted. For this purpose, it is preferable that the groove sections 13 be as small as possible in width. The width of each groove section 13 is not particularly limited, but is preferably set to be not more than 1 mm. Further, the depth of each groove section 13 is not particularly limited, and only needs to be appropriately set from the point of view of a balance between an effect of confining guided light within the targeted light-emitting section 9 and shape reinforcement (strength), or from the point of view of a balance among an effect of blurring the boundary between one light-emitting section 9 and another, and contrast between adjacent light-emitting sections 9, and shape reinforcement, so that a desired effect can be obtained.

The groove sections 13 may be formed on the top surface on the light guide plate 1, or may be formed on the bottom surface. Whether to form the groove sections 13 on the top or bottom surface of the light guide plate 1 is not particularly limited, and only needs to be appropriately set from the point of view of a balance between (i) contrast between adjacent light-emitting sections 9 and (ii) an effect of blurring the boundary between one light-emitting section 9 and another, or from the point of view of uniformity in display, so that a desired effect can be obtained.

Further, in the present embodiment, the groove sections 13 may be concavities, V-shaped grooves, or so-called notches. Further, the groove sections 13 may be formed by fine cracks.

Embodiment 3

The present embodiment is described below mainly with reference to (a) and (b) of FIG. 16 and (a) and (b) of FIG. 17. The present embodiment is described in terms of points of difference from Embodiments 1 and 2. Components having the same functions as those of Embodiment 1 and 2 are given the same reference numerals, and as such, will not be described below.

Figure 16:
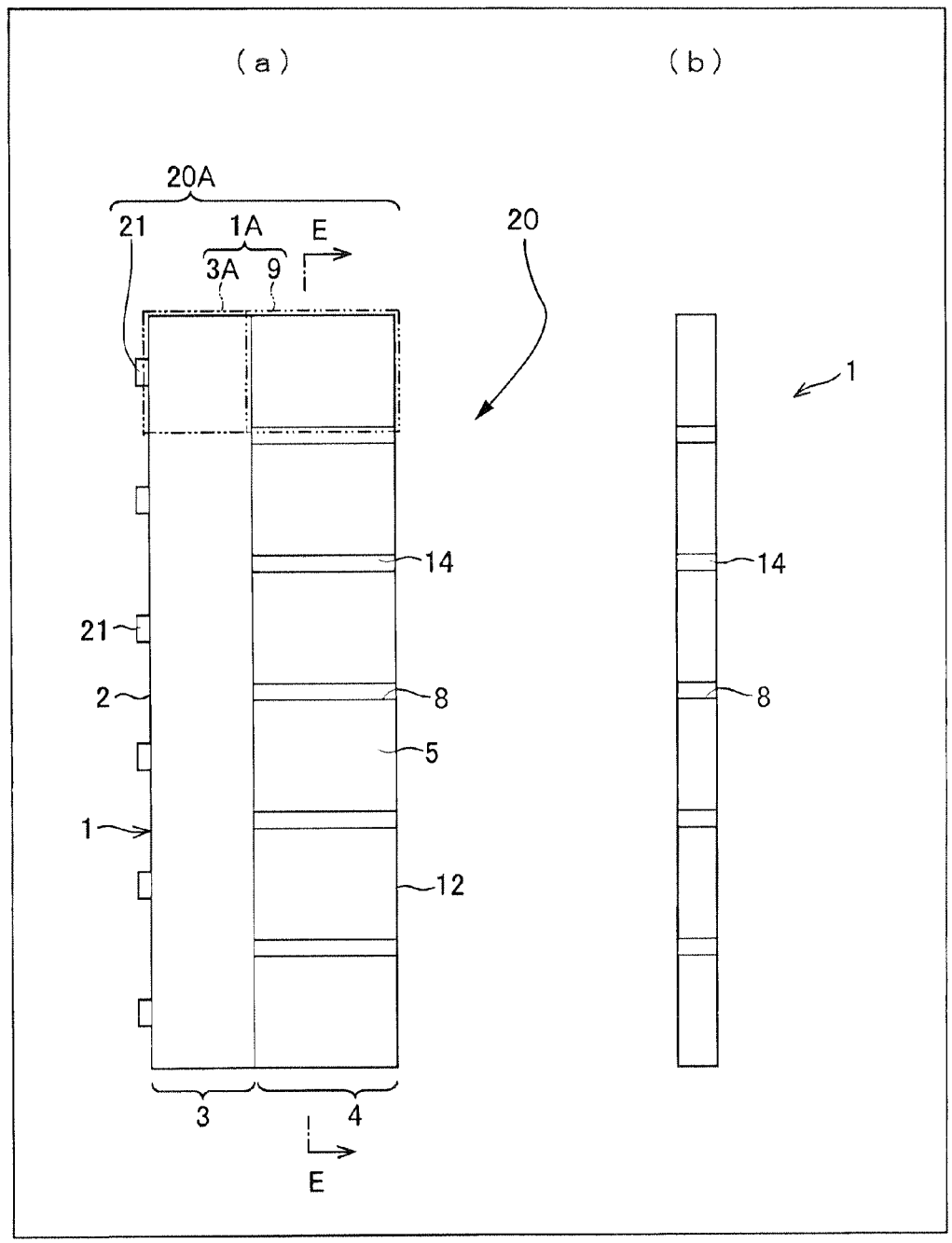
FIG. 16 shows (a) a plan view schematically showing the configuration of a light source unit in accordance with still another embodiment and (b) a cross-sectional view of a light guide plate of the light source unit taken along the line E-E of (a) of FIG. 16.

FIG. 16 shows (a) a plan view schematically showing the configuration of a light source unit 20 in accordance with the present embodiment and (b) a cross-sectional view of a light guide plate 1 of the light source unit 20 taken along the line E-E of (a) of FIG. 16. FIG. 17 shows (a) a plan view schematically showing the configuration of another light source unit 20 in accordance with the present embodiment and (b) a cross-sectional view of a light guide plate 1 of the light source unit 20 taken along the line F-F of (a) of FIG. 17.

A light source unit 20 in accordance with the present embodiment uses dividers, made of a scattering substance (light-scattering substance), which serve as dividers that restrict transmission of light. More specifically, in the present embodiment, as shown in (a) and (b) of FIG. 16 or (a) and (b) of FIG. 17, the illumination region 4 has scattering regions composed of scattering members 14 provided in parallel with the direction of the optical axis of a beam of light that is emitted from each light source 21. Examples of the scattering members 14 include scattering walls. It should be noted that the scattering members 14 also encompass directivity scattering members (reflecting members).

Also in the present embodiment, the light guide region 3 of the light guide plate 1 is continuous, and the illumination region 4 has the scattering members 14 provided in such a way as to extend from one end of the illumination region 4 to the other.

Figure 17:
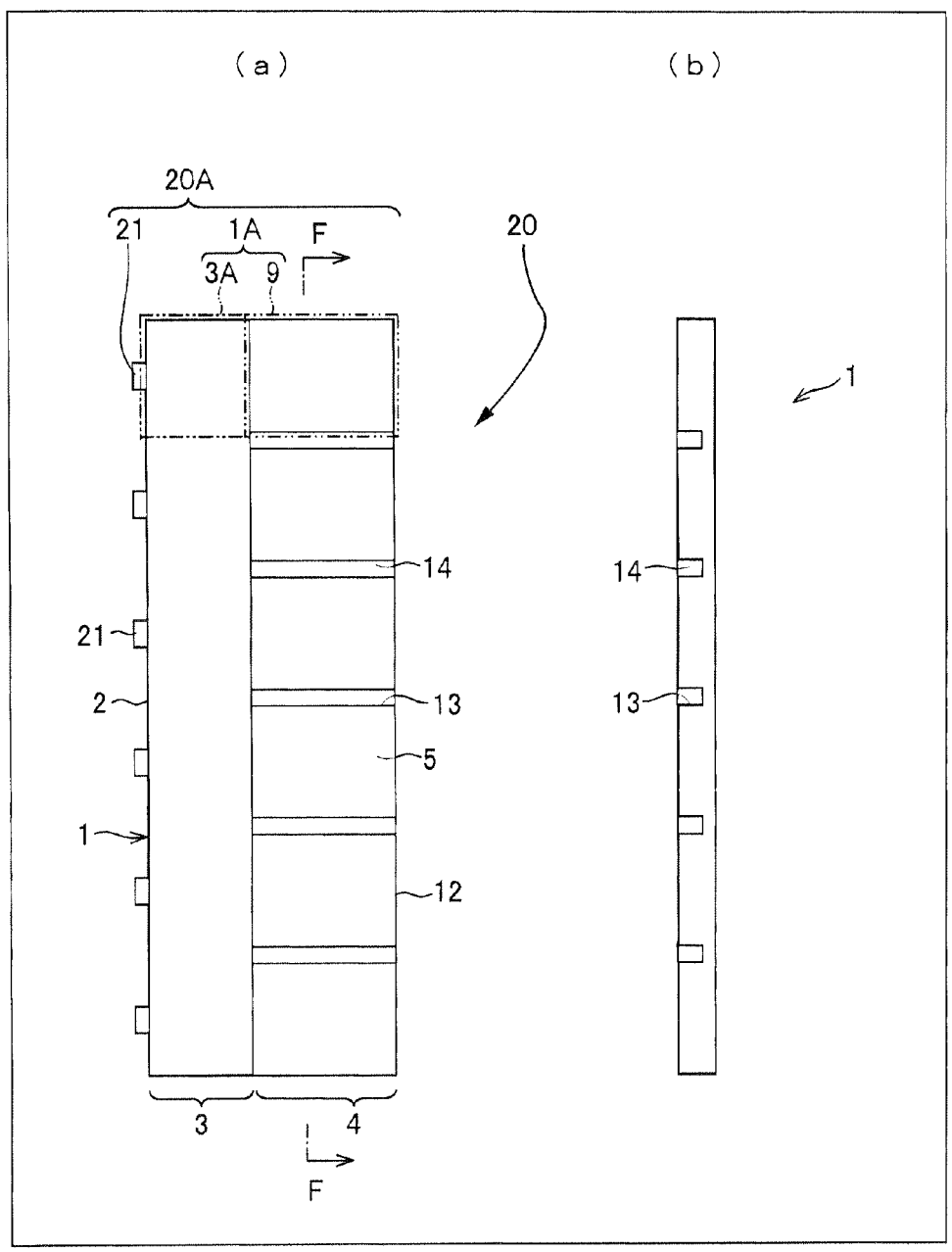
FIG. 17 shows (a) a plan view schematically showing the configuration of a light source unit in accordance with still another embodiment and (b) a cross-sectional view of a light guide plate of the light source unit taken along the line F-F of (a) of FIG. 17.

Also in the present embodiment, as shown in (a) and (b) of FIG. 16 or (a) and (b) of FIG. 17, the illumination region 4 is divided into six regions; however, the number of regions is not particularly limited as long as the illumination region 4 is divided into two or more regions by providing at least one scattering member 14. Further, the size of one light-emitting section 9 divided, from another by a scattering member 14 is not particularly limited, either.

The light sources 21 provided on the light-entering end face 2 of the light guide plate 1 are provided, for example, in one-to-one correspondence with the light-emitting sections 9 in such a way as to correspond to the respective light-emitting sections 9 divided from one another by the scattering members 14. Thus, beams of light emitted from the light sources 21 are guided toward the respective light-emitting sections 9 divided from one another by the scattering members 14. Each light source 21 is disposed, for example, so that its center is located on an extension of the central axis of the corresponding light-emitting section 9.

The provision of a scattering member 14 in the boundary section between one light-emitting section 9 and another as described above causes a portion of light to leak into an adjacent light-emitting section 9; however, a certain percentage of guided light can be confined within the targeted light-emitting section 9.

In cases where a scattering member 14 is not provided, all of the light that has entered a region corresponding to the scattering member 14 is transmitted through the region. For this reason, the provision of a scattering member 14 makes it possible to restrict a region of emission of a beam of light emitted from each light source 21. Therefore, the present embodiment also makes it possible to, by independently adjusting the light intensity of a light source 21 corresponding to each light-emitting section 9, independently adjust the amount of light that is radiated from each light-emitting section 9.

Moreover, according to the present embodiment, as shown in (a) and (b) of FIG. 16 or (a) and (b) of FIG. 17, adjacent light-emitting sections 9 are connected via a scattering member 14. Therefore, the present embodiment is higher in strength and sturdier in construction than Embodiments 1 and 2. This stabilizes the shape of the light guide plate 1.

The present embodiment is not particularly limited in method for forming the light guide plate 1 or in method for forming the scattering members 14, either. For example, the same methods as in Embodiments 1 and 2 above can be used.

An example of the light source unit 20 in accordance with the present embodiment is configured such that, as shown in (a) and (b) of FIG. 16, the slit sections 8 of (a) and (b) of FIG. 1 has a scattering substance introduced (charged) therein, or such that, as shown in (a) and (b) of FIG. 17, the groove sections 13 of (a) and (b) of FIG. 15 has a scattering substance introduced therein.

The scattering members 14 can be formed by such a method as follows: a method including (i) forming slits sections 8 or groove section 13 in a light guide plate 1 with use of a mold or cutting means and (ii) filling the slits sections 8 or the groove section 13 with a scattering substance or a mixture of a scattering substance and a base resin; a method for, in forming a light guide plate 1 from a transparent resin with use of a mold, embedding the scattering members 14 in the transparent resin before the transparent resin hardens; or multi-color molding (e.g., coinjection molding).

The scattering substance is not particularly limited as long as it can scatter light, and can be realized by a conventional publicly-known scattering substance. Usable examples of the scattering substance include pigments such as titanium oxide and silica. Among these scattering substances, a material, such as titanium oxide or silica, which absorbs little light is preferred.

The scattering substance can mixed for use with the transparent resin, of which the light guide plate 1 is made. In cases where the scattering substance is mixed for use with the transparent resin, which serves as a base resin, the content of the scattering substance in each scattering member 14 (mixing ratio of the scattering substance to the transparent resin) is not particularly limited, and may be appropriately set so that a desired effect is obtained.

Further, for the purpose of blurring the borderlines or improving efficiency of emission by controlling the angle of emission of light that is emitted by being scattered by the scattering members 14, the proportion of the scattering substance in each scattering member 14 may vary between the base and top of the scattering member 14 (e.g., between the bottom and top of the groove section 13).

Further, the width and height of each scattering member 14, i.e., the width and height of each slit section 8 or groove section 13 having a scattering substance introduced therein may be set in the same way as in Embodiments 1 and 2 above.

The present embodiment has been described by way of example where, as described above, the dividers are realized by scattering members 14 mainly containing a scattering substance. However, the present embodiment is not limited to this. The scattering regions do not need to be separated from other regions by defined borderlines.

Further, the same effects can be obtained by providing a light-blocking body instead of the scattering substance. The light-blocking body is not particularly limited as long as it has light-blocking properties, and can be realized, for example, by a conventional publicly-known light-blocking body.

Further, these dividers may be provided in such a way as to pass through the top and bottom surfaces of the light guide plate 1, or may be provided in such a way as to extend from the top surface of the light guide plate 1 to the bottom surface and not to pass through the top and bottom surfaces of the light guide plate 1. Further, the dividers may be provided in such a way as to extend from the bottom surface of the light guide plate 1 to the top surface and not to pass through the top and bottom surfaces of the light guide plate 1, and may be provided only inside of the light guide plate 1.

Embodiment 4

The present embodiment is described below mainly with reference to FIGS. 18, 19, and 33. The present embodiment is described in terms of points of difference from Embodiments 1 to 3. Components having the same functions as those of Embodiment 1 to 3 are given the same reference numerals, and as such, will not be described below.

Figure 18:
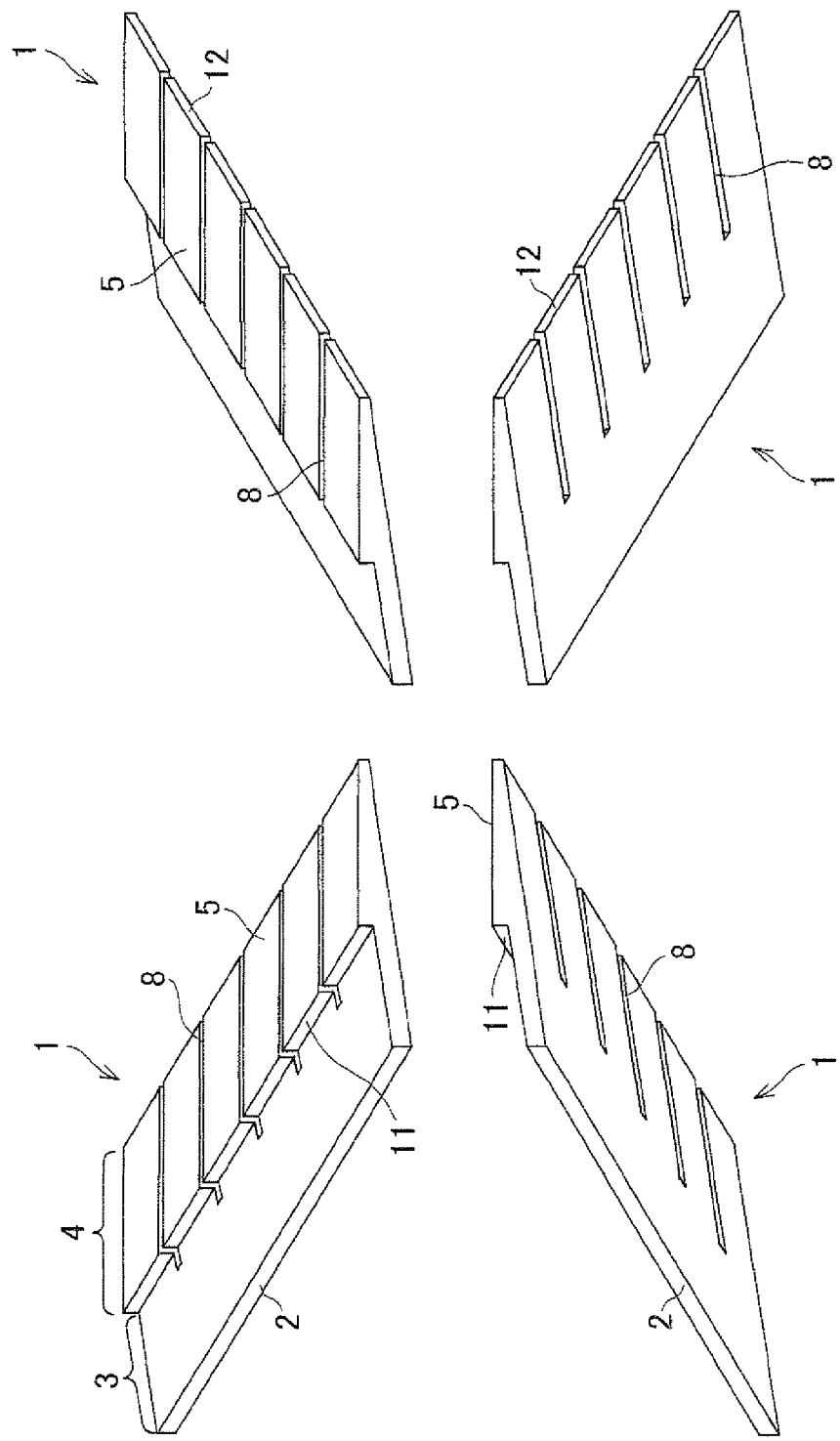
FIG. 18 juxtaposes perspective views showing the way a light guide plate in accordance with still another embodiment looks when viewed from different angles.

FIG. 18 juxtaposes perspective views showing the way a light guide plate 1 in accordance with the present embodiment looks when viewed from different angles. FIG. 19 juxtaposes a front view, left-side view, plan view, and right-side view of the light guide plate 1 of FIG. 18.

Figure 19:
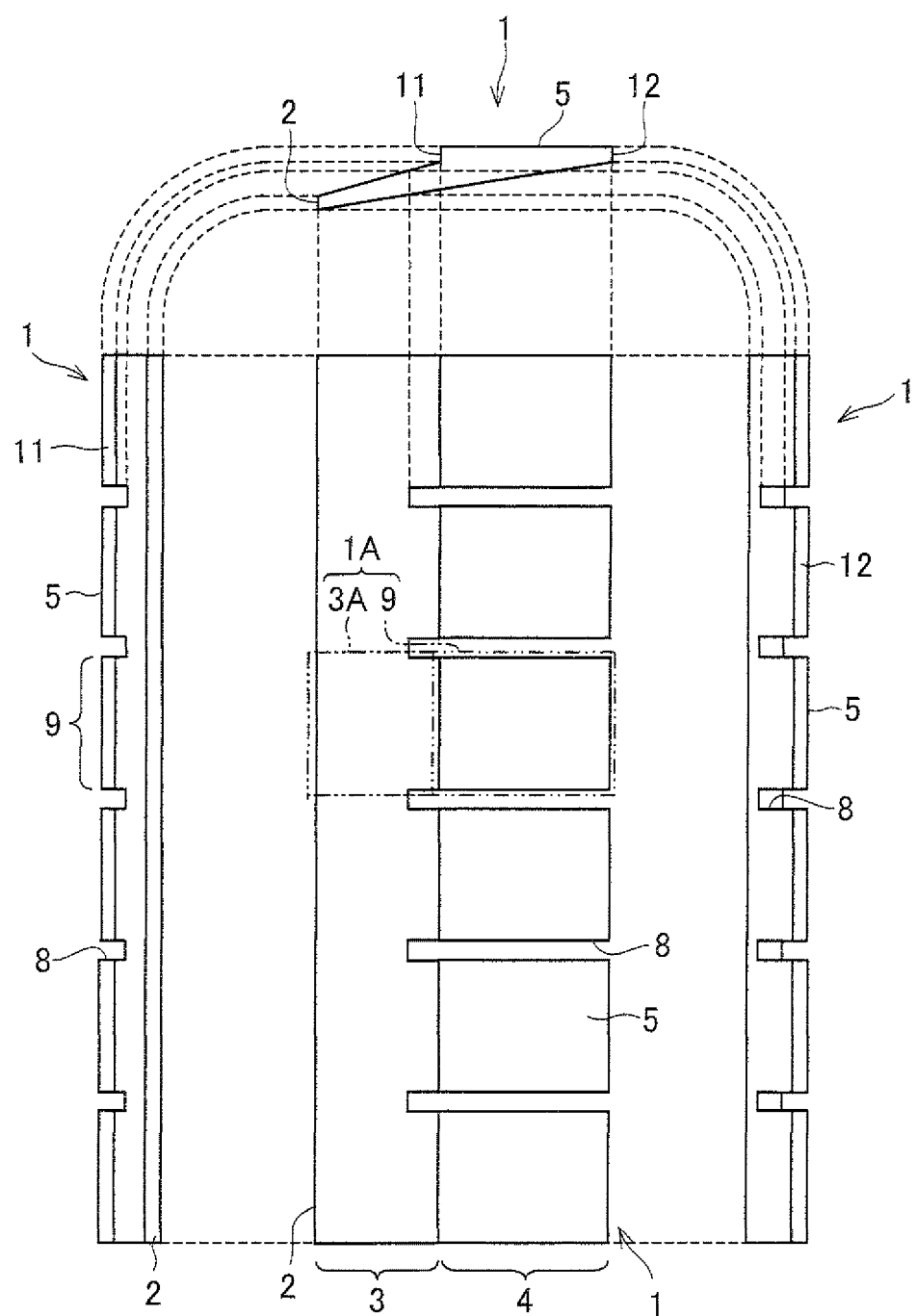
FIG. 19 juxtaposes a front view, left-side view, plan view, and right-side view of the light guide plate of FIG. 18.

As shown in FIGS. 18 and 19, a light source unit 20 in accordance with the present embodiment has an illumination region 4 provided with slit sections 8 extending from one end of the illumination region 4 to the other in parallel with the direction of the optical axis of a beam of light that is emitted from each light source 21, as in Embodiment 1 above.

The light guide plate 1 in accordance with the present embodiment is different from Embodiment 1 in that the slit sections 8 are provided in part of a light guide region 3, as well as in the illumination region 4, in such a way as to extend in parallel with the direction of the optical axis of a beam of light that is emitted from each light source 21.

The light guide region 3 of the light guide plate 1 is continuous; however, since the slit sections 8 are provided in the illumination region 4 in such a way as to extend, into part of the light guide region 3, not only is the illumination region 4 divided into a plurality of regions, but also the light guide region 3 is partially divided into a plurality of regions.

For this reason, as shown in FIG. 19, the light guide plate 1 in accordance with the present embodiment includes: a plurality of light guide blocks 1A of (a) of FIG. 1 arranged one-dimensionally; a light guide region 3 in which the light guide sections 3A of adjacent light guide blocks 1A are connected partially to each other; and an optical divider provided between adjacent light-emitting sections 9. Further, although not shown, the light source unit 20 in accordance with the present embodiment is configured such that a plurality of light source blocks each composed of such a light guide block 1A and a light source 21 are connected by part of each light guide section 3A as described above.

Also in the present embodiment, as long as the illumination region 4 is divided into two or more regions by at least one slit section 8, the number of regions and the size of each light-emitting section 9 are not particularly limited.

Further, also in the present embodiment, the light sources 21 are provided in one-to-one correspondence with the light-emitting sections 9 in such a way as to correspond to the respective light-emitting sections 9 divided from one another by the slit sections 8. Thus, beams of light emitted from the light sources 21 are guided toward the respective light-emitting sections 9 divided from one another by the slit sections 8. Each light source 21 is disposed, for example, so that its center is located on an extension of the central axis of the corresponding light-emitting section 9.

Since the slit sections 8 are provided in part of the light guide region 3 in such a way as to extend into the illumination region 4, the present embodiment brings about an effect of making it difficult for a beam of light emitted from each light source 21 to leak into a light source block other than the light source block to which the light source 21 belongs (esp., into a region other than a light-emitting section 9 belonging to the same light source block), in addition to the effect described above in Embodiment 1.

As mentioned above, it is preferable that a slit section 8 be provided in a region of overlap between regions that are irradiated by adjacent light sources 21. The formation of a slit section 8 in part of the light guide region 3 as described above makes it possible for a beam of light emitted from each light source 21 to be sufficiently diffused in the light guide region 3, and makes it possible for a beam of light emitted from each light source 21 to be efficiently guided toward and confined within the targeted light-emitting section 9. Therefore, the foregoing configuration makes it easy to control the luminance of each separate light-emitting section 9 and equalize the luminance among the light-emitting sections 9.

A preferred length of each slit section 8 in the light guide plate 1 is described below with reference to FIG. 33.

Figure 33:
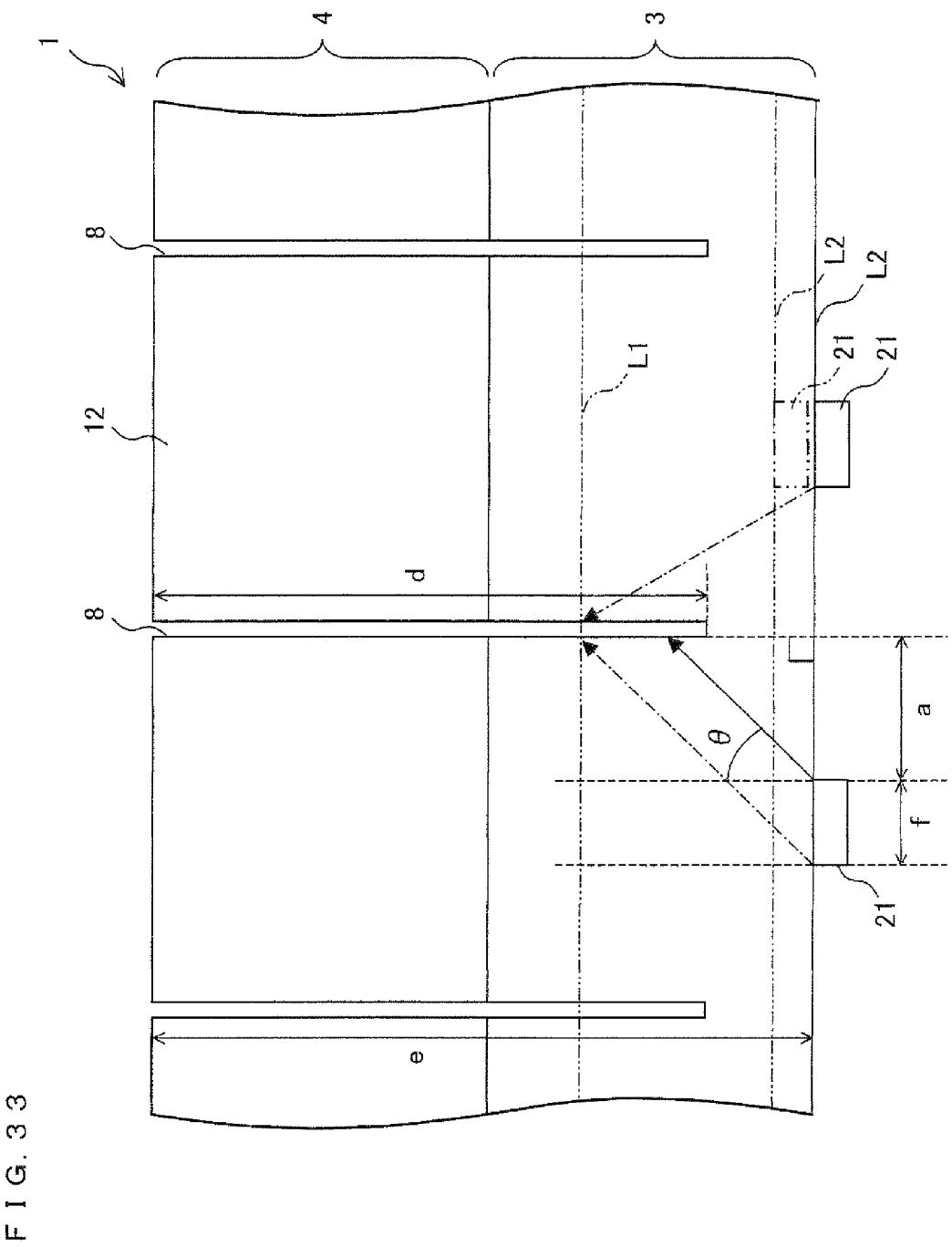
FIG. 33 is a plan view schematically showing the configuration of a main part of the light guide plate to explain a preferred length of a slit section in the light source unit.

FIG. 33 is a plan view schematically showing the configuration of a main part of the light guide plate 1 to explain a preferred length of each slit section 8 in the light guide plate 1.

As mentioned above, it is preferable that each slit section 8 be provided in a region of overlap between regions that are irradiated by adjacent light sources 21. It is desirable that, as shown in FIG. 33, each slit section 8 include a point, located in the illumination region, at which incident beams of light from light sources 21 provided to adjacent light-emitting sections 9 intersect. Further, it is desirable that, as shown in FIG. 33, an end of each slit section 8 that faces the light sources 21 be located between the line L1 and the line L2. The line L1 as seen in a two-dimensional view is a line which includes a point of intersection between beams of light emitted from light sources 21 provided to light-emitting sections 9 adjacent to each other and which extends in parallel with the boundary between the illumination region 4 and the light guide region 3. The line L2 is a line which includes the light sources 21 and which extends in parallel with the boundary between the illumination region 4 and the light guide region 3. It should be noted that the light guide region 3 is at least partially continuous.

That is, in cases where the light sources 21 are provided on one end surface of the light guide plate 1 and the illumination region 4 and the light guide region 3 are arranged in this order from the light sources 21 along the principal surfaces of the light guide plate 1, it is preferable that the optical axial length from the end face to each slit section 8 be not more than the optical axial length from the end face to the point of intersection between beams of light emitted from adjacent light sources 21.

Even in cases where the light sources 21 are provided on the lower surface of the light guide plate 1 as indicated by the chain double-dashed lines in FIG. 33, it is preferable that each slit section 8 be provided in a region of overlap between regions that are irradiated by adjacent light sources 21. For this reason, it is preferable, also in this case, that an end of each slit section 8 that faces the light sources 21 be located between (i) the line L1, which includes a point of intersection between beams of light emitted from light sources 21 (indicated by a chain double-dashed line in FIG. 33) respectively provided to adjacent light-emitting sections 9 and which extends in parallel with the boundary between the illumination region 4 and the light guide region 3, and (ii) the line L2 indicated by a chain double-dashed line, or more preferably between the line L1 and an end of the light guide region 3 opposite the illumination region 4. It should be noted, also in this case, that the light guide region 3 is based on the premise that light guide sections 3A of (a) of FIG. 1 are connected at least partially to one another.

More specifically, as shown in FIG. 33, it is preferable that, in cases where each light source 21 is an LED, the length d of each slit section 8 from the apical surface 12 of the illumination region 4 satisfy:

$$d \geq e - \{(a+f) \times \tan(90°-\theta)\},$$

or more preferably $$d \geq e - \{a \times \tan(90°-\theta)\},$$

where the first light-emitting surface end is an end of the light-emitting surface of the LED that faces an extension of the slit section 8, the second light-emitting surface end is an end of the light-emitting surface of the LED opposite the first light-emitting surface end, a is the distance between the extension of the slit section 8 and the first light-emitting surface end, f is the distance between the first light-emitting surface end and the second light-emitting surface end (i.e., the width of the LED), θ is the critical angle formed by the refractive index of the light guide plate 1, d is the length of the slit section 8, and e is the length of the light guide plate 1. Thus, all of the light emitted from the light source 21 can be reflected.

In other words, it is preferable that each slit section 8 be provided in a position where the distance (e−d) from the light-entering end face 2 to an end of the slit section 8 that faces the light sources 21 satisfies e−d≦(a+f)×tan(90°−θ), or more preferably e−d≦(a)×tan(90°−θ).

According to Snell's law, an incident beam of light from each light source 21 enters the light guide plate 1 at not more than the critical angle θ.

θ is indicated by sin θ=1/n1, where n1 is the refractive index of the light guide plate 1. The critical angle θ formed by the refractive index of the light guide plate 1 is approximately 39° in cases where the light guide plate 1 is made of polycarbonate (refractive index n1=1.59), and approximately 42° in cases where the light guide plate 1 is made of an acrylic resin (refractive index n1=1.49).

Although the present embodiment has been described by way of example of configuration where, as described above, the slit sections 8 are provided in part of the light guide region 3 as well as in the illumination region 4, the present embodiment is not limited to this. For example, the slit sections 8 may be replaced by groove sections 13 or scattering members 14 as shown above in Embodiment 2 or 3. This makes it possible to obtain the above effect in addition to the effect of Embodiment 2 or 3.

The present embodiment is not limited in method for forming the light guide plate 1, either. For example, the light guide plate 1 can be formed in the same way as in Embodiment 1, 2, or 3 above.

Embodiment 5

The present embodiment is described below mainly with reference to FIGS. 20 and 21. The present embodiment is described in terms of points of difference from Embodiments 1 to 4. Components having the same functions as those of Embodiment 1 to 4 are given the same reference numerals, and as such, will not be described below.

Figure 20:
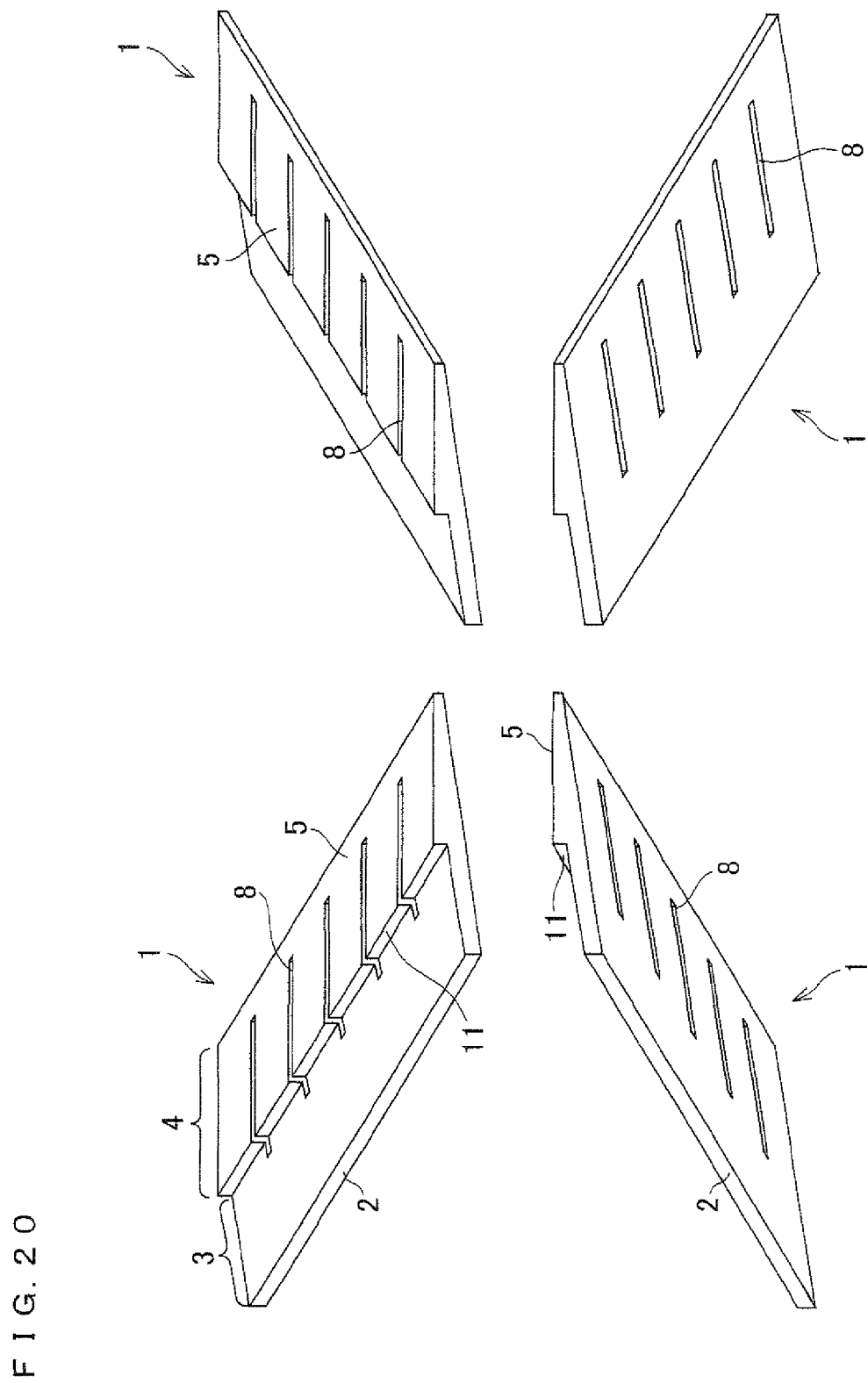
FIG. 20 juxtaposes perspective views showing the way a light guide plate in accordance with still another embodiment looks when viewed from different angles.

FIG. 20 juxtaposes perspective views showing the way a light guide plate 1 in accordance with the present embodiment looks when viewed from different angles. FIG. 21 juxtaposes a front view, left-side view, plan view, and right-side view of the light guide plate 1 of FIG. 20.

As shown in FIGS. 20 and 21, the light source unit 20 in accordance with the present embodiment is configured, as in Embodiment 4 above, such that while the light guide region 3 of the light guide plate 1 is continuous, the slit sections 8 are provided in the illumination region 4 in such a way as to extend into part of the light guide region 3.

However, unlike in Embodiment 4, the light source unit 20 in accordance with the present embodiment is configured such that the illumination region 4 of the light guide plate 1 is not completely divided by the slit section 8 so the illumination region 4 has a continuous apical end.

That is, in the light guide plate 1 in accordance with the present embodiment, the illumination region 4 is partially divided into a plurality of light-emitting sections 9, and the light guide region 3 is partially divided into a plurality of light guide sections 3A.

That is, as shown in FIG. 21, the light guide plate 1 in accordance with the present embodiment includes: a plurality of light guide blocks 1A of prior art arranged one-dimensionally; a light guide region 3 in which the light guide sections 3A of adjacent light guide blocks 1A are connected partially to each other; and an optical divider provided in part of the space between adjacent light-emitting sections 9. Further, although not shown, the light source unit 20 in accordance with the present embodiment is configured such that a plurality of light source blocks 20A each composed of such a light guide block 1A and a light source 21 are connected by part of each light guide section 3A and part of each light-emitting section 9 as described above.

Further, also in the present embodiment, as in Embodiment 4 above, it is desirable that, as shown in FIG. 33, an end of each slit section 8 that faces the light sources 21 as seen in a two-dimensional view be located closer to the light sources 21 than is a point of intersection between beams of light emitted from light sources 21 provided to adjacent regions.

Further, also in the present embodiment, as long as the illumination region 4 is divided into two or more regions by at least one slit section 8, the number of regions and the size of each light-emitting section 9 are not particularly limited.

Furthermore, also in the present embodiment, the light sources 21 are provided in one-to-one correspondence with the light-emitting sections 9 in such a way as to correspond to the respective light-emitting sections 9 divided from one another by the slit sections 8. Light guided inside of the light guide plate 1 is divided by the slit sections 8 for each light-emitting section 9. Thus, beams of light emitted from the light sources 21 are guided toward the respective light-emitting sections 9 divided from one another by the slit sections 8. Each light source 21 is disposed, for example, so that its center is located on an extension of the central axis of the corresponding light-emitting section 9.

Although the present embodiment has been described by way of example of configuration where, as described above, the slit sections 8 are provided in part of the light guide region 4 as well as in part of the illumination region 4, the present embodiment is not limited to this. For example, the slit sections 8 may be replaced by groove sections 13 or scattering members 14 as shown above in Embodiment 2 or 3.

The present embodiment can bring about the effect described above in Embodiment 4. Moreover, in cases where, as described, above, no dividers are provided in the apical ends of the separate illumination regions 4 so that the apical ends are connected to one another or, in particular, in cases where the apical ends are formed integrally from the same material, the present embodiment can enhance the construction of the light guide plate 1.

The present embodiment is not limited in method for forming the light guide plate 1, either. For example, it is possible to appropriately select from the forming methods described above in Embodiment 1 to 3.

Embodiment 6

The present embodiment is described below mainly with reference to (a) and (b) of FIG. 22. The present embodiment is described in terms of points of difference from Embodiments 1 to 5. Components having the same functions as those of Embodiment 1 to 5 are given the same reference numerals, and as such, will not be described below.

Figure 22:
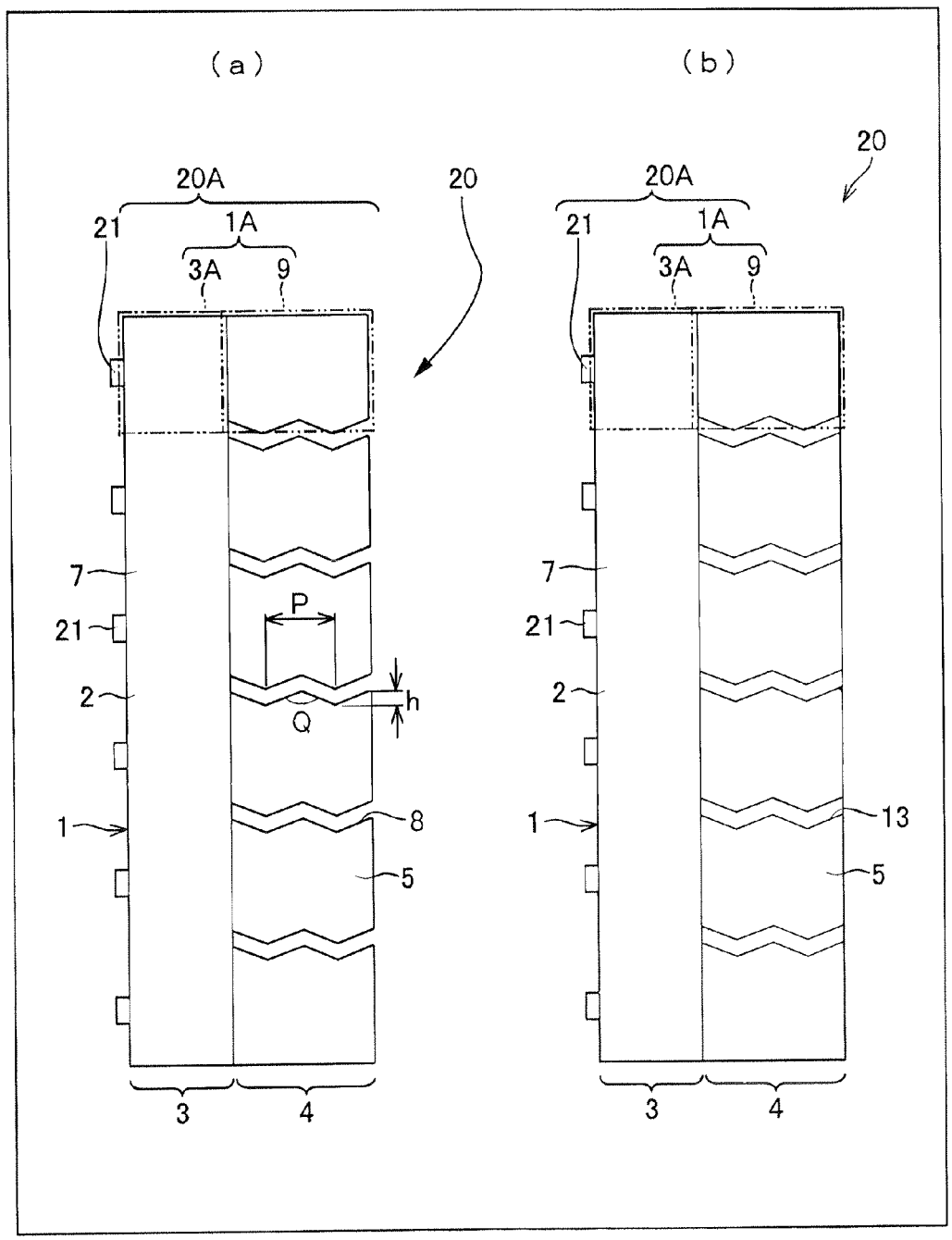
FIG. 22 shows plan views (a) and (b) each schematically showing an example of the configuration of a light guide plate in accordance with still another embodiment.

FIG. 22 shows plan views (a) and (b) each schematically showing an example of the configuration of a light guide plate 1 in accordance with the present embodiment.

While Embodiments 1 to 5 have been described by way of example where the boundary section between one light-emitting section 9 and another is formed in a linear pattern, the present embodiment is described by way of example where the boundary section between one light-emitting section 9 and another is formed in a saw-tooth pattern (zigzag pattern).

For example, as shown in (a) and (b) of FIG. 22, the light guide plate 1 in accordance with the present embodiment is the same as that described above in Embodiment 1 or 2, except that the slit sections 8 of (a) of FIG. 1 or the groove sections 13 of (a) of FIG. 15 are formed in a zigzag pattern.

Since the light-emitting section 9 are separated from one another in such a way as to have zigzag boundaries with one another, it is possible to obtain a blurring effect of blurring the boundary between one light-emitting section 9 and another, in addition to the effect described above in Embodiment 1 or 2, or to enhance the blurring effect.

The present embodiment has been described by way of example of the light guide plate 1 where the slit sections 8 of (a) of FIG. 1 or the groove sections 13 of (a) of FIG. 15 are formed in a zigzag pattern. However, the light guide plate 1 in accordance with the present embodiment is not limited to this. The present embodiment may be configured such that each divider in the light guide plates 1 described above in Embodiments 3 to 5 is formed in a zigzag pattern, as along as the boundary between one light-emitting section 9 and another is uneven. Further, the shape of the boundary is not limited to a zigzag pattern as described above, but may be the shape of waves, for example.

Further, in the present embodiment, the pitch P between adjacent saw teeth in each slit section 8 or groove section 13 (i.e., the distance between the respective vertices of the saw teeth), the angle Q formed by each saw-tooth, and the height h of each saw tooth are not particularly limited, and may be appropriately set so that the desired blurring effect can be obtained.

Embodiment 7

The present embodiment is described below mainly with reference to FIG. 34. The present embodiment is described in terms of points of difference from Embodiments 1 to 6. Components having the same functions as those of Embodiment 1 to 6 are given the same reference numerals, and as such, will not be described below.

Figure 34:
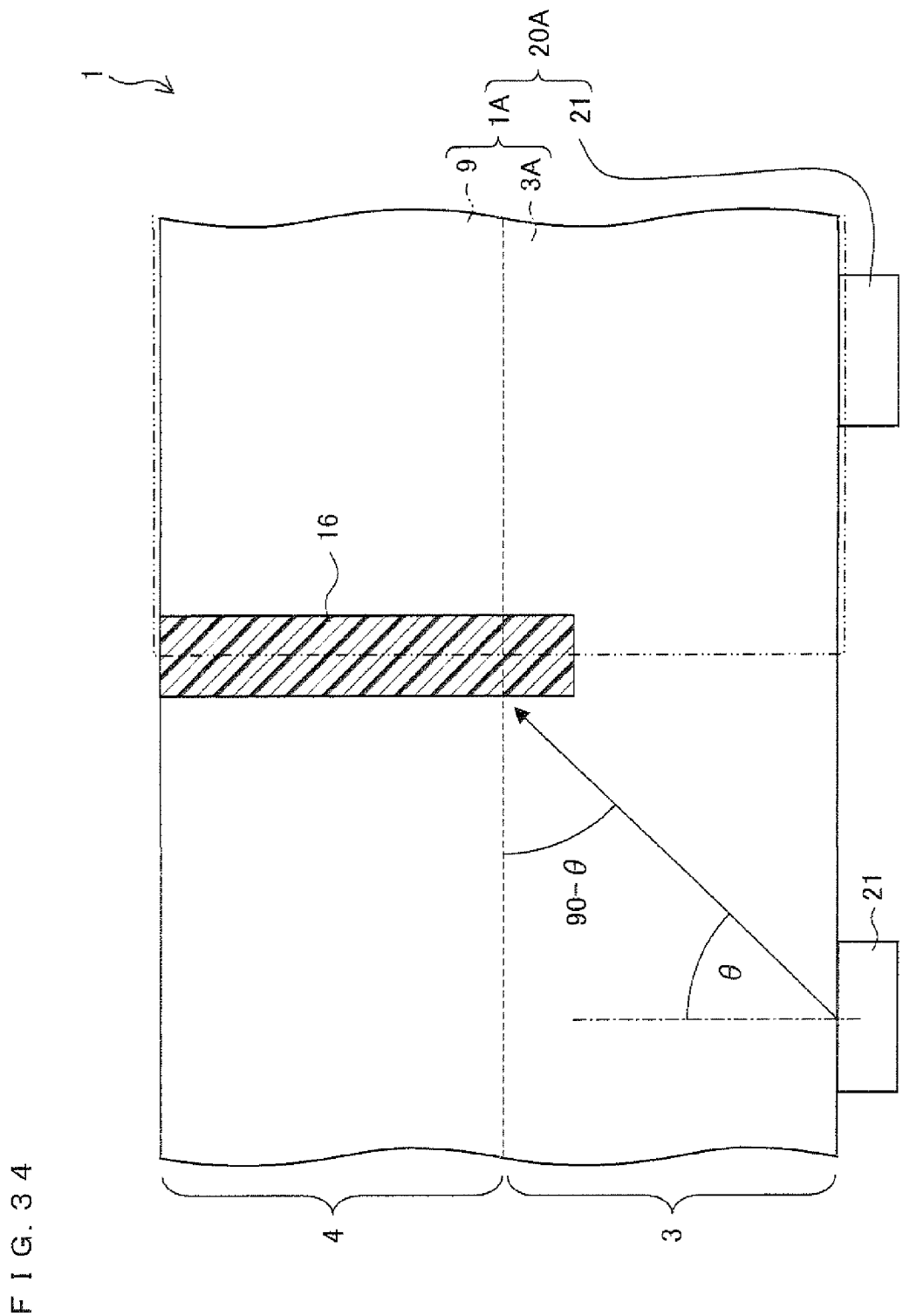
FIG. 34 is a plan view schematically showing the configuration of a main part of a light source unit in accordance with still another embodiment.

FIG. 34 is a plan view schematically showing the configuration of a main part of a light source unit 20 in accordance with the present embodiment.

As shown in FIG. 34, the light source unit 20 in accordance with the present embodiment has a light guide plate 1 provided with a layer (hereinafter referred to as "low refractive index layer") 16, serving as a divider that restricts transmission of light, which is lower in refractive index than parts other than the divider. It should be noted that the phrase "lower in refractive index than parts other than the divider" means "lower in refractive index than the material of which the light guide plate 1 is made".

Further, it is preferable that the low refractive index layer 16 or 16A satisfy a condition of total reflection (i.e., be made of a material that satisfies a condition of total reflection), and it is more preferable that the low refractive index layer 16 or 16A be provided so that, as mentioned above, all of the light emitted from the light source 21 is reflected.

As mentioned above, according to Snell's law, an incident beam of light from each light source 21 enters the light guide plate 1 at not more than θ. As mentioned above, θ is indicated by sin θ=1/n1, where n1 is the refractive index of the light guide plate 1.

Therefore, according to Snell's law, the condition under which all of the light incident on the light guide plate 1 is reflected by the low refractive index layer 16 and guided inside of the light guide plate 1 is sin(90°−θ)>n2/n1, where n2 is the refractive index of the low refractive index layer 16. From this equation, sin(90°−θ)=cos θ, and (sin θ)²+(cos θ)²=1; therefore, $1/(n1)^2 + (n2)^2/(n1)^2 < 1$. For n2, $n2 < |\sqrt{\{(n1)^2-1\}}|$.

Therefore, in order to satisfy the condition of total reflection, it is only necessary that the refractive index n2 of the low refractive index layer 16 satisfy Eq. (1) as follows:

$$n2 < |\sqrt{\{(n1)^2-1\}}| \qquad (1).$$

Since n1=1.49 in cases where the light guide plate is made of an acrylic resin, the low refractive index layer 16 only needs to satisfy n2<1.10, in order to satisfy the condition of total reflection. Alternatively, since n1=1.59 in cases where the light guide plate 1 is made of polycarbonate, the low refractive index layer 16 only needs to satisfy n2<1.236, in order to satisfy the condition of total reflection.

An example of a layer that satisfies such a condition is an air layer (n2=1.0). That is, the low refractive index layer 16 is exemplified by such a slit section 8 as described above. However, the present embodiment is not limited to this. The low refractive index layer 16 only needs to by a layer lower in refractive index than parts of the light guide plate 1 other than the low refractive index layer 16, or more preferably a layer that satisfies Eq. (1).

The divider can be realized, for example, by a mere reflecting layer. In this case, however, the reflectance causes a reduction in efficiency in the use of light. For this reason, it is desirable that the divider be made of a material that satisfies the above condition of total reflection.

Embodiment 8

Figure 35:
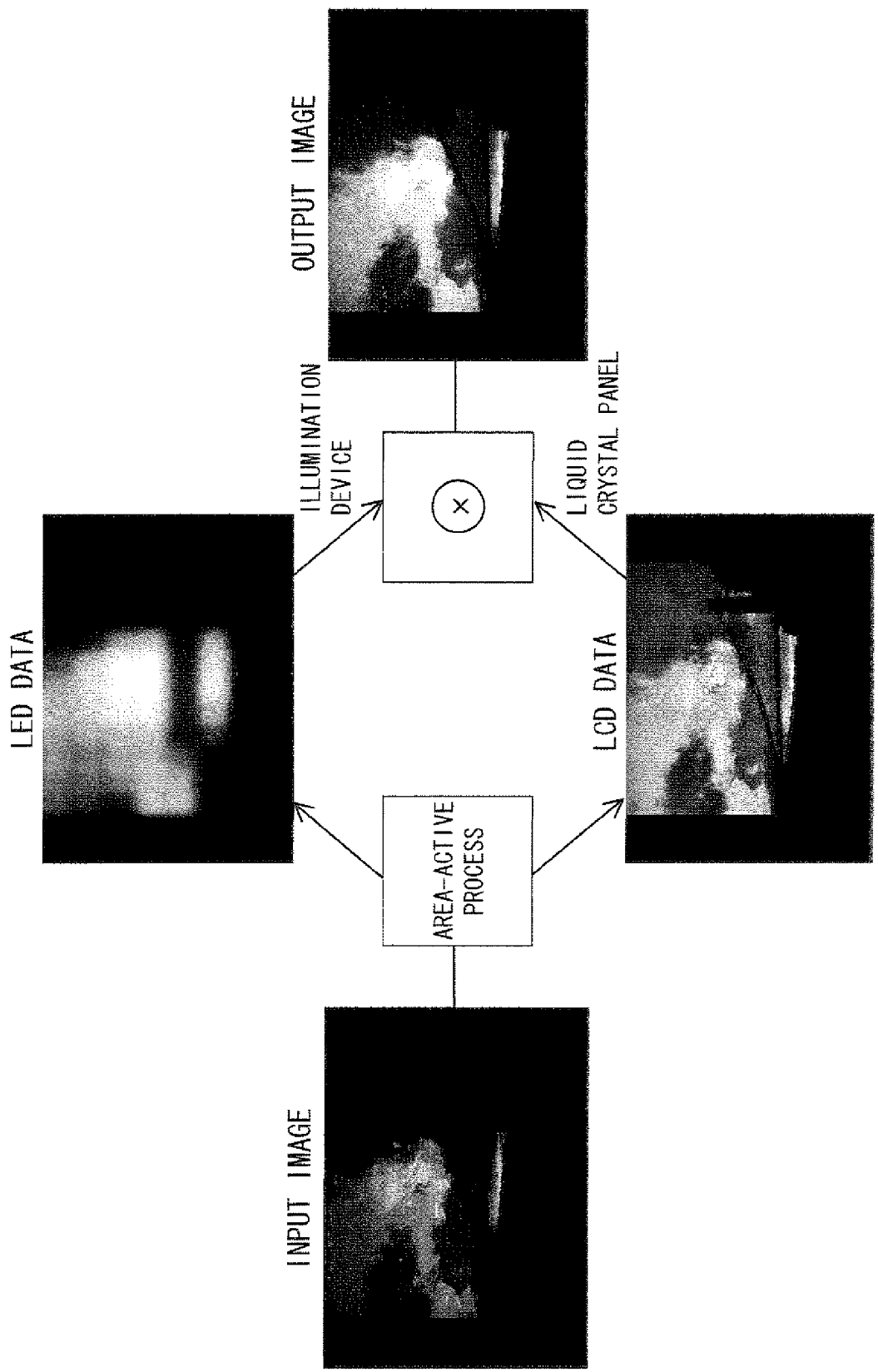
FIG. 35 is a plan view showing a principle of operation of area-active drive in the liquid crystal display device.

The present embodiment is described below mainly with reference to FIGS. 23, 24, and 35. The present embodiment is described in terms of points of difference from Embodiments 1 to 7. Components having the same functions as those of Embodiment 1 to 7 are given the same reference numerals, and as such, will not be described below.

Figure 23:
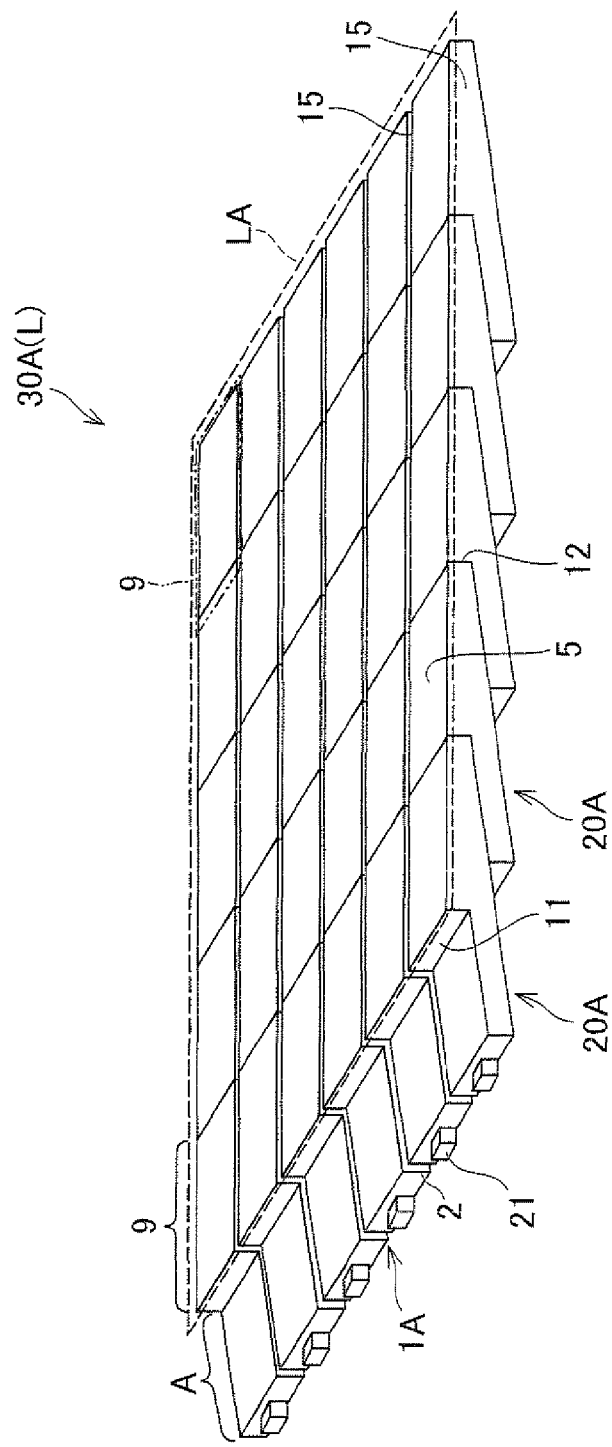
FIG. 23 is a perspective view schematically showing the configuration of an illumination device in accordance with still another embodiment.

FIG. 23 is a perspective view schematically showing the configuration of an illumination device in accordance with the present embodiment. FIG. 24 juxtaposes a front view, left-side view, plan view, and right-side view of a light source block 20A of the illumination device of FIG. 23.

Embodiments 1 to 7 have each described, as the illumination device L, an illumination device using a light guide plate 1 (divided light guide plate) whose illumination region 4 is divided into a plurality of light-emitting sections 9. On the other hand, the present embodiment describes, as the illumination device L, an illumination device 30A including a plurality of light-emitting sections 9 by providing a plurality of undivided light guide blocks 1A as light guide plates as shown in FIG. 23, instead of providing a plurality of separate light-emitting sections 9 in a light guide plate 1.

Figure 24:
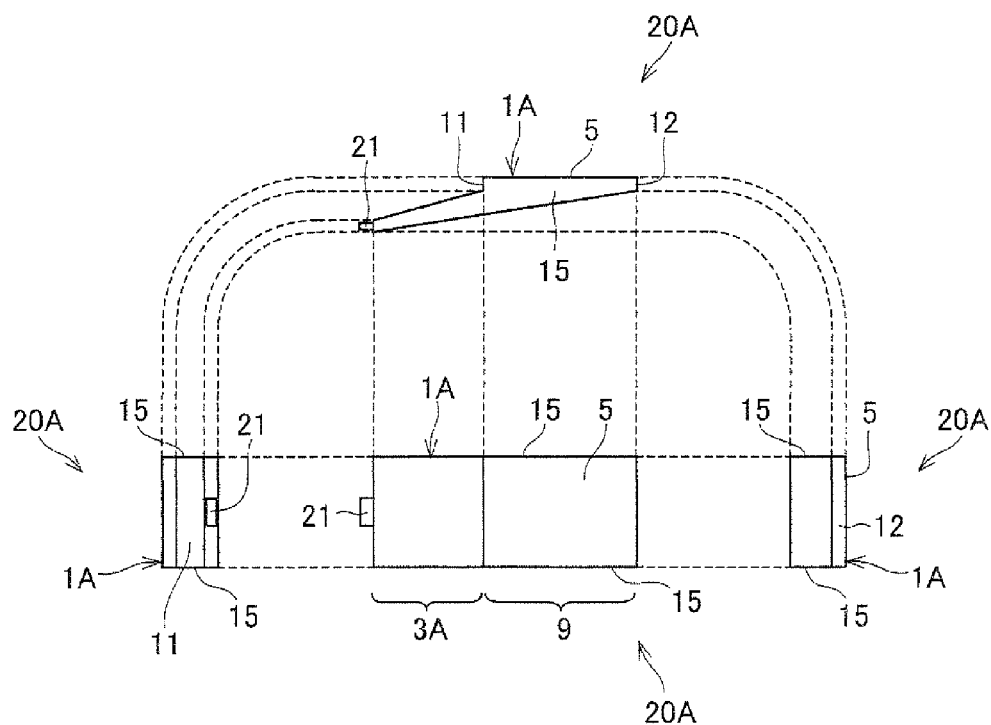
FIG. 24 juxtaposes a front view, left-side view, plan view, and right-side view of a light source unit of the illumination device of FIG. 23.

As shown in FIGS. 23 and 24, the illumination device 30A in accordance with the present embodiment is configured such that a plurality of light source blocks 20A each composed of a light guide block 1A and a light source 21 (point light source) provided on one end face of the light guide block 1A are arranged two-dimensionally. The light source blocks 20A may be arranged independently of one another, or may form a light source unit in such a manner that the light guide sections 3A of adjacent light guide blocks 1A are connected at least partially to each other with adhesives or metal fittings.

Each of the light source blocks 20A is a side-light light source block, having a light source 21 provided on a light-entering end face 2 of a light guide block 1A, in which an incident beam of light from the light-entering end face 2 is emitted from one principal surface (board face). Further, the illumination device 30A is a tandem illumination device in which such light guide blocks 1A as described above (or such light source units as described above) are overlapped with offsets along the direction of the optical axis of a beam of light that is emitted from each light source 21.

In each of the light guide blocks 1A, an incident beam of light from the light-entering end face 2 is bent (reflected) inside of the light guide block 1A and emitted from part of the upper surface of the light guide block 1A. For this purpose, the light guide block 1A includes a light guide section 3A and a light-emitting section 9 arranged in this order from the light-entering end face 2 along a principal surface thereof.

That is, as shown in FIGS. 23 and 24, the light guide block 1A is configured in the same way as that of (a) of FIG. 1 or FIG. 7, except that the light guide sections 3A of a plurality of light guide blocks 1A are not formed integrally. For this reason, a light guide block 1A of FIGS. 23 and 24 is formed, for example, so that the length thereof along a direction perpendicular to the optical axis of a beam of light that is emitted from the light source 21 is smaller than that of a light guide plate 1 of (a) of FIG. 1.

Further, also in the present embodiment, the light sources 21 are point light sources such as side light-emitting LEDs. The light sources 21 are provided in one-to-one correspondence with the respective light guide blocks 1A.

That is, the illumination device 30 of FIG. 23 is shaped such that the light guide blocks 1A are cut from one another along the boundaries between the light-emitting sections 9 by extending the slit sections 8 of each light guide plate 1 of the illumination device 30 of FIG. 10 and (a) and (b) of FIG. 11 to the light-entering end face 2 of the light guide plate 1. For this reason, in the present embodiment, the entire light-emitting surface 5 of each light guide block 1A is used as a single separate illumination region (light-emitting section 9) of the light guide plate 1.

Also in the present embodiment, each light source 21 is disposed, preferably, so that its center is located on an extension of the central axis of the corresponding light guide block 1A (e.g., in the central part of the light-entering end face 2 of the corresponding light guide block 1A).

Also in the present embodiment, it is preferable that each light source 21 be disposed as close as possible to the corresponding light guide block 1A. This makes it possible to improve the efficiency with which a beam of light from the light source 21 enters the light guide block 1A.

In the illumination device 30A of FIG. 23, six sets of five light guide blocks 1A overlapped along the direction of the optical axis of a beam of light that is emitted from each light source 21 are arranged in a line along a direction perpendicular to the direction of the optical axis. However, the number of light guide blocks 1A is not particularly limited as long as it is a plural number so that the light-emitting surface LA of the illumination device 30A can be divided into a plurality of illumination regions (separate illumination regions). In the present embodiment, it is only necessary that at least either the number of light guide blocks 1A to be overlapped or the number of light guide blocks 1A to be arranged in a line be two or more.

According to the present embodiment, because of the parallel arrangement of the plurality of light guide blocks 1A, all of the light that strikes an end face 15 of each light guide block 1A at an angle that satisfies the condition of angle of total reflection is reflected, the end face 15 being parallel to the direction of the optical axis of a beam of light that is emitted from the light source 21. Part of the light that does not satisfy the condition of angle of total reflection leaks out of the light guide block 1A, but in cases where the light guide blocks 1A are connected, all of the light that has entered a region corresponding to the end face 15 is transmitted through the region. Therefore, a region of emission of a beam of light emitted from each light source 21 can be restricted by thus arranging a plurality of light source blocks 20A each having a light guide block 1A provided in one-to-one correspondence with a light source 21.

For this reason, the present embodiment also makes it possible to, by independently adjusting the light intensity of each of the light sources 21 corresponding to the plurality of light-emitting sections 9, i.e., the light intensity of a light source 21 provided on one surface of each light guide block 1A (independent drive), independently adjust the amount of light that is radiated from each light-emitting section 9.

The illumination device 30A is small in thickness, capable of dividing the illumination region into many parts, applicable to a large-size screen, and capable of uniform irradiation with a simple configuration.

Embodiment 9

The present embodiment is described below mainly with reference to FIGS. 25 through 28. The present embodiment is described by taking a liquid crystal display device as an example of an electronic device including an illumination device L as set forth in any one of Embodiments 1 to 8. Also in the present embodiment, components having the same functions as those of Embodiment 1 to 8 are given the same reference numerals, and as such, will not be described below.

Figure 25:
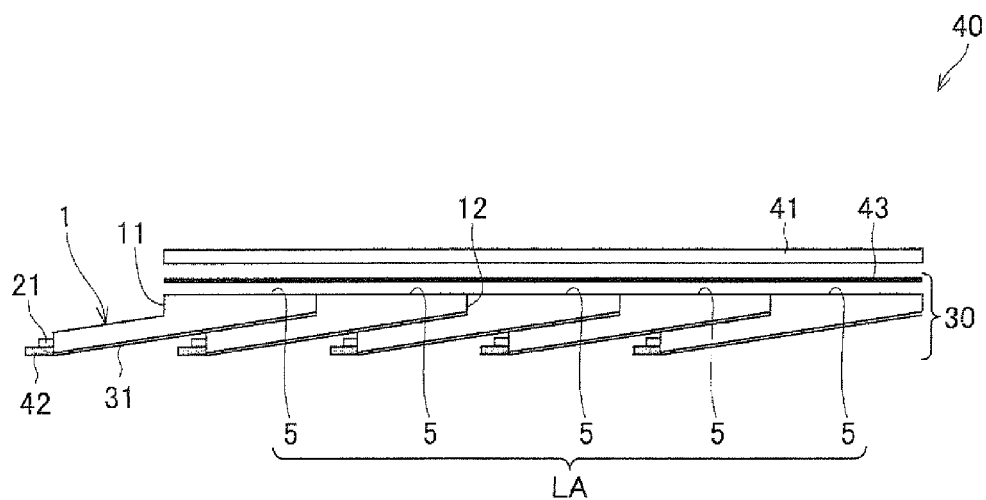
FIG. 25 is a cross-sectional view schematically showing the configuration of a main part of a liquid crystal display device in accordance with still another embodiment.
Figure 26:
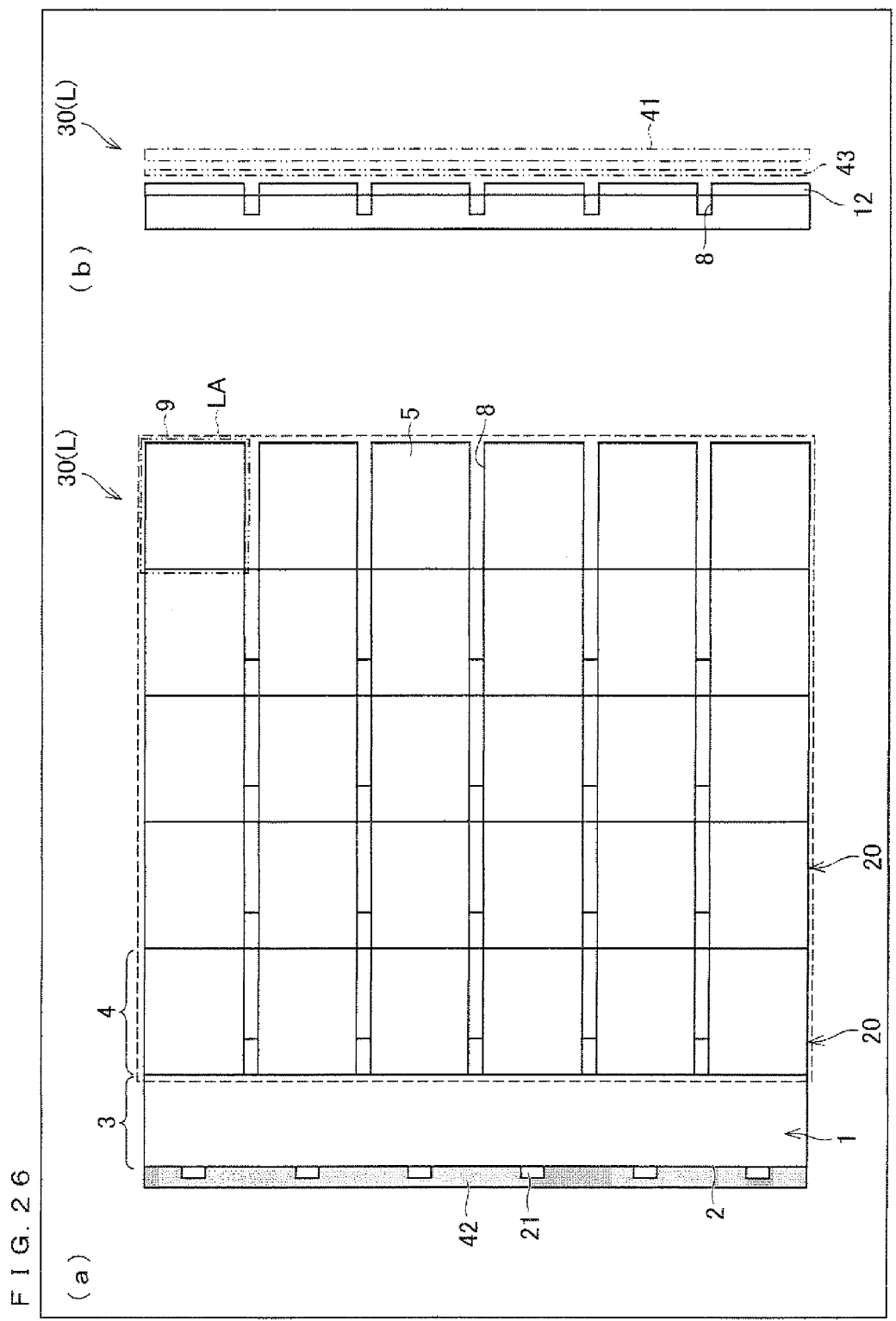
FIG. 26 shows (a) a plan view schematically showing an example of the configuration of an illumination device provided in the liquid crystal display device of FIG. 25 and (b) an end view schematically showing the configuration of the liquid crystal display device of FIG. 25 as viewed from a side opposite the light sources of the illumination device of (a) of FIG. 26.

FIG. 25 is a cross-sectional view schematically showing the configuration of a main part of a liquid crystal display device in accordance with the present embodiment. FIG. 26 shows (a) a plan view schematically showing an example of the configuration of an illumination device provided in the liquid crystal display device of FIG. 25 and (b) an end view schematically showing the configuration of the liquid crystal display device of FIG. 25 as viewed from a side opposite the light sources of the illumination device of (a) of FIG. 26. It should be noted that (a) of FIG. 26 omits an illustration of optical sheets.

It should be noted that the present embodiment is described by way of example where an illumination device L in accordance with the present embodiment is realized mainly by a tandem illumination device 30 in which a plurality of light source units 20 of Embodiment 1 are partially overlapped with offsets.

As shown in FIG. 25, a liquid crystal display device 40 in accordance with the present embodiment includes a liquid crystal panel 41 (display panel) and an illumination device 30 provided on a side opposite the display surface of the liquid crystal panel 41 (i.e., on a side facing the back surface of the liquid crystal panel 41). The illumination device 30, which is referred to also as a backlight, is designed to radiate light toward the liquid crystal panel 41.

Also in the present embodiment, for convenience of explanation, that principal surface of each light guide plate 1 through which light is emitted, i.e., that surface (light-emitting surface LA) of the illumination device 30 which faces the liquid crystal panel 41, is referred to as "upper surface" or "top surface", and the opposite principal surface is referred to as "lower surface" or "bottom surface".

It should be noted that because the liquid crystal panel 41 is configured in the same way as an ordinary liquid crystal panel that is used in a conventional liquid crystal display device, the liquid crystal panel 41 is not described or illustrated in detail. The liquid crystal panel 41 is not particularly limited in configuration, and can be appropriately realized by a publicly-known liquid crystal panel. For example, the liquid crystal panel 41 includes: an active-matrix substrate having a plurality of TFTs (thin-film transistors) formed thereon; and a counter substrate facing the active-matrix substrate, a liquid crystal layer being sealed in between the pair of substrates by a sealing material. The counter substrate is realized, for example, by a CF (color filter) substrate.

Meanwhile, as shown in FIG. 25 and (a) and (b) of FIG. 26, the illumination device 30 in accordance with the present embodiment includes light guide plates 1, light sources 21, substrates 42, optical sheets 43, and light-blocking bodies 31.

In the present embodiment, as described above, a plurality of light source units 20 of Embodiment 1 are partially overlapped with offsets along the direction of the optical axis, and arranged in a line along a direction perpendicular to the direction of the optical axis. For this reason, the illumination device 30 includes a plurality of light guide plates 1 and a plurality of light sources 21 respectively provided to the light guide plates 1, and is configured such that the light guide plates 1 is each provided with a substrate 42 and a light-blocking body 31.

In the present embodiment, five light source units 20 are overlapped with offsets along the direction of the optical axis of a beam of light that is emitted from each light source 21. However, as mentioned above, it is only necessary to provide at least one light source unit 20.

As shown in FIG. 25 and (a) and (b) of FIG. 26, the substrates 42 are each provided in such a way as to extend along the light-entering end face 2 of the corresponding light guide plate 1. The light sources 21 are mounted on each substrate 42 in such a way as to form a line.

Provided on the lower surface of each substrate 42 is a driving circuit (driver; not shown) for controlling lighting of each light source 21. That is, the driving circuit is mounted on the same substrate 42 together with the light sources 21. In the present embodiment, the amount of light that is emitted by each light-emitting section 9 in each light guide plate 1 can be independently adjusted by separately controlling lighting of each light source 21.

It is preferable that each light source 21 be disposed as close as possible to the corresponding light guide plate 1. This makes it possible to improve the efficiency with which a beam of light from the light source 21 enters the light guide plate 1.

The optical sheets 43 may be provided separately above the light-emitting surfaces 5 of the light guide plates 1, or may be formed integrally in such a way as to cover the light-emitting surfaces 5 of the light guide plates 1 altogether.

That is, the optical sheets 43, constituted by a plurality of sheets disposed in such a way as to overlap the upper surfaces of the light guide plates 1, are designed to equalize and condense beams of light from the light guide plates 1 so that the liquid crystal panel 41 is irradiated.

Generally, the optical sheets 43 are each constituted by a diffuser for the liquid crystal panel 41 to be irradiated with uniform light, a diffusing sheet that scatters light while condensing it, a lens sheet for improving the frontward luminance of light by condensing it, a polarized light reflecting sheet for improving the luminance of the liquid crystal display device 40 by reflecting one polarized component (one-sided polarization component) of light and transmitting the other polarized component (one-sided polarization component) of the light, and the like. These are appropriately used in combination depending on the price and performance of the liquid crystal display device 40.

Further, as mentioned above, each light guide plate 1 has a light-blocking body 31 provided on the bottom surface thereof. It is desirable that the light-blocking body 31 be realized by a reflecting sheet for reflecting part of the light that is radiated from the light guide plate 1 and light reflected back from the optical sheet 43. As shown in FIGS. 12 and 36 through 38, it is preferable that the light-blocking body 31 be realized, for example, by two types of reflecting sheet (specular reflection sheet 32, diffuse reflection sheet 33). However, the present embodiment is not limited to this. As mentioned above, the present embodiment only needs to be configured such that a first functional sheet or first functional layer having reflexivity and a second functional sheet or second functional layer having light-blocking properties are provided between the light guide plate 1 of one of light source units 20 in tandem and a light source 21 of the other light source unit 20 in such a way as to be put on top of each other. The light-blocking body 31, disposed entirely on the bottom surface of each light guide plate 1 as well as in that region of the bottom surface of each light guide plate 1 which faces the light sources 21, can reflect more light toward the liquid crystal panel 41.

This configuration allows a beam of light emitted from each point light source 21 to travel through the light guide plate 1 while being scattered and reflected, exit from the light-emitting surface 5, and reach the liquid crystal panel 41 through the optical sheet 43.

The illumination device 30 is neither configured to have a light source provided behind a light guide plate as in a conventional direct illumination device nor uses a linear light source as in a conventional typical side-light illumination device, and as such, can be made thinner than the conventional devices.

Further, the illumination device 30 does not simply have a light source provided solely on an end face of a light guide plate, but the partial overlapping of the light guide plates 1 causes the illumination device 30 to be a side-light illumination device in which light sources 21 provided on an end face of a light guide plate 1 are disposed in such a way as to face the back surface of another light guide plate adjacent to the light guide plate 1. Therefore, the present embodiment eliminates the need for a light source unit 20 other than the furthermost light source unit 20 to have a frame region in which light sources 21 are disposed. This make it possible to narrow the frame width of the device in comparison with a case where a frame region in which light sources are disposed is provided around a light guide plate. Further, because the illumination device 30 allows light sources 21 to be provided in a region other than a region having a corner facing outward, the light-emitting surface LA can be freely divided, without conventional restrictions on the number of divisions as well as on regions that can be divided, and can be divided into more parts than before.

Further, since the light guide plates 1 are such that a single light guide plate 1 is divided into a plurality of light-emitting sections 9, the number of assembling steps can be reduced.

A principle of operation of area-active drive with use of the illumination device 30 is described below with reference to FIG. 35.

Upon receiving a video signal, the liquid crystal display device 40 performs an area-active process in accordance with the video signal (input image). That is, the lighting control circuit 34 modulates the light of each separate light-emitting section 9 (light-emitting area) with respect to the input image by an irradiation signal based on a video signal that is sent to each light-emitting section 9, e.g., by changing the amount of illuminating light of each LED (light source 21) in accordance with the video signal. Thus created is LED data corresponding to the brightness and darkness of the input image. For example, in the case of a 52-inch liquid crystal display device 40, the number of light-emitting areas is 48×24.

Meanwhile, from the input image and the LED data, LCD data to be displayed on the liquid crystal panel 41 is created. The LED data and the LCD data are superimposed on each other by the illumination device 30 (LED BLU: backlight unit) and the liquid crystal panel 41 to give an output image high in contrast, wide in viewing angle, and wide in color reproducibility.

In the following, control of the luminance of illuminating light of each light-emitting section 9 in the illumination device 30 (backlight) in accordance with the brightness and darkness of an image to be displayed in a display region of the liquid crystal display device 40 is described in more detail with reference to FIG. 27.

Figure 27:
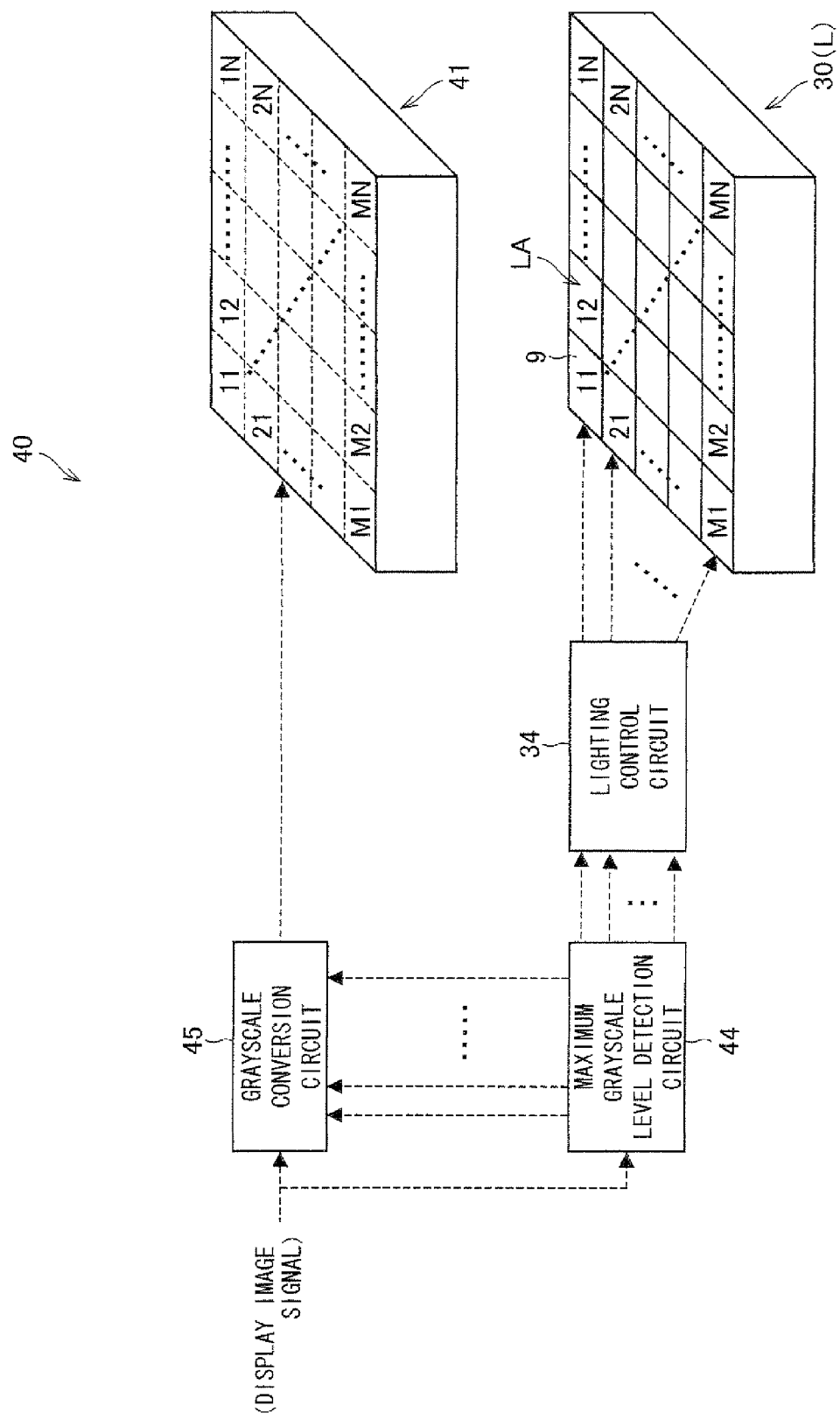
FIG. 27 is a block diagram schematically showing the configuration of a main part of a liquid crystal display device in accordance with still another embodiment.

FIG. 27 is a block diagram schematically showing the configuration of a main part of the liquid crystal display device 40.

The light-emitting surface LA of the illumination device 30 is divided, for example, into M rows and N columns of separate illumination regions (light-emitting sections 9) in a matrix manner, and the illumination regions are each separately turned on and off. That is, the present embodiment uses, as light guide plates in the illumination device 30, such area-divided light guide plates 1 (tandem light guide plates) as shown in FIG. 25 and (a) and (b) of FIG. 26, and adjusts the light intensity of each separate area.

The liquid crystal panel 41 can be hypothetically divided into separate display regions corresponding to the separate illumination regions of the illumination device 30. Further, the liquid crystal display device 40 can be hypothetically divided into separate regions corresponding to the separate illumination regions of the illumination device 30. It is preferable that the separate regions and the separate illumination regions correspond to an integral multiple ($\geq 1$) of one pixel of the liquid crystal display device 40.

As shown in FIG. 27, the liquid crystal display device 40 includes a maximum grayscale level detection circuit 44 and a grayscale conversion circuit 45 as a driving circuit (control means) in addition to the lighting control circuit 34. For convenience of explanation, FIG. 27 illustrates the lighting control circuit 34 separately from the illumination device 30 as part of the driving circuit. However, as mentioned above, the lighting control circuit 34 may be provided separately from the illumination device 30, or may be provided integrally with the illumination device 30.

The lighting control circuit 34 controls the intensity of illuminating light by changing the ratio between a lighting period and a lights-out period per unit time of each light source 21, as mentioned above, for each corresponding separate illumination region of the illumination device 30 in accordance with a maximum grayscale level detected by the maximum grayscale level detection circuit 44 during one frame period for each separate region of the liquid crystal display device 40 (liquid crystal panel 41).

In the present embodiment, the unit time varies in ratio between a lighting period and a lights-out period in one frame period.

Further, the maximum grayscale level may be controlled for each of the three colors R, G, and B, or may be controlled in white. That is, the intensity of illuminating light of each light-emitting section 9 may be adjusted independently in three colors R, G, and B (i.e., through area emission for each of the three colors R, G, and B), or may be adjusted in white (i.e., through black-and-white area emission alone).

Further, the grayscale conversion circuit 45 converts a display image signal in accordance with a maximum grayscale level detected by the maximum grayscale level detection circuit 44 during one frame period for each separate region of the liquid crystal display device 40, and creates, for each separate display region, an input signal to be sent to the liquid crystal panel 41.

The ratio between lighting and lights-out periods of the illumination device 30 as controlled by the lighting control circuit 34 in accordance with the maximum grayscale level detected by the maximum grayscale level detection circuit 44 is as described above in Embodiment 1. That is, the dynamic range is expanded by controlling the luminance of illuminating light so that it is high in an illumination region (separate illumination region) corresponding to a display region (separate region) where a bright image is displayed and low in an illumination region (separate illumination region) corresponding to a display region (separate region) where a dark image is displayed, whereby a liquid crystal display device 40 capable of displaying an image high in sense of contrast can be realized.

As described above, the liquid crystal display device 40 in accordance with the present embodiment, whose separate regions are arranged in a matrix of M rows and N columns, is such that: the maximum grayscale level detection circuit 44 detects the maximum grayscale level of a display image signal for each image to be displayed in each separate region; the lighting control circuit 34 changes the ratio between a lighting period and a lights-out period for each corresponding separate illumination region of the illumination device 30 and thereby controls the intensity of light that illuminates the liquid crystal panel 41; and the grayscale conversion circuit 45 optimizes, for each separate display region in accordance with the maximum grayscale level detected by the maximum grayscale level detection circuit 44, an input image signal to be sent to the liquid crystal panel 41.

The execution of such control makes it possible to display an image finer in texture and higher in sense of contrast in comparison with a case where the backlight is realized by an illumination device that keeps on irradiating the entire light-emitting surface with light of a fixed intensity. That is, the present embodiment can realize a large-sized liquid crystal display device 40 low in profile and high in definition.

Although the foregoing description has been given by way of example where the illumination device L in accordance with the present embodiment is realized by a tandem illumination device 30 in which a plurality of light source units 20 of Embodiment 1 are partially overlapped with offsets, the present embodiment is not limited to this, and can be realized by appropriately selecting an illumination device L as set forth in any one of the embodiments above.

FIG. 28 is a plan view schematically showing an example of the configuration of a tandem illumination device 30A, used in the liquid crystal display device of FIG. 25, in which a plurality of light guide blocks 1A of FIGS. 23 and 24 are partially overlapped with offsets. It should be noted that the configuration of such a liquid crystal display device 40 is identical in schematic cross-section to that shown in FIG. 25.

The illumination device 30A of FIG. 28 is configured in the same way as the illumination device 30 of FIG. 25 and (a) and (b) of FIG. 26, except that the light-emitting surface LA of the illumination device 30 is not divided into a plurality of light-emitting sections 9 by slit section 8 provided in each light guide plate 1 and by light guide plates 1 adjacent to each other along the direction of the optical axis of a beam of light that is emitted from each light source 21, but is divided into a plurality of light-emitting sections 9 by light guide blocks 1A adjacent to each other along two directions, namely the direction of the optical axis of a beam of light that is emitted from each light source 21 and a direction perpendicular to the direction of the optical axis.

In FIG. 28, each light guide block 1A is provided with one light-blocking body 31. However, the number of light-blocking bodies 31 does not need to be equal to the number of light guide blocks 1A. For example, it is possible to dispose a light-blocking body 31 in such a way that it is shared by a plurality of light guide blocks 1A arranged in parallel with a direction perpendicular to the optical axis of a beam of light that is emitted from each light source 21. That is, the light-blocking bodies 31 respectively provided in the light guide blocks 1A may be formed integrally. Also in this case, it is preferable that the light-blocking body 31 be realized by a combination of two types of reflecting sheet (specular reflection sheet 32, diffuse reflection sheet 33). Of course, the specular reflection sheet 32 and the diffuse reflection sheet 33 may be simply put on top of each other, or may be joined on top of each other to form a single sheet. Further, the light-blocking body 31 may be realized by a sheet having a diffuse reflection layer and a specular reflection layer.

Also in the illumination device 30A, the light-blocking body 31, disposed entirely on the bottom surface of each light guide block 1A as well as in that region of the bottom surface of each light guide block 1A which faces the light source 21, can reflect more light toward the liquid crystal panel 41.

Further, in the present embodiment, as shown in FIG. 28, also in the illumination device 30A, one substrate 42 is provided in each column, i.e., provided in such a way as to be shared by a group of light guide blocks 1A along a direction perpendicular to the optical axis of a beam of light that is emitted from each light source 21. Thus, on one substrate 42, a plurality of light sources 21 provided in correspondence with their respective light guide blocks 1A arranged in parallel with one another are mounted in such a way as to form a line.

A substrate 42 may be provided in each light guide block 1A. Alternatively, a substrate 42 may be provided across each column of light guide blocks 1A so that the light guide blocks 1A are integrated, in which case a plurality of light sources (column of light sources 21) can be mounted on one substrate 42. This allows a reduction in the number of substrates 42 and a reduction in connectors or the like which are each used to connect substrates 42 adjacent to each other, thus allowing a reduction in manufacturing cost.

Although FIG. 28 shows the disposition of light guide blocks 1A by exaggerating the boundaries between light guide blocks 1A adjacent in columns, it is preferable that adjacent light guide block 1A be arranged with no space therebetween in rows and columns, for the same reason as it is preferable that the slit sections 8 be as small as possible in width. The disposition of adjacent light guide blocks 1A with no space therebetween makes it possible to irradiate the liquid crystal panel 40 with light higher in uniformity of luminance.

Although the present embodiment has been described by taking a liquid crystal display device as an example of an electronic device in accordance with the present embodiment, the present embodiment is not limited to this. Further, the electronic device may be a display device other than a liquid crystal display device, and an illumination device L in accordance with the present embodiment can be applied to any electronic device that requires an illumination device.

Embodiment 10

The present embodiment is described below mainly with reference to FIGS. 29 through 31. The present embodiment is described by taking, as an example of an electronic device including an illumination device L as set forth in any one of Embodiments 1 to 9, a television receiver (liquid crystal television) to which a liquid crystal display device 40 of Embodiment 9 has been applied. Also in the present embodiment, components having the same functions as those of Embodiment 1 to 9 are given the same reference numerals, and as such, will not be described below.

Figure 29:
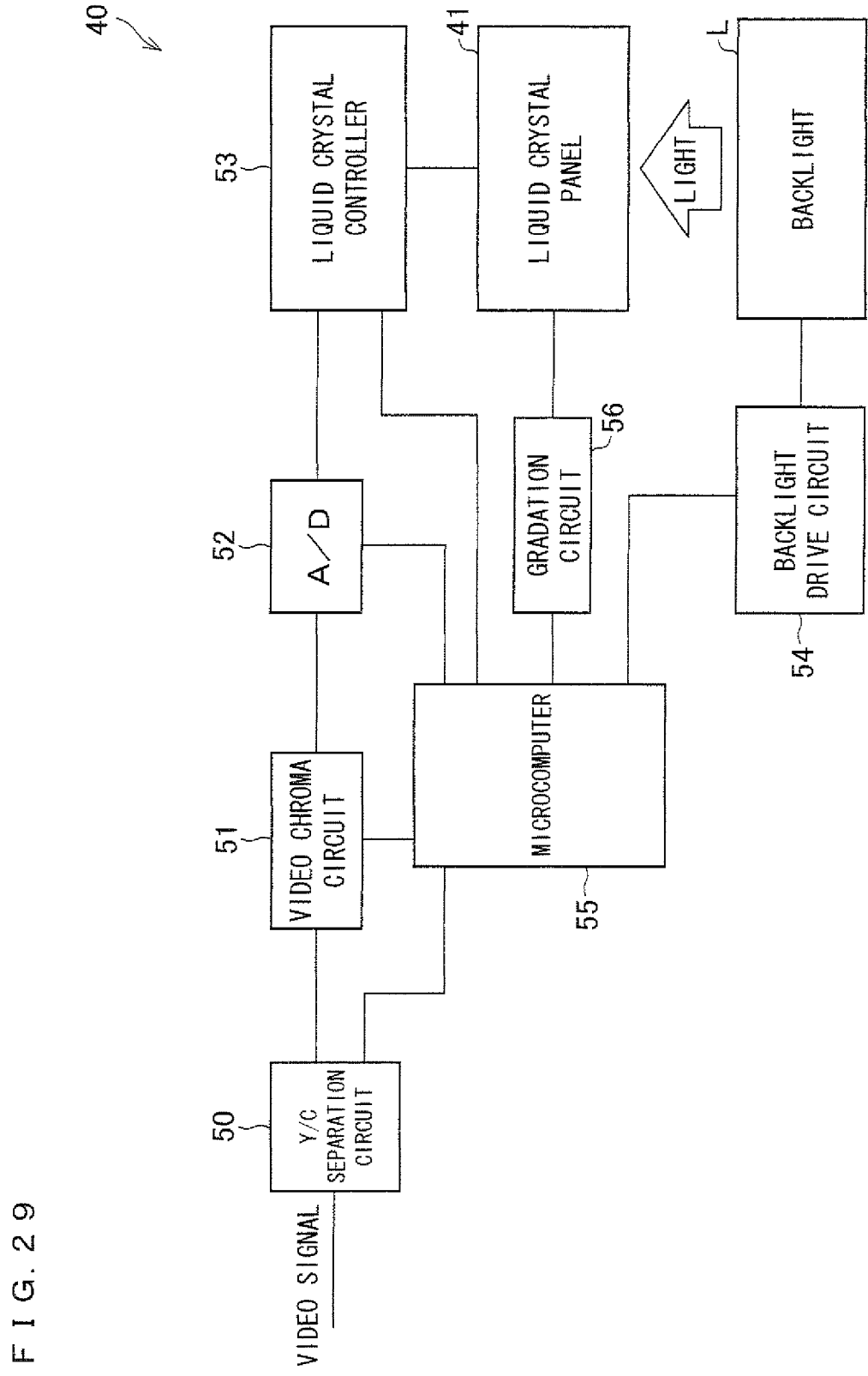
FIG. 29 is a block diagram schematically showing the configuration of a liquid crystal display device for use in a television receiver in accordance with another embodiment.

FIG. 29 is a block diagram schematically showing the configuration of a liquid crystal display device 40 for use in a television receiver in accordance with the present embodiment. FIG. 30 is a block diagram showing a relationship between a tuner section and the liquid crystal display device 40 in the television receiver of FIG. 29. FIG. 31 is an exploded perspective view of the television receiver of FIG. 29.

As shown in FIG. 29, the liquid crystal display device 40 includes a Y/C separation circuit 50, a video chroma circuit 51, an A/D converter 52, a liquid crystal controller 53, a liquid crystal panel 41, a backlight drive circuit 54, an illumination device L serving as a backlight, a microcomputer 55, and a gradation circuit 56.

In the liquid crystal display device 40 thus configured, first, the Y/C separation circuit 50 receives an input video signal, i.e., a television signal, and then separates it into a luminance signal and a color signal. The video chroma circuit 51 converts the luminance signal and the color signal into R, G, and B, which are the three primary colors of light. Furthermore, the A/D converter 52 converts the analog RGB signals into digital RGB signals, and then the liquid crystal controller 53 receives the digital RGB signals.

The liquid crystal panel 41 receives the RGB signals from the liquid crystal controller 53 at predetermined timings and receives RGB gradation voltages from the gradation circuit 56, thereby displaying an image. The whole system, including these processes, is controlled by the microcomputer 55.

It should be noted that a display can be performed based on various video signals such as a video signal based on a television broadcast, a video signal taken by a camera, a video signal supplied via an Internet line, and a video signal recorded on a DVD.

Figure 30:
FIG. 30 is a block diagram showing a relationship between a tuner section and the liquid crystal display device in the television receiver of FIG. 29.

Furthermore, in FIG. 30, the tuner section 60 receives a television broadcast and outputs a video signal, and the liquid crystal display device 40 displays an image (picture) based on the video signal sent from the tuner section 60.

Figure 31:
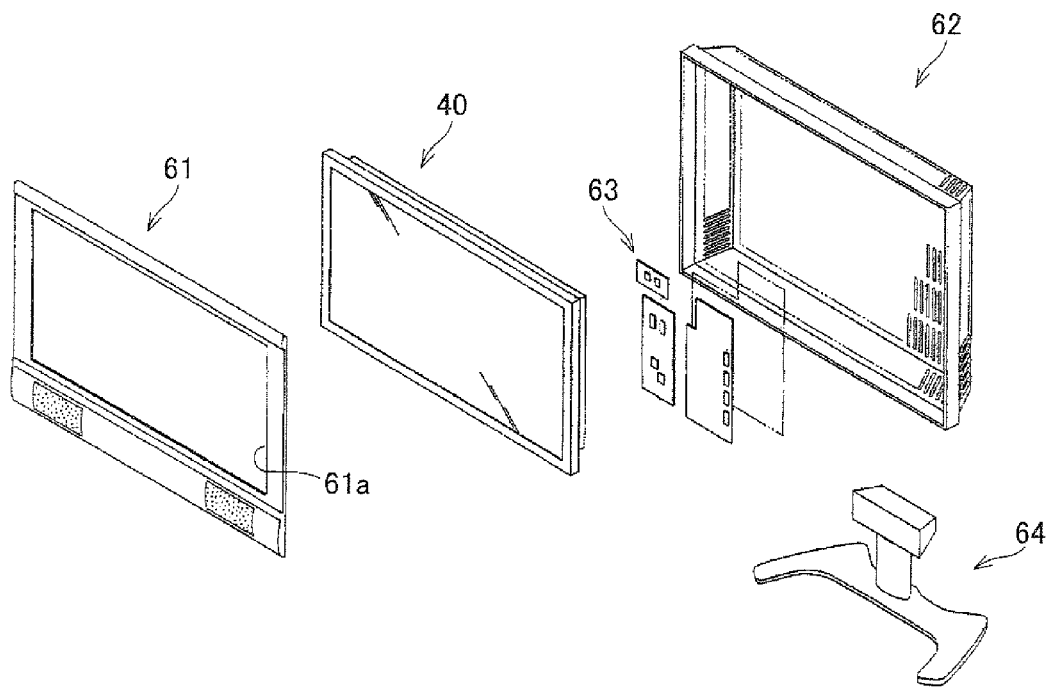
FIG. 31 is an exploded perspective view of the television receiver of FIG. 29.

Further, when the liquid crystal display device 40 serves as a television receiver, the liquid crystal display device 40 is interposed between a first housing 61 and a second housing 62 in such a way as to be enclosed therein, for example, as shown in FIG. 31.

The first housing 61 is provided with an opening 61a through which an image displayed by the liquid crystal display device 40 is transmitted.

Further, the second housing 62, which serves to cover the back surface of the liquid crystal display device 40, is provided with an operation circuit 63 for operating the liquid crystal display device 40, and has a supporting member 64 attached to the lower side thereof.

Such use of the liquid crystal display device 40 as a display device in a television receiver or video monitor thus configured makes it possible to display an image high in contrast, superior in moving-image characteristic, and high in display quality.

As described above, the illumination device and display device each have either (i) a diffuse reflection sheet and a specular reflection sheet or light absorption sheet provided as a first functional sheet and a second functional sheet between the light guide plate of the one of the light source units and the at least one light source of the other light source unit in such a way as to be put on top of each other, or (ii) a diffuse reflection layer and a specular reflection layer or light absorption layer provided as a first functional layer and a second functional layer between the light guide plate of the one of the light source units and the at least one light source of the other light source unit in such a way as to be joined on top of each other, thereby bringing about a synergistic effect of the first functional sheet or first functional layer diffusing light and the second function sheet or second function layer blocking leakage of light emitted from the at least one light source. The synergistic effect makes it possible to reduce uneven irradiation, improve uniformity in luminance, and remarkably improve the color-mixing effect. Therefore, the display device can realize sufficient luminance and excellent uniformity in luminance.

In the illumination device and display device, it is preferable that the first functional sheet and the second functional sheet be arranged in this order from the light guide plate of the one of the light source units.

Similarly, it is preferable that the first functional layer be provided in such a way as to face the light guide plate of the one of the light source units and the second functional layer be provided in such a way as to face the at least one light source of the other light source unit.

Each of the foregoing configurations makes it possible to sufficiently mix and emit beams of light emitted from the at least one light source and having entered the light guide plate paired with the at least one light source, thus improving in-plane luminance uniformity and color-mixing properties. Further, each of the foregoing configurations makes it possible to efficiently block light that is emitted toward a higher position than the at least one light source, thus eliminating uneven irradiation as a backlight.

It should be noted that the first functional sheet or first function layer only needs to be disposed at least in a position corresponding to the illumination region of the one of the light source units and the second functional sheet only needs to be disposed at least in a position corresponding to the at least one light source of the other light source unit. This makes it possible to sufficiently obtain the foregoing effect.

Further, the first functional sheet and the second functional sheet may be arranged in this order from the at least one light source of the one of the light source units. That is, the first functional layer may be provided in such a way as to face the at least one light source of the one of the light source units, and the second functional layer may be provided in such a way as to face the illumination region of the other light source unit.

Each of the foregoing configurations allows the first function sheet or first functional layer to diffuse light, and the second functional sheet or second functional layer to both reflect and block light transmitted through the first function sheet or first functional layer. In particular, because diffuse reflection is generally higher in efficiency of reflection than specular reflection, the efficiency of reentrance of light into the light guide plate paired with the at lease one light source is enhanced by disposing the diffuse reflection sheet or diffuse reflection layer so that it faces the at least one light source. Therefore, each of the foregoing configurations makes it possible to reduce uneven irradiation, improve uniformity in luminance, and remarkably improve the color-mixing effect.

Further, it is preferable that the first functional sheet, the second functional sheet, and another first functional sheet be arranged in this order from the light guide plate of the one of the light source units.

Similarly, it is preferable that the first functional layer, the second functional layer, and another first functional layer be arranged in this order from the light guide plate of the one of the light source units.

This makes it possible to sufficiently mix and emit beams of light emitted from the at least one light source and having entered the light guide plate paired with the at least one light source, and to cause beams of light emitted from the at least one light source but having failed to enter the light guide plate paired with the at least one light source to reenter the light guide plate. This also makes it possible to both reflect and block light transmitted through the first function sheet or first functional layer, thus making it possible to reduce uneven irradiation, improve uniformity in luminance, and further improve the color-mixing effect.

It should be noted that the first functional layer and the second functional layer may be formed from a diffuse refection sheet and a specular reflection or light absorption sheet joined on top of each other. This makes it possible to easily align the sheets described above.

Further, the second functional layer may be formed from a specular reflection sheet, and the first functional layer may be formed by unleveling at least one surface of the specular reflection sheet. The foregoing configuration makes it possible to easily form a diffuse reflection layer in a desired region on at least one surface of the specular reflection sheet. Therefore, the foregoing configuration makes it possible to easily form a sheet of first and second functional layers put on top of each other in a desired region.

Further, among reflecting materials, silver is especially high in specular reflectance. Therefore, it is preferable that the second functional sheet or second functional layer be a specular reflection sheet or specular reflection layer made of silver.

Further, such a configuration (hereinafter referred to as "Configuration A") may be had that: the illumination region is divided into a plurality of light-emitting sections by a divider, provided in such a way as to extend along the direction of the optical axis of the at least one light source, which restricts transmission of light; and at least one of the at least one light source is provided to each of the light-emitting sections in such a way as to be placed side-by-side along the light guide region.

Further, such a configuration (hereinafter referred to as "Configuration B") may be had that: the light guide plate includes a plurality of light guide blocks, arranged one-dimensionally, each of which has a light-emitting section through which an incident beam of light from the at least one light source is emitted outward and a light guide section through which the incident beam of light from the at least one light source is guided toward the light-emitting section; and the light guide section and a light guide section adjacent thereto are connected at least partially to each other with an optical divider provided in at least a part of space between the light-emitting section and a light-emitting section adjacent thereto. It should be noted that the light guide plate may be configured such that the light guide section of a light guide block of prior art is formed integrally with the light guide section of an adjacent light guide block or connected to the light guide section of an adjacent light guide block with adhesives or metal fittings.

Configurations A and B makes it possible to provide a plurality of light-emitting sections in the illumination region by the divider. Further, since at least one of the at least one light source is provided to each of the light-emitting sections, the amount of light the is radiated from each light-emitting section can be independently adjusted by independently adjusting (independent drive) the light intensity of a light source corresponding to each light-emitting section. For this reason, Configurations A and B makes it possible to adjust the illumination luminance of each separate light-emitting section, thus bringing about an effect of making area-active drive possible.

In particular, according to Configuration A, the light guide plate is constructed as if a plurality of light guide blocks were joined by each light guide section in a transverse direction (i.e., in a direction intersecting with a plurality of light guide sections), assuming that the direction along which light source units are disposed (tandem direction) is a longitudinal direction.

Since the light guide sections of adjacent light guide blocks are formed integrally, the light guide plate is high in strength of a joint section between one light guide section and another. For this reason, the light guide plate has a sturdy construction as a combination of light guide blocks even if the light guide region is made thinner.

Further, since Configuration A has the divider provided in the illumination region, Configuration A makes it possible to confine a beam of light from each light source within the targeted light-emitting section with a simple configuration and suppress or avoid leakage of the beam of light into an adjacent light-emitting section.

Therefore, the foregoing configuration also brings about an effect of making it possible to provide an illumination device capable of retaining its strength as a combination of light guide blocks while reducing leakage of light into an adjacent area.

Furthermore, since Configuration A allows formation of a plurality of light-emitting sections from a single light guide plate, it allows improved productivity. Further, since the number of light guide plates that are connected can be reduced, the disposition is facilitated; moreover, the time and cost that are required for the connection can be reduced.

The present technology is not limited to the description of the embodiments above, but may be altered by a skilled person within the scope of the claims. An embodiment based on a proper combination of technical means disclosed in different embodiments is encompassed in the technical scope of the present technology.

An illumination device of the present technology can be used as a backlight in a liquid crystal display device. The illumination device of the present technology can be suitably used, in particular, as a backlight in a large-sized liquid crystal display device.

The invention claimed is:

1. An illumination device comprising a plurality of light source units each having a light guide plate and at least one light source,
   the light guide plate having an illumination region through which an incident beam of light from the at least one light source is emitted outward and a light guide region through which the incident beam of light from the at least one light source is guided toward the illumination region, with the illumination region and the light guide region laid side-by-side,
   light source units adjacent to each other along a direction of an optical axis of the at least one light source being disposed so that the illumination region of one of the light source units covers at least a part of the light guide region of the other light source unit,
   a first functional sheet having reflectivity and a second functional sheet which is substantially planar along its length a light-blocking property being provided between the light guide plate of the one of the light source units and the at least one light source of the other light source unit in such a way as to be put on top of each other, the first and second functional sheets being parallel to each other,
   the first functional sheet being a diffuse reflection sheet, the second functional sheet being a specular reflection sheet or a light absorption sheet, wherein:
   the illumination region is divided into a plurality of light-emitting sections by a divider, provided in such a way as to extend along the direction of the optical axis of the at least one light source, which restricts transmission of light, wherein the light guide region is continuous and extends along the plurality of light-emitting sections; and
   at least one of the at least one light source is provided to each of the light-emitting sections in such a way as to be placed side-by-side along the light guide region,
   the divider being provided in such a way to extend from the illumination region into part but not all of the light guide region, the dividers being provided at least in a region of overlap between regions that are irradiated by adjacent light sources.

2. The illumination device as set forth in claim 1, wherein the first functional sheet and the second functional sheet are arranged in this order from the light guide plate of the one of the light source units.

3. The illumination device as set forth in claim 1, wherein the first functional sheet is disposed at least in a position corresponding to the illumination region of the one of the light source units and the second functional sheet is disposed at least in a position corresponding to the at least one light source of the other light source unit.

4. The illumination device as set forth in claim 1, wherein the first functional sheet and the second functional sheet are arranged in this order from the at least one light source of the one of the light source units.

5. The illumination device as set forth in claim 1, wherein the first functional sheet, the second functional sheet, and another first functional sheet are arranged in this order from the light guide plate of the one of the light source units.

6. The illumination device as set forth in claim 1, wherein the second functional sheet is a specular reflection sheet made of silver.

7. A display device comprising:
a display panel; and
an illumination device as set forth in claim 1.

8. An illumination device comprising a plurality of light source units each having a light guide plate and at least one light source,
the light guide plate having an illumination region through which an incident beam of light from the at least one light source is emitted outward and a light guide region through which the incident beam of light from the at least one light source is guided toward the illumination region, with the illumination region and the light guide region laid side-by-side,
light source units adjacent to each other along a direction of an optical axis of the at least one light source being disposed so that the illumination region of one of the light source units covers at least a part of the light guide region of the other light source unit,
a first functional layer having reflectivity and a second functional layer which is substantially planar along its entire length having a light-blocking property being provided between the light guide plate of the one of the light source units and the at least one light source of the other light source unit in such a way as to be put on top of each other, the first and second functional sheets being parallel to each other,
the first functional layer being a diffuse reflection layer, the second functional layer being a specular reflection layer or a light absorption layer, wherein:
the illumination region is divided into a plurality of light-emitting sections by a divider, provided in such a way as to extend along the direction of the optical axis of the at least one light source, which restricts transmission of light, wherein the light guide region is continuous and extends along the plurality of light-emitting sections; and
at least one of the at least one light source is provided to each of the light-emitting sections in such a way as to be placed side-by-side along the light guide region,
the divider being provided in such a way to extend from the illumination region into part but not all of the light guide region, the dividers being provided at least in a region of overlap between regions that are irradiated by adjacent light sources.

9. The illumination device as set forth in claim 8, wherein the first functional layer is provided in such a way as to face the light guide plate of the one of the light source units and the second functional layer is provided in such a way as to face the at least one light source of the other light source unit.

10. The illumination device as set forth in claim 8, wherein the first functional layer is disposed at least in a position corresponding to the illumination region of the one of the light source units and the second functional layer is disposed at least in a position corresponding to the at least one light source of the other light source unit.

11. The illumination device as set forth in claim 8, wherein the first functional layer is provided in such a way as to face the at least one light source of the one of the light source units and the second functional layer is provided in such a way as to face the illumination region of the other light source unit.

12. The illumination device as set forth in claim 1, wherein the first functional layer, the second functional layer, and another first functional layer are arranged in this order from the light guide plate of the one of the light source units.

13. The illumination device as set forth in claim 8, wherein the first functional layer and the second functional layer are formed from a diffuse refection sheet and a specular reflection or light absorption sheet joined on top of each other.

14. The illumination device as set forth in claim 8, wherein the second functional layer is formed from a specular reflection sheet and the first functional layer is formed by forming concavities and convexities in at least one surface of the specular reflection sheet.

15. The illumination device as set forth in claim 8, wherein the second functional layer is a specular reflection layer made of silver.

16. A display device comprising:
a display panel; and
an illumination device as set forth in claim 8.

* * * * *

UNITED STATES PATENT AND TRADEMARK OFFICE
CERTIFICATE OF CORRECTION

| | | |
|---|---|---|
| PATENT NO. | : 8,414,173 B2 | Page 1 of 1 |
| APPLICATION NO. | : 12/599944 | |
| DATED | : April 9, 2013 | |
| INVENTOR(S) | : Takeshi Masuda | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this
Fourth Day of March, 2014

Michelle K. Lee
*Deputy Director of the United States Patent and Trademark Office*